(12) United States Patent
Kubota et al.

(10) Patent No.: US 10,200,920 B2
(45) Date of Patent: Feb. 5, 2019

(54) ON-DEMAND SYSTEM INFORMATION

(71) Applicant: QUALCOMM Incorporated, San Diego, CA (US)

(72) Inventors: Keiichi Kubota, Farnborough (GB); Tingfang Ji, San Diego, CA (US); Naga Bhushan, San Diego, CA (US); Gavin Bernard Horn, La Jolla, CA (US); John Edward Smee, San Diego, CA (US); Joseph Binamira Soriaga, San Diego, CA (US); Wei Zeng, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 58 days.

(21) Appl. No.: 14/803,793

(22) Filed: Jul. 20, 2015

(65) Prior Publication Data
US 2016/0234736 A1    Aug. 11, 2016

Related U.S. Application Data

(60) Provisional application No. 62/114,157, filed on Feb. 10, 2015, provisional application No. 62/121,326, filed on Feb. 26, 2015.

(51) Int. Cl.
H04L 12/18         (2006.01)
H04W 36/00        (2009.01)
(Continued)

(52) U.S. Cl.
CPC ...... H04W 36/0083 (2013.01); H04B 7/0413 (2013.01); H04L 12/18 (2013.01); H04W 48/12 (2013.01)

(58) Field of Classification Search
CPC .......................... H04W 35/0083; H04L 12/18
See application file for complete search history.

(56) References Cited

U.S. PATENT DOCUMENTS 5,477,542 A * 12/1995 Takahara ................ H04J 3/177
                                                      348/14.05
7,440,755 B2  10/2008 Balachandran et al.
(Continued)

FOREIGN PATENT DOCUMENTS

EP       1553798 A1    7/2005
EP       2070366 A1    6/2009
(Continued)

OTHER PUBLICATIONS

ISA/EP, Partial International Search Report of the International Searching Authority, Int'l App. No. PCT/US2016/015990, dated May 18, 2016, European Patent Office, Rijswijk, NL, 7 pgs.
(Continued)

*Primary Examiner* — Peter G Solinsky
(74) *Attorney, Agent, or Firm* — Clint R. Morin; Holland & Hart

(57) ABSTRACT

A wireless network may provide system information by either a fixed periodic broadcast or broad-beam transmission or in response to a request by a user equipment (UE). The wireless network may broadcast (or broad-beam transmit) a signal that indicates to the UEs within a cell or zone coverage area that system information is to be transmitted on a fixed periodic schedule or in response to a request sent by one or more UEs.

53 Claims, 48 Drawing Sheets

(51) Int. Cl.
    *H04W 48/12*      (2009.01)
    *H04B 7/0413*     (2017.01)

(56) References Cited

U.S. PATENT DOCUMENTS

| | | | |
|---|---|---|---|
| 8,135,405 B2 | 3/2012 | Mittal et al. | |
| 8,155,660 B2 | 4/2012 | Fischer et al. | |
| 8,223,782 B2 | 7/2012 | Fischer et al. | |
| 8,254,299 B2 | 8/2012 | Kim | |
| 8,548,465 B2 | 10/2013 | Mueck et al. | |
| 8,577,342 B2 | 11/2013 | Muniere et al. | |
| 8,811,253 B2 | 8/2014 | Damnjanovic et al. | |
| 8,879,984 B2 * | 11/2014 | Wentink | H04W 16/14 370/252 |
| 9,037,140 B1 | 5/2015 | Brown | |
| 2005/0143085 A1 * | 6/2005 | Bi | H04W 4/06 455/452.2 |
| 2007/0133456 A1 | 6/2007 | Ding | |
| 2008/0155563 A1 * | 6/2008 | Nakamura | G03G 15/5075 719/318 |
| 2008/0212522 A1 | 9/2008 | Ko et al. | |
| 2009/0129339 A1 * | 5/2009 | Young | H04W 72/02 370/331 |
| 2009/0280781 A1 * | 11/2009 | Li | H04L 51/00 455/412.1 |
| 2010/0226662 A1 * | 9/2010 | Takatani | G03G 15/5004 399/8 |
| 2010/0227611 A1 * | 9/2010 | Schmidt | H04W 4/06 455/434 |
| 2011/0051660 A1 | 3/2011 | Arora et al. | |
| 2011/0072020 A1 | 3/2011 | Ngo et al. | |
| 2011/0096697 A1 | 4/2011 | Anantharaman et al. | |
| 2011/0149874 A1 * | 6/2011 | Reif | H04W 48/18 370/329 |
| 2011/0170410 A1 * | 7/2011 | Zhao | H04L 47/10 370/232 |
| 2011/0237239 A1 | 9/2011 | Chou et al. | |
| 2012/0014309 A1 * | 1/2012 | Iizuka | H04L 12/18 370/312 |
| 2012/0250620 A1 | 10/2012 | Hu | |
| 2012/0281594 A1 * | 11/2012 | Stewart | H04W 16/14 370/259 |
| 2013/0051240 A1 * | 2/2013 | Bhattad | H04L 5/005 370/241 |
| 2013/0107826 A1 * | 5/2013 | Dinan | H04W 16/32 370/329 |
| 2013/0301509 A1 * | 11/2013 | Purnadi | H04L 65/4076 370/312 |
| 2014/0003254 A1 * | 1/2014 | Andreoli-Fang | H04W 48/12 370/252 |
| 2014/0095730 A1 * | 4/2014 | Ozgur | H04W 52/0258 709/231 |
| 2014/0112217 A1 | 4/2014 | Ahn et al. | |
| 2014/0198685 A1 | 7/2014 | Xu et al. | |
| 2014/0199961 A1 | 7/2014 | Mohammed et al. | |
| 2014/0213269 A1 * | 7/2014 | Nama | H04W 28/16 455/451 |
| 2014/0213289 A1 | 7/2014 | Xiao et al. | |
| 2014/0269566 A1 * | 9/2014 | Wang | H04W 4/06 370/329 |
| 2014/0313936 A1 * | 10/2014 | You | H04L 67/16 370/254 |
| 2014/0321432 A1 * | 10/2014 | Li | H04W 36/08 370/331 |
| 2014/0362752 A1 | 12/2014 | Jha et al. | |
| 2015/0003327 A1 * | 1/2015 | Seok | H04W 4/06 370/328 |
| 2015/0016419 A1 * | 1/2015 | Kim | H04W 36/04 370/331 |
| 2015/0038142 A1 | 2/2015 | Wang et al. | |
| 2015/0066683 A1 | 3/2015 | Azose | |
| 2015/0078257 A1 * | 3/2015 | Wu | H04L 25/0224 370/328 |
| 2015/0118968 A1 * | 4/2015 | Nory | H04W 36/0083 455/67.11 |
| 2015/0119054 A1 | 4/2015 | Morioka | |
| 2015/0256995 A1 * | 9/2015 | Rune | H04W 48/12 455/418 |
| 2015/0282207 A1 * | 10/2015 | Ambriss | H04W 36/0055 370/331 |
| 2015/0295774 A1 * | 10/2015 | Pugaczewski | H04L 41/12 370/254 |
| 2015/0351054 A1 * | 12/2015 | Immonen | H04W 52/243 370/311 |
| 2016/0037483 A1 * | 2/2016 | Du | H04W 4/06 370/252 |
| 2016/0087829 A1 * | 3/2016 | Jia | H04B 7/0452 375/267 |
| 2016/0219535 A1 * | 7/2016 | Zhang | H04W 72/02 |
| 2016/0226538 A1 * | 8/2016 | Kim | H04B 1/123 |
| 2016/0234735 A1 | 8/2016 | Kubota et al. | |
| 2016/0234759 A1 | 8/2016 | Kubota et al. | |
| 2016/0241323 A1 * | 8/2016 | Ko | H04B 7/06 |
| 2016/0255605 A1 | 9/2016 | Kyeong et al. | |

FOREIGN PATENT DOCUMENTS

| | | |
|---|---|---|
| EP | 2323426 A1 | 5/2011 |
| WO | WO-2013068368 A1 | 5/2013 |
| WO | WO 2013183966 A1 | 12/2013 |
| WO | WO-2014014317 A1 | 1/2014 |
| WO | WO-2014070048 A1 | 5/2014 |
| WO | WO 2014101619 A1 | 7/2014 |
| WO | WO 2014129951 A1 | 8/2014 |

OTHER PUBLICATIONS

ISA/EP, International Search Report and Written Opinion of the International Searching Authority, Int'l Application No. PCT/US2016/015990, dated Sep. 6, 2016, European Patent Office, Rijswijk, NL, 16 pgs.

IPEA/EP, Third Written Opinion of the International Preliminary Examining Authority, Int'l Application No. PCT/US2016/015990, dated May 10, 2017, European Patent Office, Munich, DE, 8 pgs.

* cited by examiner

ON-DEMAND SYSTEM INFORMATION

CROSS REFERENCES

The present application for Patent claims priority to U.S. Provisional Patent Application No. 62/114,157 by Kubota et al., entitled "On-Demand System Information," filed Feb. 10, 2015 and U.S. Provisional Patent Application No. 62/121,326 by Horn et al., entitled "Service Based System Information Acquisition," filed Feb. 26, 2015, assigned to the assignee hereof.

BACKGROUND

Field of the Disclosure

The present disclosure, for example, relates to wireless communication systems, and more particularly to the transmission of on-demand system information in a wireless communication system, such as a wireless communication system having a user equipment (UE)-centric network.

Description of Related Art

Wireless communication systems are widely deployed to provide various types of communication content such as voice, video, packet data, messaging, broadcast, and so on. These systems may be multiple-access systems capable of supporting communication with multiple users by sharing the available system resources (e.g., time, frequency, and power). Examples of such multiple-access systems include code-division multiple access (CDMA) systems, time-division multiple access (TDMA) systems, frequency-division multiple access (FDMA) systems, and orthogonal frequency-division multiple access (OFDMA) systems.

By way of example, a wireless multiple-access communication system may include a number of base stations, each simultaneously supporting communication for multiple communication devices, otherwise known as user equipments (UEs). A base station may communicate with UEs on downlink channels (e.g., for transmissions from a base station to a UE) and uplink channels (e.g., for transmissions from a UE to a base station).

In a wireless multiple-access communication system, each cell of a network may broadcast synchronization signals and system information for UEs to discover. Upon discovering the synchronization signals and system information broadcast by a particular cell, a UE may perform an initial access procedure to access the network via the cell. The cell via which the UE accesses the network may become the UE's serving cell. As the UE moves within the network, the UE may discover other cells (e.g., neighboring cells) and determine whether a handover of the UE to a neighboring cell or a cell reselection is warranted.

SUMMARY

The present disclosure generally relates to wireless communication systems, and more particularly to the transmission of on-demand system information in a wireless communication system, such as a wireless communication system having a user equipment (UE)-centric network. Wireless communication systems such as Long Term Evolution (LTE) communication systems or LTE-Advanced (LTE-A) communication systems have a network-centric network. In a wireless communication system having a network-centric network, the network perpetually broadcasts synchronization signals and system information for UEs to discover. Upon discovering the synchronization signals and system information broadcast by a particular cell, a UE may perform an initial access procedure to access the network via the cell. Once connected to the network, the UE may discover other cells as it moves within the network. The other cells may broadcast different synchronization signals or system information. A wireless communication system having a network-centric network therefore entails various signal broadcasts, which broadcasts consume power and may or may not be received or used by some or all of a cell's UEs.

A wireless communication system having a network-centric network also places relatively more of the network processing on UEs (e.g., a UE identifies a first serving cell upon initially accessing the network, and then identifies and monitors handover targets (other serving cells) as part of its mobility management). The present disclosure therefore describes a wireless communication system in which system information may be transmitted after being requested by one or more UEs. In some cases, the system information may be transmitted to a UE in a unicast or narrow-beam operation. In some cases, the wireless communication system in which the system information is transmitted may have a UE-centric network.

In a first set of illustrative examples, a method for wireless communication at a user equipment (UE) is described. In one configuration, the method may include receiving a first signal, where the first signal includes an indication of whether system information is to be requested by the UE, and obtaining system information in accordance with the indication.

In some embodiments of the method, obtaining system information may include sending a request for system information in accordance with the indication, and receiving system information in response to the request. In some embodiments of the method, obtaining system information may include receiving system information via a second signal in accordance with the indication. The second signal may be transmitted via a broadcast or broad-beam operation. In some embodiments of the method, receiving the first signal may include receiving information indicating where a request for system information is to be sent by the UE. In some embodiments of the method, receiving the first signal may include receiving information indicating a predetermined channel on which system information is to be transmitted via a second broadcast signal via a broadcast or broad-beam operation. In some embodiments of the method, the first signal may be a synchronization signal.

In some embodiments of the method, receiving the first signal may include receiving the first signal as part of a broad-beam operation in a massive multiple-input/multiple-output (MIMO) network. In these embodiments, obtaining system information may include receiving system information as part of a broad-beam or narrow-beam operation.

In some embodiments of the method, receiving the first signal may include receiving the first signal as part of a broadcast operation in a non-massive MIMO network. In some embodiments, obtaining system information may include receiving system information as part of a broadcast or unicast operation.

In some embodiments, the method may further include identifying one or more services for which system information is to be obtained, where obtaining the system information may include obtaining system information for the identified one or more services in accordance with the indication. In these examples, obtaining the system information may include sending a request for system information for the one or more services; and receiving the system information for the one or more services in response to the request. In some examples, obtaining the system information may include sending a separate request for system information for each of the one or more services, each request being for system information of a different service; and receiving, individually, system information for the one or more services in response to each request.

In some embodiments of the method, the indication may be a first indication, and receiving the first signal may include receiving a second indication that system information for the one or more services is to be broadcast at one or more predetermined times and on one or more predetermined channels.

In some embodiments of the method, the indication may be a first indication, and receiving the first signal may include receiving a second indication that system information for the one or more services is available. In these examples, obtaining system information may include sending one or more requests for system information for the one or more services in accordance with the first indication and the second indication; and receiving system information for the one or more services in response to the one or more requests. In some of these examples, receiving the first signal may include receiving information identifying a target device where one or more requests for system information for the one or more services are to be sent. In some examples, receiving the first signal may include receiving information identifying one or more time periods corresponding to when one or more requests for system information for the one or more services are to be sent, where each time period corresponds to a separate service of the one or more services. In some embodiments of the method, obtaining system information may include receiving system information for the one or more services via one or more second signals, the one or more second signals being transmitted via a broadcast or broad-beam operation.

In some embodiments of the method, obtaining system information may include receiving system information for the one or more services, where the system information includes information identifying the one or more services for which the system information is valid. Additionally or alternatively, obtaining system information may include receiving system information for one of the one or more services; determining whether additional system information for the one of the one or more services is needed; and requesting additional system information for the one of the one or more services based at least in part on the determining.

In some embodiments of the method, the one or more services may include one or more of an energy efficient service, a high reliability service, a low latency service, a broadcast service, or a small data service.

In some embodiments of the method, obtaining system information may include receiving system information for the one or more services, where the system information includes information identifying a validity time period; and re-obtaining system information for the one or more services upon expiration of the validity time period. The validity time period may be based on a power saving mode (PSM) time period or an amount of time to cycle through all value tags of the system information.

In a second set of illustrative examples, an apparatus for wireless communication at a UE is described. In one configuration, the apparatus may include means for receiving a first signal, where the first signal includes an indication of whether system information is to be requested by the UE, and means for obtaining system information in accordance with the indication. The means for obtaining system information may include means for sending a request for system information in accordance with the indication; and means for receiving system information in response to the request. In some embodiments of the method, the apparatus may further include means for identifying one or more services for which system information is to be obtained. In these cases, the means for obtaining the system information may include means for obtaining system information for the identified one or more services in accordance with the indication. In some examples, the apparatus may further include means for implementing one or more aspects of the method for wireless communication described above with respect to the first set of illustrative examples.

In a third set of illustrative examples, another apparatus for wireless communication at a UE is described. In one configuration, the apparatus may include a processor, memory in electronic communication with the processor, and instructions stored in the memory. The instructions may be executable by the processor to receive a first signal, where the first signal includes an indication of whether system information is to be requested by the UE, and to obtain system information in accordance with the indication. In some examples, the instructions may also be executable by the processor to implement one or more aspects of the method for wireless communication described above with respect to the first set of illustrative examples.

In a fourth set of illustrative examples, a non-transitory computer-readable medium storing computer-executable code for wireless communication at a UE is described. In one configuration, the code may be executable by a processor to receive a first signal, where the first signal includes an indication of whether system information is to be requested by the UE, and to obtain system information in accordance with the indication. In some examples, the code may also be used to implement one or more aspects of the method for wireless communication described above with respect to the first set of illustrative examples.

In a fifth set of illustrative examples, another method for wireless communication is described. In one configuration, the method may include transmitting a first signal, where the first signal includes an indication of whether system information is to be requested by a UE, and transmitting system information in accordance with the indication.

In some embodiments, the method may include receiving a request for system information in accordance with the indication, and transmitting system information in response to the request. In some embodiments of the method, transmitting system information may include transmitting system information via a second signal in accordance with the indication, where the second signal is transmitted via a broadcast or broad-beam operation. In some embodiments, the method may include including, in the first signal, information indicating where a request for system information is to be sent. In some embodiments, the method may include including, in the first signal, information indicating a predetermined channel on which system information is to be transmitted via a broadcast or broad-beam operation.

In some embodiments of the method, transmitting system information may include transmitting system information in accordance with the indication and a transmission mode. In some embodiments, the method may include changing the transmission mode to be a broadcast or broad-beam mode targeting a cell edge and having fixed periodic scheduling. In some embodiments, the method may include changing the transmission mode to be a broadcast or broad-beam mode targeting a cell edge and having an on-demand periodic scheduling triggered by a request for system information in accordance with the indication. In some embodiments, the method may include changing the transmission mode to be a broadcast or broad-beam mode having an on-demand aperiodic scheduling triggered by a request for system information in accordance with the indication. In some embodiments, the method may include changing the transmission mode to be a unicast or narrow-beam mode having an on-demand aperiodic scheduling triggered by a request for system information in accordance with the indication. In some embodiments, the method may include changing the transmission mode based on network load or congestion status. In some embodiments of the method, the first signal may be a synchronization signal.

In some embodiments, the method may include using a broad-beam operation to transmit the first signal in a massive MIMO network. In some of these examples, the method may include using a broad-beam or narrow-beam operation to transmit system information, in accordance with the indication and a transmission mode.

In some embodiments, the method may include using a broadcast operation to transmit the first signal in a non-massive MIMO network. In some of these examples, the method may include using a broadcast or unicast operation to transmit system information, in accordance with the indication and a transmission mode.

In some embodiments of the method, transmitting system information may include transmitting, in accordance with the indication, system information associated with services available to the UE, where separate transmissions are used to transmit the system information for different services and different configurations of services. In some embodiments, the method may include receiving a request for system information for one or more services in accordance with the indication; and transmitting system information for the one or more services in response to the request. In some embodiments, the method may include receiving multiple requests for system information for one or more services in accordance with the indication, each request being from the UE and being for system information of a different service; and transmitting system information for the one or more services in response to the request. In these examples, transmitting system information in response to the request may include transmitting system information for each of the one or more services in a joint transmission. Alternatively, transmitting system information in response to the request may include transmitting system information for each of the one or more services in separate transmissions.

In some embodiments, the indication may be a first indication, and the method may further include including, in the first signal, a second indication that system information for one or more services is to be broadcast at one or more predetermined times and on one or more predetermined channels. In some embodiments, the indication may be a first indication, and the method may further include including, in the first signal, a second indication that system information for one or more services is available to be requested. In some of these examples, the method may include receiving one or more requests for system information for one or more services in accordance with the first indication and the second indication. In some examples, the method may further include including, with the first signal, information indicating where and when one or more requests for system information for one or more services are to be sent.

In some embodiments, the method may further include including, in the system information, information indicating one or more services for which the system information is valid. In some embodiments, the method may further include including, in the system information, information indicating a duration of time for which the system information is valid, where the system information for different services and different configurations of services includes different durations of time. In some embodiments, the method may further include receiving one or more requests for system information for one or more services in accordance with the indication without having included in the first signal a second indication of which services system information is available. In some embodiments, the method may further include receiving one or more requests for system information in accordance with the indication; and identifying the system information to be sent pertaining to different services based at least in part on transmission resources used by the one or more requests. In some embodiments, the method may further include changing the indication to indicate that system information is to be transmitted via either a broadcast or broad-beam operation or via a unicast or narrow-beam operation.

In a sixth set of illustrative examples, another apparatus for wireless communication is described. In one configuration, the apparatus may include means for transmitting a first signal, where the first signal includes an indication of whether system information is to be requested by a UE, and means for transmitting system information in accordance with the indication. In some embodiments, the apparatus may further include means for receiving a request for system information in accordance with the indication; and means for transmitting system information in response to the request. In some embodiments, the means for transmitting system information may include means for transmitting, in accordance with the indication, system information associated with services available to the UE, where separate transmissions are used to transmit the system information for different services and different configurations of services. In some examples, the apparatus may further include means for implementing one or more aspects of the method for wireless communication described above with respect to the fifth set of illustrative examples.

In a seventh set of illustrative examples, another apparatus for wireless communication is described. In one configuration, the apparatus may include a processor, memory in electronic communication with the processor, and instructions stored in the memory. The instructions may be executable by the processor to transmit a first signal, where the first signal including an indication of whether system information is to be requested by a user equipment UE, and to transmit system information in accordance with the indication. In some examples, the instructions may also be executable by the processor to implement one or more aspects of the method for wireless communication described above with respect to the fifth set of illustrative examples.

In an eighth set of illustrative examples, another non-transitory computer-readable medium storing computer-executable code for wireless communication is described. In one configuration, the code may be executable by a processor to transmit a first signal, where the first signal including an indication of whether system information is to be requested by a UE, and to transmit system information in accordance with the indication. In some examples, the code may also be used to implement one or more aspects of the method for wireless communication described above with respect to the fifth set of illustrative examples.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purpose of illustration and description only, and not as a definition of the limits of the claims.

BRIEF DESCRIPTION OF THE DRAWINGS

A further understanding of the nature and advantages of the present disclosure may be realized by reference to the following drawings. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

Figure 1:
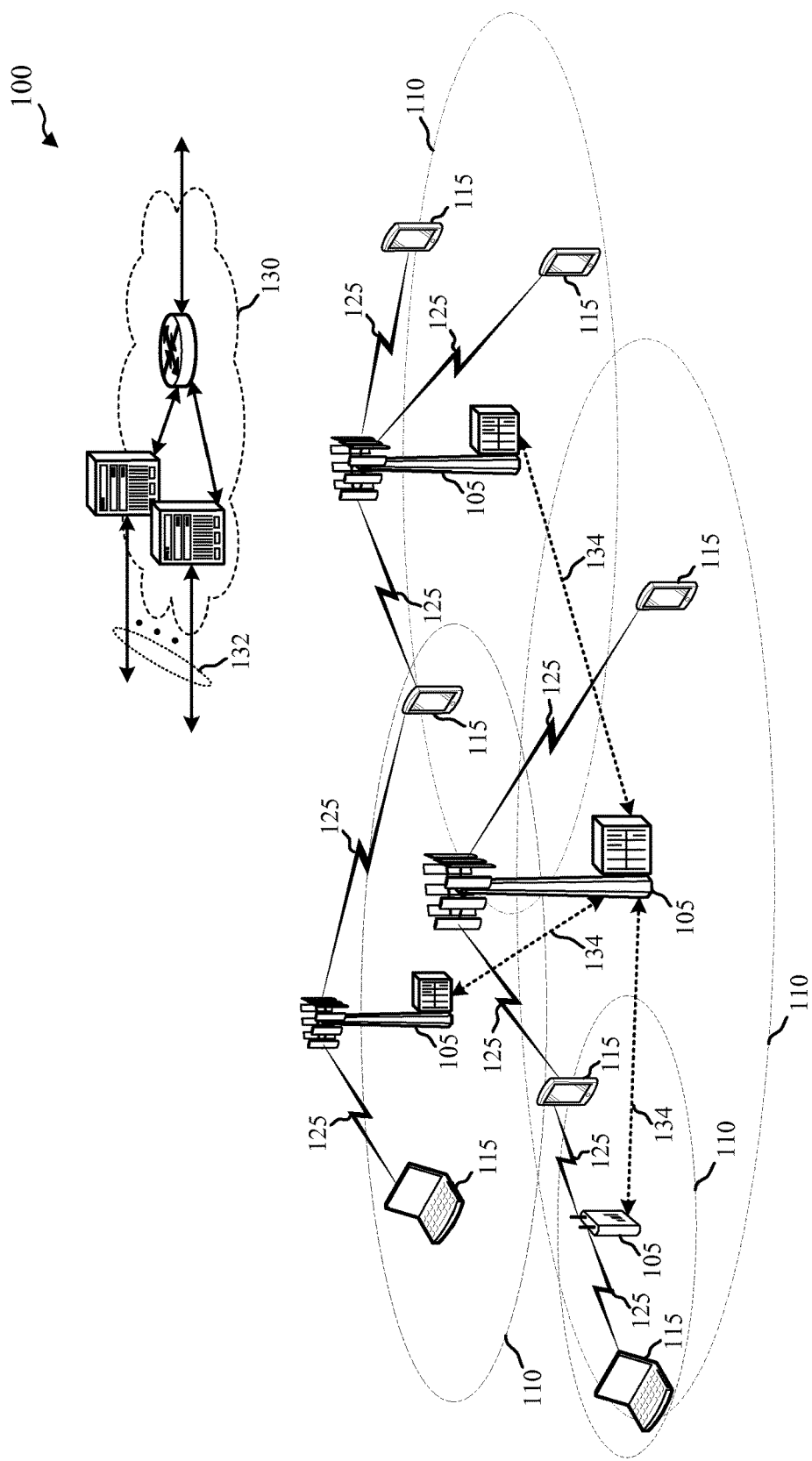
FIG. 1 illustrates an example of a wireless communication system in accordance with various aspects of the present disclosure.

The described features may generally be implemented in a wireless communication system having a user equipment (UE)-centric network. A UE-centric network may be deployed, in some cases: as a plurality of base stations in which each of one or more base stations are associated with a number of transceivers co-located with base station servers; as a plurality of base stations in which each of one or more base stations are associated with a number of remote transceivers (e.g., a number of remote radio heads (RRHs) located remotely from base station servers; as a number of zones in which each zone is defined by the coverage area(s) of one or more cells or base stations; or as a combination thereof. A wireless communication system having a UE-centric network may be advantageous, in some respects, in a time-division duplex (TDD) system having a large antenna array, which large antenna array may have limited coverage for broadcast channels (e.g., the channels that broadcast synchronization signals and system information in a wireless communication system having a network-centric network).

As described in the present disclosure, a wireless communication system having a UE-centric network may forego the broadcast of system information. A wireless communication system having a UE-centric network may also be advantageous, in some respects, because the broadcast of system information by a base station can contribute significantly to the power consumption of the base station.

In one aspect of the disclosure, for example, a wireless network may provide system information by either a fixed periodic broadcast or broad-beam transmission or in response to a request by a UE. The wireless network may broadcast (or broad-beam transmit) a synchronization signal, for example, that indicates to the UEs within a cell or zone coverage area that system information is to be transmitted on a fixed periodic schedule, or in response to a request sent by one or more UEs. In an "on-demand" system, wherein the UEs request the transmission of system information, the system information may be transmitted as either a periodic broadcast or broad-beam transmission, as an aperiodic broadcast or broad-beam transmission, or as an aperiodic unicast or narrow-beam transmission.

In another aspect of the disclosure, a wireless network may provide service-specific system information. The service-specific system information may be provided as a broadcast or upon receipt of a request from a UE. In an on-demand system, the wireless network may broadcast (or broad-beam transmit) a synchronization signal, for example, that indicates to the UEs within a cell or zone coverage area that service-specific system information is available for the UEs to request. UEs may then transmit one or more requests for service-specific system information, and may receive the system information for the identified services. Alternatively, in a broadcast system, the wireless network may broadcast (or broad-beam transmit) a synchronization signal, for example, that indicates to the UEs within a cell or zone coverage area that service-specific system information is to be transmitted on a fixed periodic schedule based on the corresponding service. Thus, a UE requiring system information for a given service can learn from the synchronization signal the time or times during which the UE may listen to receive the service-specific system information. Service-specific system information may be transmitted jointly or in separate transmissions corresponding to the service.

In another aspect of the disclosure, a wireless network may provide system information to a UE incrementally. For example, the wireless network may transmit master system information, followed by one or more transmissions of other system information (e.g., non-master system information). The master system information may include, for example, system information that allows a UE to perform an initial access of a network. The master system information or other system information may be broadcast, broad-beam transmitted, unicast, or narrow-beam transmitted to a number of UEs. In some cases, the master system information or other system information may be transmitted on a fixed periodic schedule, or in response to a request sent by one or more UEs. In various embodiments, the master system information and other system information may be transmitted in the same, similar, or different ways.

In yet another aspect of the disclosure, for example, a wireless network may indicate when system information has changed or should be updated. In this manner, a UE need not update its stored system information every time system information is transmitted, but may instead update its stored system information on an "as needed" basis. A UE may also initiate an update of its stored system information upon the occurrence of one or more events, such as: a determination that the UE has moved a certain distance since last updating its stored system information, or a determination that the UE has moved into a new zone.

Techniques described herein may be used for various wireless communication systems such as code-division multiple access (CDMA) systems, time-division multiple access (TDMA) systems, frequency-division multiple access (FDMA) systems, orthogonal frequency-division multiple access (OFDMA) systems, and single carrier frequency-division multiple access (SC-FDMA) systems, and other systems. The terms "system" and "network" are often used interchangeably. A CDMA system may implement a radio technology such as CDMA2000, Universal Terrestrial Radio Access (UTRA), etc. CDMA2000 covers IS-2000, IS-95, and IS-856 standards. IS-2000 Releases 0 and A are commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM). An OFDMA system may implement a radio technology such as Ultra Mobile Broadband (UMB), Evolved UTRA (E-UTRA), IEEE 802.11 (Wi-Fi), IEEE 802.16 (WiMAX), IEEE 802.20, Flash-OFDM™, etc. UTRA and E-UTRA are part of Universal Mobile Telecommunication System (UMTS). Long Term Evolution (LTE) and LTE-Advanced (LTE-A) are newer releases of UMTS that use E-UTRA. UTRA, E-UTRA, UMTS, LTE, LTE-A, and GSM are described in documents from an organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies, including cellular (e.g., LTE) communications over a shared radio frequency spectrum band. The description below, however, describes an LTE/LTE-A system for purposes of example, and LTE terminology is used in much of the description below, although the techniques are applicable beyond LTE/LTE-A applications (e.g., to 5G networks or other next generation communication systems).

The following description provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in other examples.

FIG. 1 illustrates an example of a wireless communication system 100 in accordance with various aspects of the present disclosure. The wireless communication system 100 may include one or more base stations 105, one or more UEs 115, and a core network 130. The core network 130 may provide user authentication, access authorization, tracking, internet protocol (IP) connectivity, and other access, routing, or mobility functions. The base stations 105 may interface with the core network 130 through backhaul links 132 (e.g., S1, etc.). The base stations 105 may perform radio configuration and scheduling for communication with the UEs 115, or may operate under the control of a base station controller (not shown). In various examples, the base stations 105 may communicate, either directly or indirectly (e.g., through core network 130), with one another over backhaul links 134 (e.g., X1, etc.), which may be wired or wireless communication links.

The base stations 105 may wirelessly communicate with the UEs 115 via one or more antennas. In some examples, the one or more antennas may include one or more base station antennas (and transceivers) co-located with base station servers and/or one or more RRH antennas (and transceivers) located remotely from base station servers. Each of the base stations 105 may provide communication coverage for a respective geographic coverage area 110. In some examples, base stations 105 may be referred to as a base transceiver station, a radio base station, an access point, a radio transceiver, a NodeB, eNodeB (eNB), Home NodeB (HNB), a Home eNodeB, or some other suitable terminology. The geographic coverage area 110 for a base station 105 may be divided into sectors making up only a portion of the coverage area (not shown). The geographic coverage area(s) 110 of for one or more base stations 105 may define a zone of the wireless communication system 100. The wireless communication system 100 may include base stations 105 of different types (e.g., macro or small cell base stations). There may be overlapping geographic coverage areas 110 for different technologies.

In some examples, the wireless communication system 100 may be or include an LTE or LTE-A network. The wireless communication system 100 may also be or include a next generation network, such as a 5G wireless communication network. In LTE/LTE-A and 5G networks, the term evolved node B (eNB) may be generally used to describe the base stations 105, while the term UE may be generally used to describe the UEs 115. The wireless communication system 100 may be a heterogeneous LTE/LTE-A or 5G network in which different types of eNBs provide coverage for various geographical regions. For example, each eNB or base station 105 may provide communication coverage for a macro cell, a small cell, or other types of cell. The term "cell" is a 3GPP term that can be used to describe a base station, a carrier or component carrier associated with a base station, or a coverage area (e.g., sector, etc.) of a carrier or base station, depending on context.

A macro cell may generally cover a relatively large geographic area (e.g., several kilometers in radius) and may allow unrestricted access by UEs 115 with service subscriptions with the network provider. A small cell may include a lower-powered base station, as compared with a macro cell, that may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs 115 with service subscriptions with the network provider. A femto cell may also cover a small geographic area (e.g., a home) and may provide restricted access by UEs 115 having an association with the femto cell (e.g., UEs 115 in a closed subscriber group (CSG), UEs 115 for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells.

The communication networks that may accommodate some of the various disclosed examples may be packet-based networks that operate according to a layered protocol stack and data in the user plane may be based on the IP. A radio link control (RLC) layer may perform packet segmentation and reassembly to communicate over logical channels. A MAC layer may perform priority handling and multiplexing of logical channels into transport channels. The MAC layer may also use HARQ to provide retransmission at the MAC layer to improve link efficiency. In the control plane, the radio resource control (RRC) protocol layer may provide establishment, configuration, and maintenance of an RRC connection between a UE 115 and the base stations 105. The RRC protocol layer may also be used for core network 130 support of radio bearers for the user plane data. At the physical (PHY) layer, the transport channels may be mapped to physical channels.

The UEs 115 may be dispersed throughout the wireless communication system 100, and each UE 115 may be stationary or mobile. A UE 115 may also include or be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. A UE 115 may be a cellular phone, a smart phone, a personal digital assistant (PDA), a wireless modem, a wireless communication device, a handheld device, a tablet computer, a laptop computer, a cordless phone, a wireless local loop (WLL) station, a data card, a Universal Serial Bus (USB) dongle, a wireless router, etc. A UE 115 may be able to communicate with various types of base stations and network equipment including macro eNBs, small cell eNBs, relay base stations, and the like. As a UE 115 moves within the wireless communication system 100, the UE 115 may move from cell to cell or from zone to zone (with a zone including one or more cells). When the wireless communication system 100 is deployed as a UE-centric network, a UE 115 may move from cell to cell within a zone without a physical channel reconfiguration, with the network providing data transfer services via the same radio resources despite a change in the UE's serving cell.

The wireless communication links 125 shown in wireless communication system 100 may carry uplink (UL) transmissions from a UE 115 to a base station 105, or downlink (DL) transmissions, from a base station 105 to a UE 115. The downlink transmissions may also be called forward link transmissions while the uplink transmissions may also be called reverse link transmissions. Each of the wireless communication links 125 may include one or more carriers, where each carrier may be a signal made up of multiple sub-carriers (e.g., waveform signals of different frequencies) modulated according to the various radio technologies described above. Each modulated signal may be sent on a different sub-carrier and may carry control information (e.g., reference signals, control channels, etc.), overhead information, user data, etc. The wireless communication links 125 may transmit bidirectional communications using frequency division duplex (FDD) (e.g., using paired spectrum resources) or TDD operation (e.g., using unpaired spectrum resources). Frame structures may be defined for FDD (e.g., frame structure type 1) and TDD (e.g., frame structure type 2).

In some embodiments of the wireless communication system 100, base stations 105 or UEs 115 may include multiple antennas for employing antenna diversity schemes to improve communication quality and reliability between base stations 105 and UEs 115. Additionally or alternatively, base stations 105 or UEs 115 may employ multiple input multiple output (MIMO) techniques (e.g., any MIMO but not massive MIMO (e.g. multi-antenna MIMO and multi-user MIMO) techniques or massive MIMO techniques) that may take advantage of multi-path environments to transmit multiple spatial layers carrying the same or different coded data.

Wireless communication system 100 may support operation on multiple cells or carriers, a feature which may be referred to as carrier aggregation (CA) or multi-carrier operation. A carrier may also be referred to as a component carrier (CC), a layer, a channel, etc. The terms "carrier," "component carrier," "cell," and "channel" may be used interchangeably herein. A UE 115 may be configured with multiple downlink CCs and one or more uplink CCs for carrier aggregation. Carrier aggregation may be used with both FDD and TDD component carriers.

In some embodiments of the wireless communication system 100, the wireless communication system 100 may have a UE-centric network. On the network side, the base stations 105 may broadcast a periodic synchronization (sync) signal. The UEs 115 may receive the sync signal, acquire a timing of the network from the sync signal, and in response to acquiring the timing of the network, transmit a pilot signal. The pilot signal transmitted by a UE 115 may be concurrently receivable by a plurality of cells (e.g., base stations 105) within the network. Each of the plurality of cells may measure a strength of the pilot signal, and the network (e.g., one or more of the base stations 105, each in communication with the UE 115 via one or more centrally-located transceivers and/or RRHs, and/or a central node within the core network 130) may determine a serving cell for the UE 115. As the UE 115 continues to transmit a pilot signal, the network may handover the UE 115 from one serving cell to another, with or without informing the UE 115. System information (SI) may be transmitted to the UEs 115 in a broadcast mode (e.g., where a base station 105 transmits SI regardless of whether the SI is requested or needed by any UE 115 within the coverage area 110 of the base station 105) or in an on-demand mode (e.g., where a base station 105 transmits SI in response to receiving a request for SI from one or more UEs 115, which request may be included in, or be, the pilot signal of a UE 115). When transmitting SI in an on-demand mode, a base station 105 may forego the broadcast of SI, which may conserve power.

Figure 2:
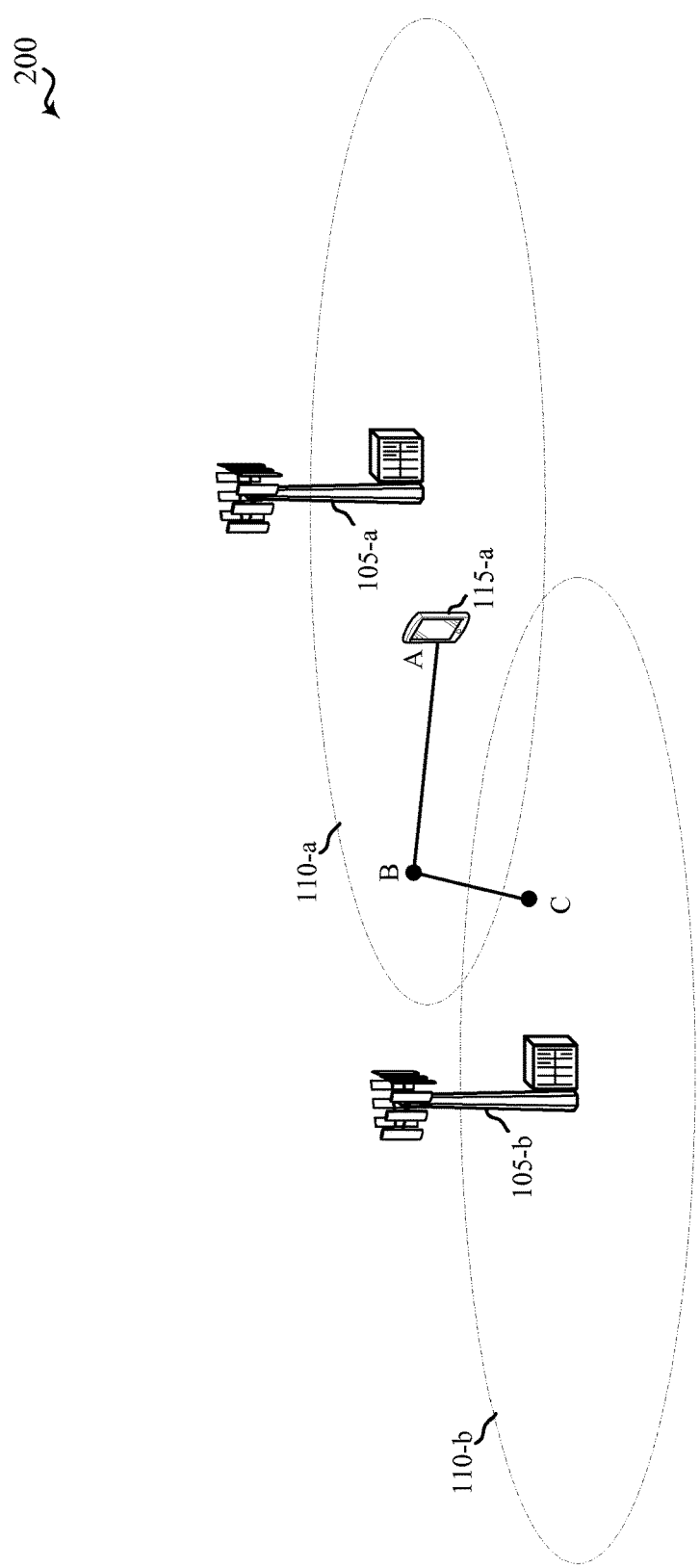
FIG. 2 shows an example of user equipment (UE) mobility within a wireless communication system in accordance with various aspects of the present disclosure.

FIG. 2 shows an example of UE mobility within a wireless communication system 200 in accordance with various aspects of the present disclosure. More particularly, FIG. 2 shows a UE 115-a as it moves to various points (e.g., point A, point B, and point C) within the coverage areas 110-a and 110-b of respective first and second base stations 105-a and 105-b. In some examples, the UE 115-a may be an example of one or more aspects of the UEs 115 described with reference to FIG. 1, and the first and second base stations 105-a and 105-b may be examples of one or more aspects of the base stations 105 described with reference to FIG. 1.

By way of example, the UE 115-a may be powered on within the coverage area 110-a of the first base station 105-a and may perform an initial acquisition of SI within the coverage area 110-a of the first base station 105-a. In some examples, the UE 115-a may perform an initial acquisition of SI by receiving an instance of a periodic sync signal from the first base station 105-a; determining, from the sync signal, where and when to listen for a broadcast of SI by the first base station 105-a; and then listening for and receiving the SI broadcast by the first base station 105-a. In other examples, the UE 115-a may perform an initial acquisition of SI by receiving an instance of a periodic sync signal from the first base station 105-*a*; determining, from the sync signal, where and when to listen for a broadcast of SI by the first base station 105-*a* and, in some cases, where and when to transmit a request for SI; transmitting a request for SI; and then listening for and receiving the SI broadcast by the first base station 105-*a*. In still other examples, the UE 115-*a* may perform an initial acquisition of service-specific SI by determining from a periodic sync signal received from the first base station 105-*a* that service-specific SI is available to receive either via broadcast or via request, and then either listening for the service-specific SI or requesting the service-specific SI.

While still at point A, the UE 115-*a* may determine to reacquire SI based on the expiration of dynamic SI, or based on an elapsed time since last acquiring SI. The UE 115-*a* may also reacquire SI, at point A, after receiving an instance of a sync signal indicating that SI has changed. In other embodiments, the UE 115-*a* may not reacquire SI at point A.

Upon moving from point A to point B, the UE 115-*a* may determine to reacquire SI. The UE 115-*a* may determine to reacquire SI, for example, based on its movement, based on the distance between point A and point B, based on the expiration of dynamic SI, or based on an elapsed time since last acquiring SI. The UE 115-*a* may also reacquire SI, at point B, after receiving an instance of a sync signal indicating that SI has changed. In other embodiments, the UE 115-*a* may not reacquire SI at point B.

Upon moving from point B to point C, and into the coverage area 110-*b* of the second base station 105-*b*, the UE 115-*a* may perform an initial acquisition of SI from the second base station 105-*b*. In other embodiments, the UE 115-*a* need not acquire SI from the second base station 105-*b* unless one of the reasons for reacquiring SI at point B arises. In some cases, SI may not be acquired at the coverage area 110-*b* because the first coverage area 110-*a* and the second coverage area 110-*b* are configured to operate as members of a common zone, such that data transfer services for the UE 115-*a* are provided by the network.

FIG. 2 illustrates that SI may be acquired during various UE mobility states, and for various reasons. For example, SI may be acquired when a UE is unattached to a network (e.g., as part of an initial acquisition of SI). SI may also be acquired after a UE attaches to a network and while the UE is stationary (e.g., because a timer or SI has expired, or because the network has indicated (e.g., in an instance of a sync signal or in a paging message) that SI has changed). SI may also be acquired after a UE attaches to a network and while the UE is mobile (e.g., for any of the reasons that SI is reacquired while the UE is stationary, because the UE has moved to a new location, because the UE has moved a certain distance from a previous location at which SI was acquired, or because the UE has moved to a coverage area of a new base station or cell).

Figure 3A:
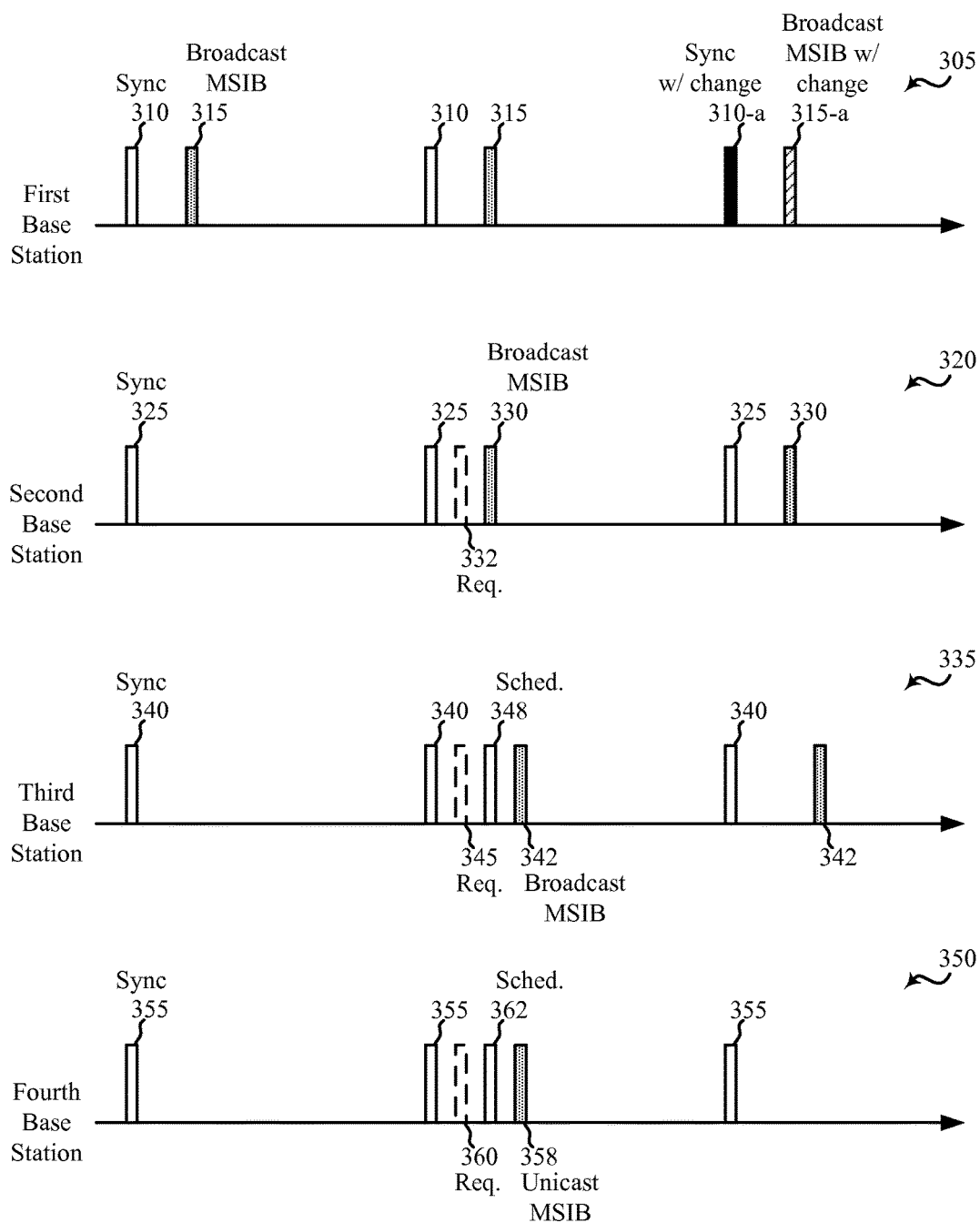
FIGS. 3A and 3B illustrate example transmission/reception timelines of a respective first base station, second base station, third base station, fourth base station, fifth base station, and sixth base station, in accordance with various aspects of the present disclosure.
Figure 3B:
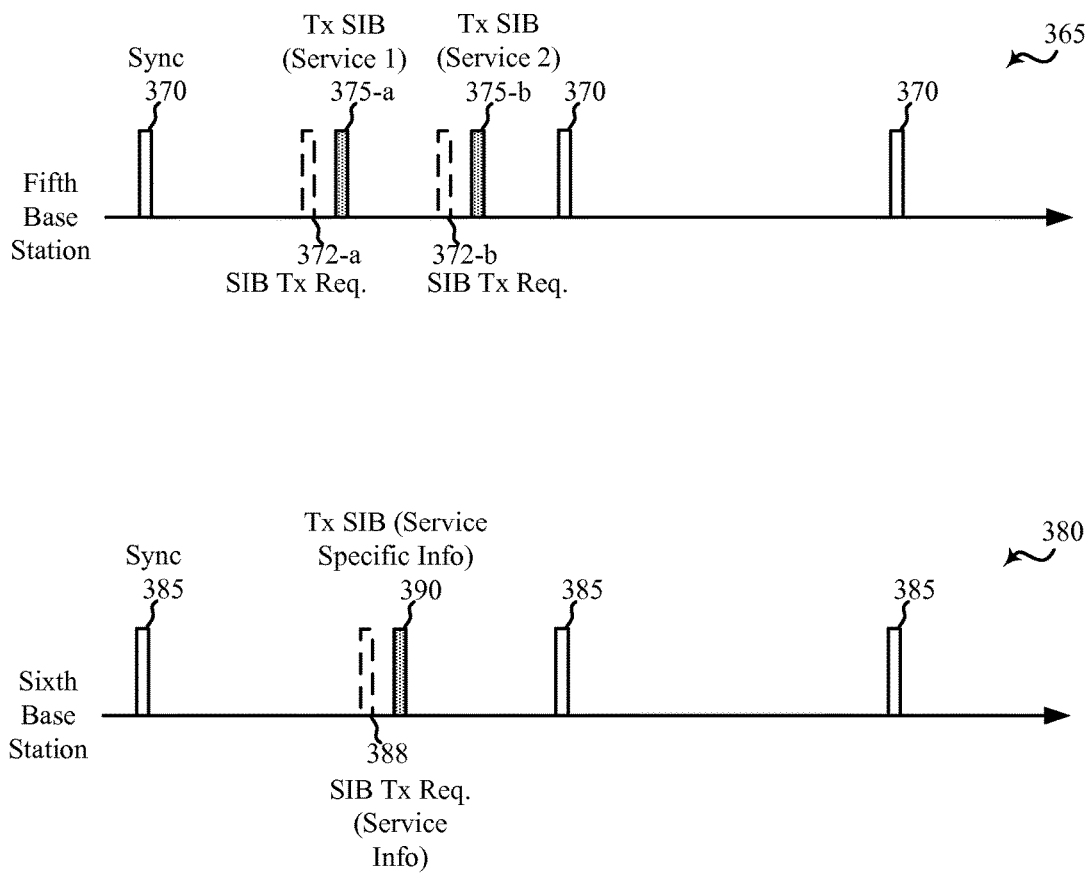

FIG. 3A and FIG. 3B illustrate example transmission/reception timelines 305, 320, 335, 350, 365, and 380 of a respective first base station, second base station, third base station, fourth base station, fifth base station, and sixth base station, in accordance with various aspects of the present disclosure. The transmissions of the base stations may be received by one or more UEs and used, by the UE(s), during initial SI acquisition (e.g., SI acquisition during system selection or mobility to a new cell or zone) or an SI change acquisition (e.g., upon a change of SI, or upon expiration of dynamic SI). In some examples, the base stations may belong to respective different cells or zones of a wireless communication system, such as different cells or zones of the wireless communication system 100 or 200 described with reference to FIG. 1 or 2. In some examples, the first base station, second base station, third base station, fourth base station, fifth base station, and sixth base station may be examples of one or more aspects of the base stations 105 described with reference to FIG. 1.

As shown in FIGS. 3A and 3B, each of the base stations may transmit a periodic sync signal (Sync) 310, 325, 340, 355, 370, or 385. In the examples of FIG. 3A, each of the base stations also transmits a periodic or on-demand master system information block (MSIB) 315, 330, 342, or 358. In some cases, an instance of a sync signal and an instance of an MSIB, together, may provide information equivalent to the information included in an LTE/LTE-A master information block (MIB), system information block 1 (SIB1), and SIB2. In the examples of FIG. 3B, each of the base stations transmits a service-specific SIB 375, 390.

In some embodiments, a sync signal transmitted by a base station may be common (e.g., non-cell-specific) to a plurality of cells within an access network (e.g., to a plurality of cells within a zone), and may be broadcast from each of the cells in the plurality of cells (e.g., from each of a plurality of base stations in the cells) in a single frequency network (SFN) manner. The sync signal need not include a cell identifier. In some embodiments, the sync signal may have a relatively short duration or be transmitted relatively infrequently. For example, the sync signal may have a duration of one symbol and be transmitted once every ten seconds. In other examples, the sync signal may be transmitted more frequently, such as once per radio frame. In some embodiments, an instance of a sync signal may carry a few bits of information. More particularly, and in some embodiments, an instance of a sync signal may include information such as: information that a UE may use to determine whether to request a subsequently transmitted MSIB, information that a UE may use to determine where and when to request the subsequently transmitted MSIB (e.g., frequency and timing information for transmitting an MSIB transmission request), information that a UE may use to determine where and when the subsequently transmitted MSIB may be received (e.g., channel, frequency, and/or timing information), information that indicates when an MSIB has changed, or information that a UE may use to distinguish the cell or zone transmitting the sync signal from one or more other cells or zones (e.g., from neighboring cells or zones). In some embodiments, an instance of a sync signal may include information that a UE may use to determine whether to request subsequently transmitted service-specific SIB, information that a UE may use to determine where and when to request the subsequently transmitted service-specific SIB (e.g., frequency and timing information for transmitting a service-specific SIB transmission request), or information that a UE may use to determine where and when the subsequently transmitted service-specific SIB may be received (e.g., channel, frequency, and/or timing information).

In some embodiments, a sync signal may indicate a PHY layer channel on which an MSIB or service-specific SIB transmission request is to be transmitted, or indicate a special PHY layer channel for the transmission of an MSIB or service-specific SIB transmission request under certain conditions. In some cases, a sync signal may also indicate how to transmit an MSIB or service-specific SIB transmission request (e.g., a format to be used when transmitting an MSIB or service-specific SIB transmission request), or how to transmit an MSIB or service-specific SIB transmission request under certain conditions. In other embodiments, a sync signal may specify fewer parameters for the transmission of an MSIB or service-specific SIB transmission request. However, this may necessitate the base station listening for MSIB or service-specific SIB transmission requests under more conditions (or always), which may impact UE relay energy efficiency.

A UE may receive an instance of a sync signal and acquire a timing of an access network based on the sync signal. In response to acquiring the timing of the access network, the UE may transmit a pilot signal. The pilot signal may be concurrently receivable by a plurality of cells within the access network (e.g., by a plurality of cells within a zone of the access network). In some embodiments, the pilot signal may include a spatial signature (e.g., a sounding reference signal (SRS)). In some embodiments, the pilot signal may be transmitted in an MSIB transmission request occasion indicated by an instance of the sync signal. In some embodiments, the pilot signal may be transmitted with a predetermined random sequence or a random sequence generated by the UE, which random sequence may be used by the access network (e.g., a base station of the network) to temporarily identify the UE during an initial acquisition procedure. In some embodiments, the pilot signal may be or include the MSIB transmission request.

An MSIB 315, 330, 342, or 358 may indicate where and when a UE may establish a connection with an access network. An MSIB may include information such as: information identifying an access network, cell, or zone; information indicating whether a UE is allowed to (or should) use the access network; or information indicating how a UE may use the access network (e.g., information indicating how a UE may use the access network when the UE powers up, or when the UE moves to a new cell or zone after detecting an out-of-service (OoS) or radio link failure (RLF) event). The information identifying an access network, cell, or zone may include a public land mobile network (PLMN) identifier (ID), a tracking area code (TAC), a cell identifier (cell ID), or a zone identifier (zone ID). The information indicating whether a UE is allowed to (or should) use the access network may include system selection or access restriction information for a cell or zone (e.g., radio quality information, congestion avoidance information, or closed subscriber group (CSG) information). The information indicating how a UE may use the access network may include access configuration information (e.g., random access channel (RACH) information, or UE-timers and constants information). The MSIB may also include PHY layer configuration information such as: physical random access channel (PRACH) information, physical downlink shared channel (PDSCH) information, physical downlink control channel (PDCCH) information, physical uplink shared channel (PUSCH) information, physical uplink control channel (PUCCH) information, and SRS information, or other information usable to access a PHY layer of the wireless communication system.

A service-specific SIB 375, 390 may indicate where and when a UE may establish a connection with an access network for a specific service. Specific services may include, for example, an energy efficient service, a high reliability service, a low latency service, a broadcast service, or a small data service. These services may require additional SI (e.g., SI that is not included in an MSIB) in order to allow the UE to access the network. For example, a multimedia broadcast multicast service (MBMS) in LTE may have additional configuration information in SIB 13 that is related to accessing an MBMS. Additionally, as radio access technologies evolve, it may be desirable to not only enable the transmission of additional SI for specific services, but to also enable the transmission of different configurations of the same service-specific SI for improving performance of the different services. The additional service-specific SI may include, for example, information on identifying the access network and cell (e.g., PLMN ID, TAC, or cell ID). The additional service-specific SI may also include information and access restrictions for a cell (including radio quality, congestion avoidance, CSG). The additional service-specific SI may further include information on access configuration (RACH, UE-timers and constraints and other 5G network equivalents).

For example, a service-specific SIB may include information to enable more efficient access configurations and longer validity timers for SI in a wide area network (WAN) internet of everything (IOE) where lower power operations may be desirable as IOE devices may not connect with the network until after long sleep periods. Additionally, services such as WAN IOE may include different information in an MSIB to avoid requiring an IOE device to read additional SI.

Turning now to the transmission/reception timeline 305 of the first base station (in FIG. 3A), the first base station may transmit a periodic sync signal 310 as previously described. Upon receiving an instance of the sync signal, a UE needing to perform initial acquisition may identify an access network associated with the first base station (and in some cases, information to differentiate the first base station, its cell, or its zone from other base stations, cells, or zones); determine whether the UE can (or should) acquire SI of the access network; and determine how the UE can acquire SI of the access network. When determining how the UE can acquire SI of the access network, the UE may determine, via signaling associated with the sync signal, that the first base station transmits an MSIB 315 in a broadcast (or broad-beam) transmission mode with fixed periodic signaling. The UE may also identify, from the sync signal, a time for receiving the MSIB transmission. A UE that does not need to perform initial acquisition may determine, from the sync signal, whether it has moved to a new cell or new zone. When a UE determines that it has moved to a new cell or new zone, the UE may use information included in the sync signal to acquire new or updated SI from the new cell or new zone.

With reference to the transmission/reception timeline 320 of the second base station (of FIG. 3A), the second base station may transmit a periodic sync signal 325 as previously described. Upon receiving an instance of the sync signal, a UE needing to perform initial acquisition may identify an access network associated with the second base station (and in some cases, information to differentiate the second base station, its cell, or its zone from other base stations, cells, or zones); determine whether the UE can (or should) acquire SI of the access network; and determine how the UE can acquire SI of the access network. When determining how the UE can acquire the SI of access network, the UE may determine, via signaling associated with the sync signal, that the second base station transmits an MSIB 330 in an on-demand broadcast (or broad-beam) transmission mode with periodic signaling (i.e., that the second base station will start a broadcast (or broad-beam) transmission of the MSIB, with a periodic scheduling, upon receiving an MSIB transmission request signal 332 from the UE). The UE may also identify, from the sync signal, where and when to transmit the MSIB transmission request, and a time for receiving the MSIB transmission. A UE that does not need to perform initial acquisition may determine, from the sync signal, whether it has moved to a new cell or new zone. When a UE determines that it has moved to a new cell or new zone, the UE may use information included in the sync signal to acquire new or updated SI from the new cell or new zone.

With reference to the transmission/reception timeline 335 of the third base station (of FIG. 3A), the third base station may transmit a periodic sync signal 340 as previously described. Upon receiving an instance of the sync signal, a UE needing to perform initial acquisition may identify an access network associated with the third base station (and in some cases, information to differentiate the third base station, its cell, or its zone from other base stations, cells, or zones); determine whether the UE can (or should) acquire SI of the access network; and determine how the UE can acquire SI of the access network. When determining how the UE can acquire SI of the access network, the UE may determine, via signaling associated with the sync signal, that the third base station transmits an MSIB 342 in an on-demand broadcast (or broad-beam) transmission mode with aperiodic signaling (i.e., that the third base station will schedule a broadcast (or broad-beam) transmission of the MSIB upon receiving an MSIB transmission request signal 345 from the UE, and that the UE may monitor a scheduling channel (e.g., a PDCCH) for scheduling information (Sched.) 348 to determine when the MSIB will be transmitted). The UE may also identify, from the sync signal, where and when to transmit the MSIB transmission request. A UE that does not need to perform initial acquisition may determine, from the sync signal, whether it has moved to a new cell or new zone. When a UE determines that it has moved to a new cell or new zone, the UE may use information included in the sync signal to acquire new or updated SI from the new cell or new zone.

With reference to the transmission/reception timeline 350 of the fourth base station (of FIG. 3A), the fourth base station may transmit a periodic sync signal 355 as previously described. Upon receiving an instance of the sync signal, a UE needing to perform initial acquisition may identify an access network associated with the fourth base station (and in some cases, information to differentiate the fourth base station, its cell, or its zone from other base stations, cells, or zones); determine whether the UE can (or should) acquire SI of the access network; and determine how the UE can acquire SI of the access network. When determining how the UE can acquire SI of the access network, the UE may determine, via signaling associated with the sync signal, that the fourth base station transmits an MSIB 358 in a unicast (or narrow-beam) transmission mode (i.e., that the fourth base station will schedule a unicast (or narrow-beam) transmission of the MSIB upon receiving an MSIB transmission request signal 360 from the UE, and that the UE may monitor a scheduling channel (e.g., a PDCCH) for scheduling information (Sched.) 362 to determine when the MSIB will be transmitted). The UE may also identify, from the sync signal, where and when to transmit the MSIB transmission request. A UE that does not need to perform initial acquisition may determine, from the sync signal, whether it has moved to a new cell or new zone. When a UE determines that it has moved to a new cell or new zone, the UE may use information included in the sync signal to acquire new or updated SI from the new cell or new zone.

In each of the transmission/reception timelines 305, 320, 335, and 350 shown in FIG. 3A, the base station transmits an MSIB 315, 330, 342, or 358. A UE may receive the MSIB, in some examples, by monitoring a System Information-Radio Network Temporary Identifier (SI-RNTI) on a common physical control channel (e.g., a PDCCH), decoding a downlink assignment message associated with the SI-RNTI, and receiving the MSIB on a shared channel (e.g., a PDSCH) according to information contained in the downlink assignment message. Alternatively, when a Radio Network Temporary Identifier (RNTI; e.g., a cell-RNTI (C-RNTI) or zone-RNTI (Z-RNTI)) is assigned for the UE, the UE may monitor the RNTI on a common physical control channel (e.g., a PDCCH), decode a downlink assignment message associated with the RNTI, and receive the MSIB on a shared channel (e.g., a PDSCH) according to information contained in the downlink assignment message. In another alternative, the UE may monitor an SI-RNTI in order to receive broadcast SI, while the UE may also use an RNTI dedicatedly allocated for the UE (e.g., C-RNTI or zone RNTI) to receive unicast SI.

When camped on a cell, a UE may decode at least a portion of each instance of the periodic sync signal transmitted by the cell, to determine whether information included in the MSIB has changed. Alternatively, the UE may decode at least a portion of every Nth instance of the periodic sync signal, or may decode at least a portion of an instance of the periodic sync signal upon the occurrence of one or more events. The decoded portion of a subsequent instance of the sync signal may include information (e.g., a modification flag or value tag) which may be set to indicate whether SI for the cell has changed. Upon determining that SI for the cell has changed (e.g., after receiving the instance 310-*a* of the sync signal 310 in transmission/reception timeline 305), the UE may request and/or receive an MSIB (e.g., MSIB 315-*a*) with the changed SI.

As a UE moves within the coverage area of a wireless communication system, the UE may detect sync signals of different cells (or zones), such as the sync signals of the different cells (or coverage areas 110, 110-*a*, 110-*b* or zones) described with reference to FIG. 1 or 2, or the different cells (or base stations or zones) described with reference to FIG. 3A. Upon detecting a sync signal of a cell or zone, a UE may compare a cell global identity (CGI) (or base station identity code (BSIC) or zone identity) corresponding to a cell (or base station or zone) for which the UE last acquired SI to a CGI (or BSIC or zone identity) associated with the sync signal, to determine whether the UE has detected a new sync signal (e.g., a sync signal of a different cell, base station, or zone).

An on-demand transmission of an MSIB may be initiated by a UE (e.g., during initial access) or by an access network (e.g., when information included in the MSIB changes, or when a dedicated SIB is transmitted). In some cases, a base station transmitting and receiving signals in accord with one of the transmission/reception timelines 305, 320, 335, or 350 may switch transmission/reception modes, and thereby switch from one of the transmission/reception timelines to another of the transmission/reception timelines. The switch may be made, for example, based on network loading or congestion status. In some embodiments, a base station may also or alternatively switch between an "on-demand unicast (or narrow-beam)" mode and an "always-on broadcast (or broad-beam)" mode for MSIB transmissions. In some examples, a base station may signal the mode or modes under which it is operating in its periodic sync signal.

Turning now to the transmission/reception timeline 365 of the fifth base station (of FIG. 3B), the fifth base station may transmit a service-specific periodic sync signal 370. The service-specific periodic sync signal 370 may be an example of one of the sync signals 310, 325, 340, 355, except that the service-specific periodic sync signal 370 may include an indication that service-specific SI is available. The service-specific periodic sync signal 370 may also include information as to which services the service-specific SI is available.

Additionally, the service-specific periodic sync signal 370 may include information regarding a schedule for when the service-specific SI for different services may be requested or transmitted. As an example, certain service-specific SI may not be sent in every sync signal period. A synchronized MBMS service may only require that the service-specific SIB be transmitted on the order of seconds, for example, and thus may not be available during every sync signal period. Upon receiving an instance of the sync signal, a UE may determine that the UE has need for one or more of the available service-specific SI. In accordance with the service-specific periodic sync signal 370, the UE may transmit a SIB transmit (Tx) request 372. The UE may transmit a SIB Tx request 372-*a* for transmission of SI pertaining to a specific service (e.g., service 1), and may subsequently transmit a SIB Tx request 372-*b* for transmission of SI pertaining to a different specific service (e.g., service 2). In response to the receipt of the SIB Tx requests 372, one or more base stations may transmit service-specific SIBs 375 to the UE. The fifth base station may transmit a service-specific SIB 375-*a* in response to the SIB Tx request 372-*a*, and may also transmit a service-specific SIB 375-*b* in response to the SIB Tx request 372-*b*. Alternatively, the fifth base station may broadcast the service-specific SIBs 375 without waiting for a SIB Tx request 372. In this alternative, the service-specific periodic sync signal 370 may indicate when and on what resources a UE may listen to receive the service-specific SIBs 375.

With reference to the transmission/reception timeline 380 of the sixth base station (of FIG. 3B), the sixth base station may transmit a service-specific periodic sync signal 385. The service-specific periodic sync signal 385 may be an example of one of the sync signals 310, 325, 340, 355, except that the service-specific periodic sync signal 385 may include an indication that service-specific SI is available. However, the service-specific periodic sync signal 385 may not indicate the actual services for which SI is available. Instead, in the transmission/reception timeline 380, the UE is required to explicitly identify in a SIB Tx request 388 the services for which SI is desired. The service-specific sync signal 385 may include information regarding when and on what resources the UE may transmit its SIB Tx request 388. Thus, upon receiving an instance of the sync signal, a UE may determine that the UE has need for one or more of the available service-specific SI. In accordance with the service-specific periodic sync signal 385, the UE may transmit a SIB Tx request 388 that identifies the requested SI. In response to the receipt of the SIB Tx request 388, the sixth base station may transmit service-specific SIBs 390 to the UE. The service-specific SIBs 390 may be transmitted together, or jointly, in a single transmission, or may be transmitted separately.

Based on the services indicated in either the service-specific periodic sync signals 370, 385 or the SIB Tx requests 372, 388, a base station may transmit service-specific SIBs 375, 390 to the UE. The service-specific SIBs 375, 390 may include a service-specific configuration such as SI parameters specifically configured to improve the service or meet service requirements. For example, service-specific configurations may include validity timers or SI reading requirements that require an IOE device to reacquire SI after the IOE device awakens from a power saving mode (PSM) or deep sleep. For example, an IOE device may acquire SI having a particular value tag and then may transition into a PSM for an extended period of time (as a result of the device being an IOE device, for example). By the time the IOE device awakens, the SI may have changed more than once. In fact, it may even be possible that the SI will have changed a number of times equal to a number of values usable for SI value tags, meaning that the SI acquired by the IOE device may, coincidentally, have the same value tag as an SI detected by the IOE device when the IOE device awakens. If the IOE device relies on SI value tags to determine whether the IOE device is to acquire updated SI, the IOE device may determine that no new SI is to be acquired. However, validity timers or SI reading requirements may be used to ensure that the IOE device acquires updated SI, even if an SI value tag would indicate otherwise. For example, the validity timers or SI reading requirements may require that an IOE device reacquire SI after the expiration of a specified time, which may, in one example, be equal to the PSM time for the IOE device. Alternatively, a validity timer may be received as part of a service-specific configuration of service-specific SIB 375, 390. In this case, the validity timer may be set to a time duration which requires the IOE device to re-acquire SI at least once during each SI value tag wrap-around. Thus, if an operator changes the SI every ten minutes, and the SI value tag range is from 0-31, then the validity timer may be set to 320 minutes. The validity timer may be based on other factors as well. The validity timer or SI reading requirements may be conveyed to the IOE device as part of a service-specific configuration in service-specific SIBS 375, 390.

As an example, in some LTE standards, a UE may consider stored SI to be invalid after three hours from the moment the SI was confirmed to be valid. While certain exceptions may apply in LTE (for example, csg-PhysCelIIdRange, though this exception is due to the fact that updated SI may not be available if the UE is not camped on a CSG cell), the three-hour requirement may not be appropriate for many devices, including IOE devices that may either enter a PSM or where the SI value tags cycle through at different frequencies. Therefore, for WAN IOE devices, the validity timer may be extended or reduced for SI that is related to the WAN IOE network.

The service-specific SIBS 375, 390 may also include service-specific information such as service-specific parameters like those defined for MBMS. For a WAN IOE device, a service-specific configuration may be included in a single SIB so that the IOE device need not transmit multiple requests to incrementally receive any necessary SI.

Additionally, when multiple service-specific SIs are supported corresponding to multiple services, a network may use different transmission modes to support the transmission of SI for each service. Thus, and for example, a WAN IOE SI may be periodically broadcast, whereas nominal SI may be sent on-demand.

In the on-demand scenario, if a UE requests SI for more than one service in the SIB Tx requests 372, 388, the responding base station may either provide separate SI for each service or provide a common SI for all the desired services, where, for example, the base station may apply the most stringent configuration value for a parameter based on the service requirements for each requested service.

In addition to a periodic or on-demand MSIB, a base station may transmit one or more periodic or on-demand other SIBs (OSIBs). An OSIB may include information equivalent to the information included in one or more of the LTE/LTE-A SIBs other than SIB1 or SIB2 (e.g., information to enable an operator to manage system selection intra-radio access technology (RAT) or inter-RAT, information for a UE to discover the availability and configuration(s) of one or more services). One example transmission of an OSIB is shown in FIG. 4.

Figure 4:
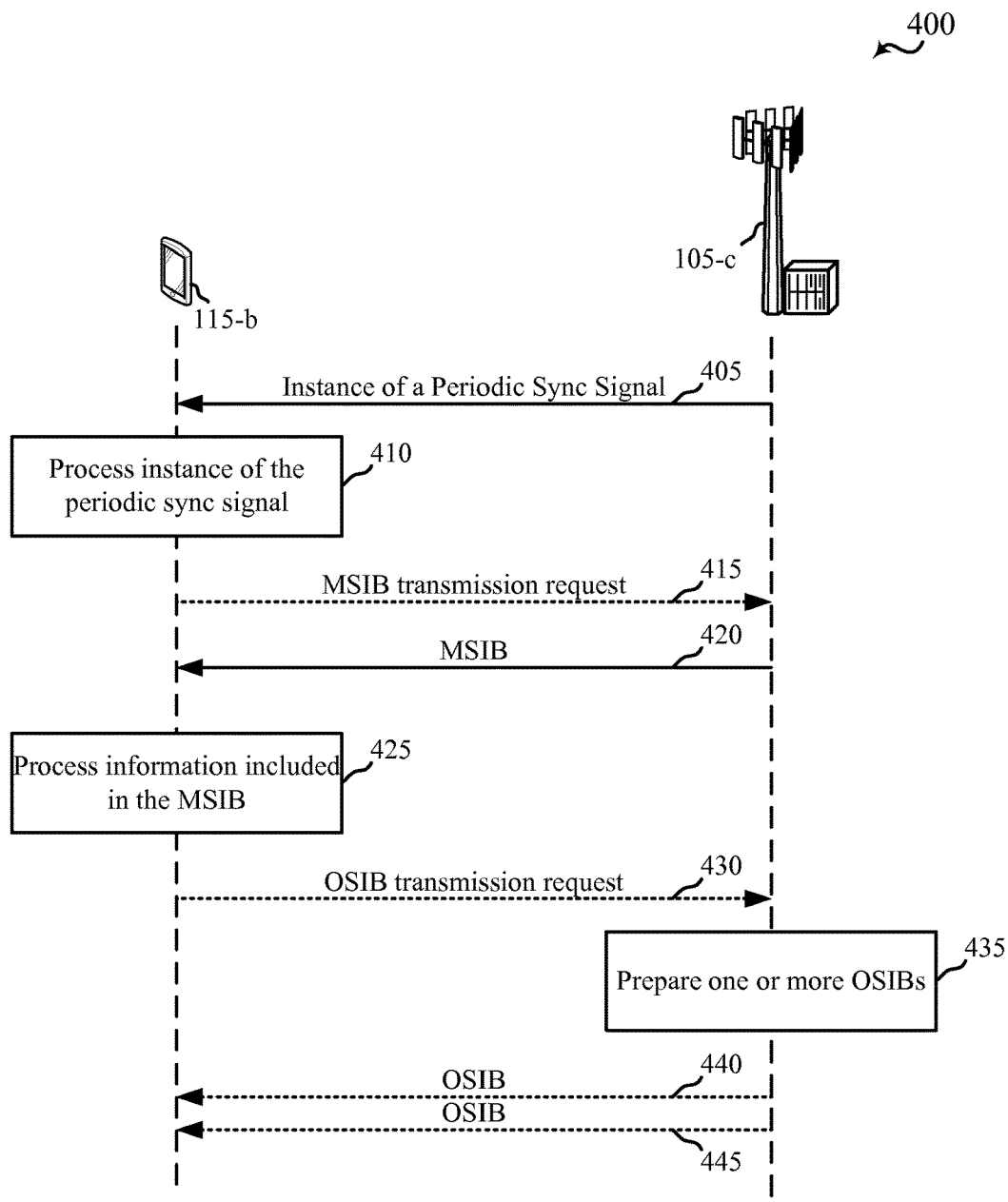
FIG. 4 is a swim lane diagram illustrating transmissions of a sync signal, a master system information block (MSIB), and another system information block (OSIB) by a base station, in accordance with various aspects of the present disclosure.

FIG. 4 is a swim lane diagram 400 illustrating transmissions of a sync signal, an MSIB, and an OSIB by a base station 105-*c*, in accordance with various aspects of the present disclosure. FIG. 4 also illustrates requests and receptions of the MSIB and OSIB by a UE 115-*b* performing initial acquisition of SI of an access network. In some examples, the base station may incorporate aspects of one or more of the base stations described with reference to FIG. 1 or 2. Similarly, the UE 115-*b* may incorporate aspects of one or more of the UEs 115 described with reference to FIG. 1 or 2.

At 405, the base station 105-*c* may transmit an instance of a periodic sync signal, as described with reference to FIG. 3A. The UE 115-*b* may receive the instance of the sync signal and, at block 410, process the instance of the sync signal and determine that it needs to transmit an MSIB transmission request, at 415, to obtain an MSIB from the base station 105-*c*. The UE 115-*b* may also determine, from the instance of the sync signal, where and when to transmit the MSIB transmission request and where and when to expect transmission of the MSIB by the base station 105-*c*.

At 420, the base station 105-*c* may transmit the MSIB. The UE 115-*b* may receive the MSIB and, at block 425, process information included in the MSIB. The UE 115-*b* may also, and optionally, prepare an OSIB transmission request. In some examples, an optional OSIB transmission request may be prepared (e.g., at block 425) and transmitted (e.g., at 430) when the UE 115-*b* has not previously acquired SI from the cell or zone in which the base station 105-*c* operates, or when cached SI for the cell or zone has expired, or when the UE determines that SI for the cell or zone has changed (e.g., from the sync signal, from information in the MSIB signaling a change in SI, or from a paging message), or when the UE determines (e.g., during RRC_IDLE) that it is in a location where new SI may be provided (e.g., a location in which new neighbor cell list equivalent information may be provided, or a location where new global positioning system (GPS) assistance information may be provided). In some cases, the OSIB transmission request may indicate what OSIB information is being requested. For example, a UE 115-*b* may indicate, in the OSIB transmission request, what SI (e.g., what type of SI or what SIBs) the UE would like to receive. In some examples, a single OSIB transmission request 430 may be transmitted, and the single OSIB transmission request 430 may indicate one or a plurality of elements of other SI that the UE would like to receive (e.g., a binary value may be set to TRUE for each element of other SI that the UE would like to receive). In other examples, the UE 115-*b* may request some types of other SI in different OSIB transmission requests, and the UE may transmit a plurality of OSIB transmission requests to the base station.

The base station 105-*c* may receive the OSIB transmission request (or OSIB transmission requests) and, at block 435, prepare one or more OSIBs for transmission to the UE at 440 or 445. In some embodiments, the base station may prepare one or more OSIBs including the SI requested by the UE in the OSIB transmission request. Additionally or alternatively, the base station 105-*c* (and/or another network node with which the base station communicates) may determine what SI should be transmitted to the UE 115-*b* in an OSIB. The base station 105-*c* and/or other network node may determine what SI to transmit to the UE 115-*b* based on, for example, a UE identity, a UE type, capabilities information the base station has acquired for the UE, or other information known about (and potentially acquired from) the UE. In this manner, the amount of SI transmitted to the UE 115-*b* may be optimized, which may help to conserve power, to free up resources, etc.

As previously indicated, an OSIB may include information equivalent to the information included in one or more of the LTE/LTE-A SIBs other than SIB1 or SIB2 (e.g., information to enable an operator to manage system selection intra-RAT or inter-RAT, information for a UE to discover the availability and configuration(s) of one or more services). The information included in an OSIB may be numbered and organized based on SI function, in order to enable a base station to deliver information to a UE based on a subset of UE functions, based on UE capabilities, or based on UE service requirements (e.g., a base station may not deliver MBMS information to a UE when the UE is not capable of using MBMS services). In some cases, information included in an OSIB may be numbered and organized the same or similar to information included in LTE/LTE-A SIBs.

Information included in an OSIB may be organized so that it may be efficiently received or processed by a UE. For example, the information may be organized so that a UE can read the information as infrequently as possible. In some embodiments, the information may be organized based on the scope of the information; based on whether the information applies system wide, intra-constellation, per cell or per zone; based on the duration for which information remains valid (e.g., validity time); or based on whether the information is semi-static or dynamic. When information changes very dynamically, the information may be organized so that it can be transmitted with reduced latency.

An on-demand transmission of an OSIB may be initiated by a UE (e.g., during initial access) or by an access network (e.g., when information included in the OSIB changes, or when a dedicated SIB is transmitted).

As previously described, a base station may in some cases switch between an "on-demand unicast (or narrow-beam)" mode and an "always-on broadcast (or broad-beam)" or an "on-demand broadcast (or broad-beam)" mode for MSIB transmissions. A base station may also switch between an "on-demand unicast (or narrow-beam)" mode and an "always-on broadcast (or broad-beam)" or an "on-demand broadcast (or broad-beam)" mode for OSIB transmissions. For "always-on broadcast (or broad-beam)" OSIB transmissions, an OSIB transmission schedule may be signaled in an MSIB transmission.

Figure 5:
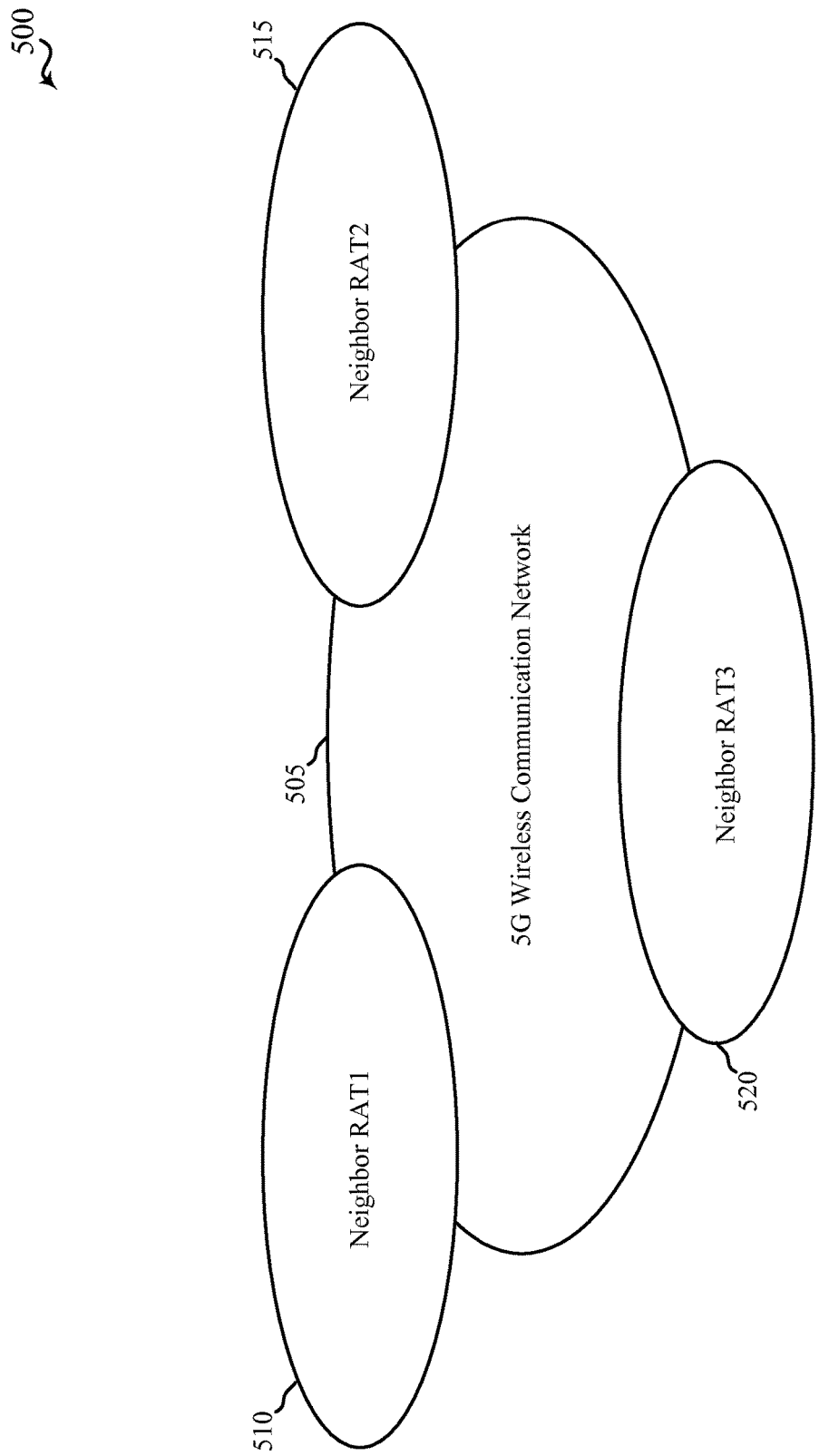
FIG. 5 illustrates a Venn diagram of respective coverage areas for a 5G wireless communication network, a first neighbor radio access technology (RAT; e.g., a neighbor RAT1), a second neighbor RAT (e.g., a neighbor RAT2), and a third neighbor RAT (e.g., a neighbor RAT3), in accordance with various aspects of the present disclosure.

In some cases, a UE may receive and process an MSIB or OSIB based on a change in location of the UE. In some cases, the MSIB or OSIB may be received and processed after transmitting a respective MSIB transmission request or OSIB transmission request. In this regard, FIG. 5 illustrates a Venn diagram 500 of respective coverage areas for a first zone 505, a second zone 510, a third zone 515, and a fourth zone 520. In some embodiments, the first zone 505 may include a 5G wireless communication network, the second zone 510 may include a first neighbor RAT (e.g., a neighbor RAT1), the third zone 515 may include a second neighbor RAT (e.g., a neighbor RAT2), and the fourth zone 520 may include a third neighbor RAT (e.g., a neighbor RAT3), in accordance with various aspects of the present disclosure. By way of example, the 5G wireless communication network may incorporate aspects of the wireless communication system 100 or 200 described with reference to FIG. 1 or 2. Each of the first neighbor RAT, the second neighbor RAT, and the third neighbor RAT may also incorporate aspects of the wireless communication system 100 or 200. The 5G wireless communication network, first neighbor RAT, second neighbor RAT, and third neighbor RAT may also take different forms.

When a UE initially acquires access to a 5G wireless communication network in the first zone 505, or as a UE moves within the 5G wireless communication network, the UE may acquire SI for the first neighbor RAT, the second neighbor RAT, or the third neighbor RAT. In some cases, a UE may acquire SI for the neighbor RATs using distance-based SI acquisition. A UE may employ distance-based SI acquisition by determining (e.g., calculating) a distance between the current location of the UE and a location of the UE when the UE last acquired neighbor RAT SI. When the determined distance exceeds a threshold distance, the UE may initiate a SI acquisition procedure (e.g., the UE may receive an OSIB containing the neighbor RAT SI, or the UE may transmit an OSIB transmission request in which the UE requests the neighbor RAT SI). The threshold distance may be configured by the network and may be indicated in an MSIB (e.g., as part of a measurement configuration indicated in the MSIB).

In some embodiments, distance-based SI acquisition may be employed on a per neighbor RAT basis. In other embodiments, distance-based SI acquisition may be employed on a collective neighbor RAT basis.

In some cases, a UE may receive and process an MSIB or OSIB based on a change in SI signaled in a periodic sync signal. In some cases, the MSIB or OSIB may be received and processed after transmitting a respective MSIB transmission request or OSIB transmission request.

Figure 6:
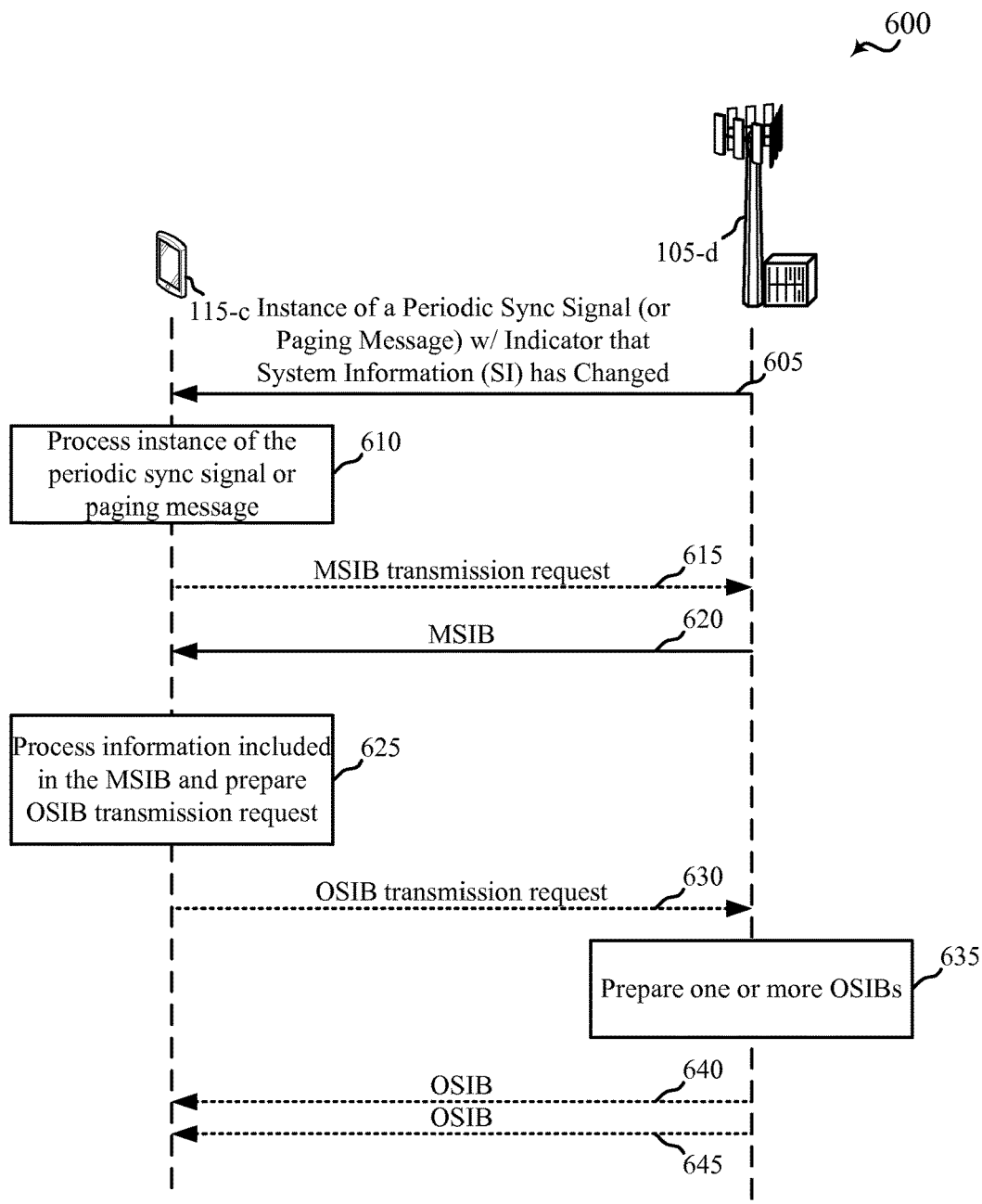
FIG. 6 is a swim lane diagram illustrating transmissions of a sync signal, an MSIB, and an OSIB by a base station, in accordance with various aspects of the present disclosure.

FIG. 6 is a swim lane diagram 600 illustrating transmissions of a sync signal, an MSIB, and an OSIB by a base station 105-d, in accordance with various aspects of the present disclosure. FIG. 6 also illustrates requests and receptions of the MSIB and OSIB by a UE 115-c performing a system information update. In some examples, the base station 105-d may incorporate aspects of one or more of the base stations 105 described with reference to FIG. 1, 2, or 4. Similarly, the UE 115-c may incorporate aspects of one or more of the UEs 115 described with reference to FIG. 1, 2, or 4.

At 605, the base station 105-d may transmit an instance of a periodic sync signal, as described with reference to FIG. 3A, or a paging message. The instance of the sync signal or paging message may include information (e.g., a modification flag or value tag) indicating that SI for a cell including the base station has changed.

In some embodiments, the instance of the sync signal or paging message may include a general indicator that SI has changed (e.g., a modification flag). The general indicator or modification flag may include, for example, a counter value that is incremented when SI has changed, or a Boolean variable (e.g., a binary value) that is set to TRUE (e.g., a logic "1") when SI included in an MSIB has changed (or when the network expects a UE to re-acquire the MSIB) or FALSE (e.g., a logic "0") when SI included in an MSIB has not changed (or when the network does not expect a UE to re-acquire the MSIB). The instance of the sync signal or paging message may also or alternatively indicate whether certain elements of SI have changed. For example, the instance of the sync signal or paging message may indicate whether SI for services such as Public Warning System (PWS; e.g., the Earthquake and Tsunami Warning System (ETWS) or the Commercial Mobile Alert System (CMAS)) has changed, which may simplify decoding and improve battery life when such information is changing more frequently.

The UE 115-c may receive the instance of the sync signal or paging message and, at block 610, process the instance of the sync signal or paging message (e.g., compare a counter value associated with the sync signal or paging message with a previously received counter value, or determine whether a modification flag is set to TRUE or FALSE); determine that SI for the cell or zone including the base station has changed; and (in some cases) determine that the changed SI is relevant to the UE. The UE may also determine that it needs to transmit an MSIB transmission request, at 615, to obtain an MSIB including the changed SI from the base station. The UE may also determine, from the instance of the sync signal or paging message, where and when to transmit the MSIB transmission request and where and when to expect transmission of the MSIB by the base station.

At 620, the base station 105-d may transmit the MSIB. In some cases, the MSIB may include information indicating whether other SI has changed. For example, the MSIB may include a general indicator that other SI has changed (e.g., a modification flag). The general indicator or modification flag may include, for example, a counter value that is incremented when SI included in an OSIB has changed, or a Boolean variable (e.g., a binary value) that is set to TRUE (e.g., a logic "1") when SI included in an OSIB has changed (or when the network expects a UE to re-acquire the OSIB) and to FALSE (e.g., a logic "0") when SI included in an OSIB has not changed (or when the network does not expect a UE to re-acquire the OSIB). The MSIB may also or alternatively indicate whether certain elements of other SI have changed. For example, the MSIB may include a value tag per type of SI or equivalent LTE/LTE-A SIB (e.g., a first Boolean variable set to TRUE or FALSE to indicate whether SI for MBMS services has changed, a second Boolean variable set to TRUE or FALSE based on whether SI for PWS services (e.g., CMAS services or ETWS services) has changed, etc.).

The UE 115-c may receive the MSIB and, at block 625, process information included in the MSIB. The UE may use information indicating what SI has changed to determine whether other SI useful to the UE (e.g., SI monitored by the UE) has changed and needs to be requested. For example, the UE may compare an OSIB counter value included in the MSIB with a previously received OSIB counter value, or determine whether an OSIB modification flag is set to TRUE or FALSE, or compare value tags for one or more monitored elements of other SI to previously received value tags for the one or more monitored elements of other SI, to determine with an OSIB needs to be requested. When other SI useful to the UE has not changed, the UE need not transmit an OSIB transmission request. However, when other SI useful to the UE has changed, the UE may prepare (e.g., at block 625) and transmit (e.g., at 630) an OSIB transmission request. In some cases, the OSIB transmission request may be a generic request (e.g., a request that causes the base station to return all other SI, or a request that allows the base station to return whatever SI the base station deems useful to the UE). In other cases, the OSIB transmission request may indicate what OSIB information is being requested. For example, a UE may indicate, in the OSIB transmission request, what SI (e.g., what type of SI or what SIBs) the UE would like to receive.

The base station 105-d may receive the OSIB transmission request and, at block 635, prepare one or more OSIBs for transmission to the UE at 640 or 645. In some embodiments, the base station may prepare an OSIB including the SI requested by the UE in the OSIB transmission request. Additionally or alternatively, the base station (and/or another network node with which the base station communicates) may determine what SI should be transmitted to the UE in an OSIB. The base station and/or other network node may determine what SI to transmit to the UE based on, for example, a UE identity, a UE type, capabilities information the base station has acquired for the UE, or other information known about (and potentially acquired from) the UE. In this manner, the amount of SI transmitted to the UE may be optimized, which may help to conserve power, to free up resources, etc.

The below table provides an example allocation of SI between an MSIB and an OSIB in a 5G wireless communication system:

| 5G System Information | | |
|---|---|---|
| | Contents | Equivalent LTE/LTE-A SIBs |
| MSIB: Unicast (on-demand) SI, or SI broadcast with short periodicity | PHY layer basic configuration information (e.g., downlink bandwidth, SFN, etc.) | MIB |
| | Constellation ID (PLMN ID, Constellation code, CSG/HNB ID), Constellation selection information (q-RxMin), FreqBand information, Scheduling information for other SIBs (if broadcast supported), SI value tag (may be signaled by sync signal) | SIB1 |
| | Access Class (AC)-Barring info, Service Specific Access Control (SSAC) info, Extended Access Barring (EAB) Radio Common config (details: RACH (RACH preamble signatures), (Broadcast Control Channel (BCCH), paging Control Channel (PCCH)), PRACH, PDSCH, PUSCH, PUCCH, SRS, UE-timers and constants, Multimedia Broadcast Single Frequency Network (MBSFN) config, UL-Freq info + UL bandwidth, Time alignment timer | SIB2 |
| OSIB: Unicast (on-demand) SI, or SI broadcast with very long periodicity | Mobility related parameters, e.g., cell reselection parameters, neighbor constellation/zone lists, | SIB3-SIB8 |
| | WLAN offloading signaling | SIB17 |
| | PWS, MBMS, GPS assistance data | SIB10-SIB16 |

Although each of FIGS. 4-6, and to some extent the remainder of the present disclosure, focused primarily on the transmission of an MSIB or an OSIB, any number of MSIBs or OSIBs may be transmitted—either individually or in groups, and in response to a singular MSIB transmission request and/or OSIB transmission request, or in response to a plurality of MSIB transmission requests and/or OSIB transmission requests. In some cases, master system information may distributed among one or more of an MSIB, an MTC_SIB, or other SIBs carrying master information. In some cases, other system information may be distributed among one or more of an OSIB1 carrying neighbor cell/zone information, an OSIB2 carrying MBMS related information, an OSIB3 carrying PWS related information, or other SIBs carrying other information. An MSIB or OSIB may also include one or more elements. When SI changes, a modification flag or value tag may be transmitted or received, for example, per MSIB, per element within an MSIB, per OSIB, or per element within an OSIB.

Figure 7:
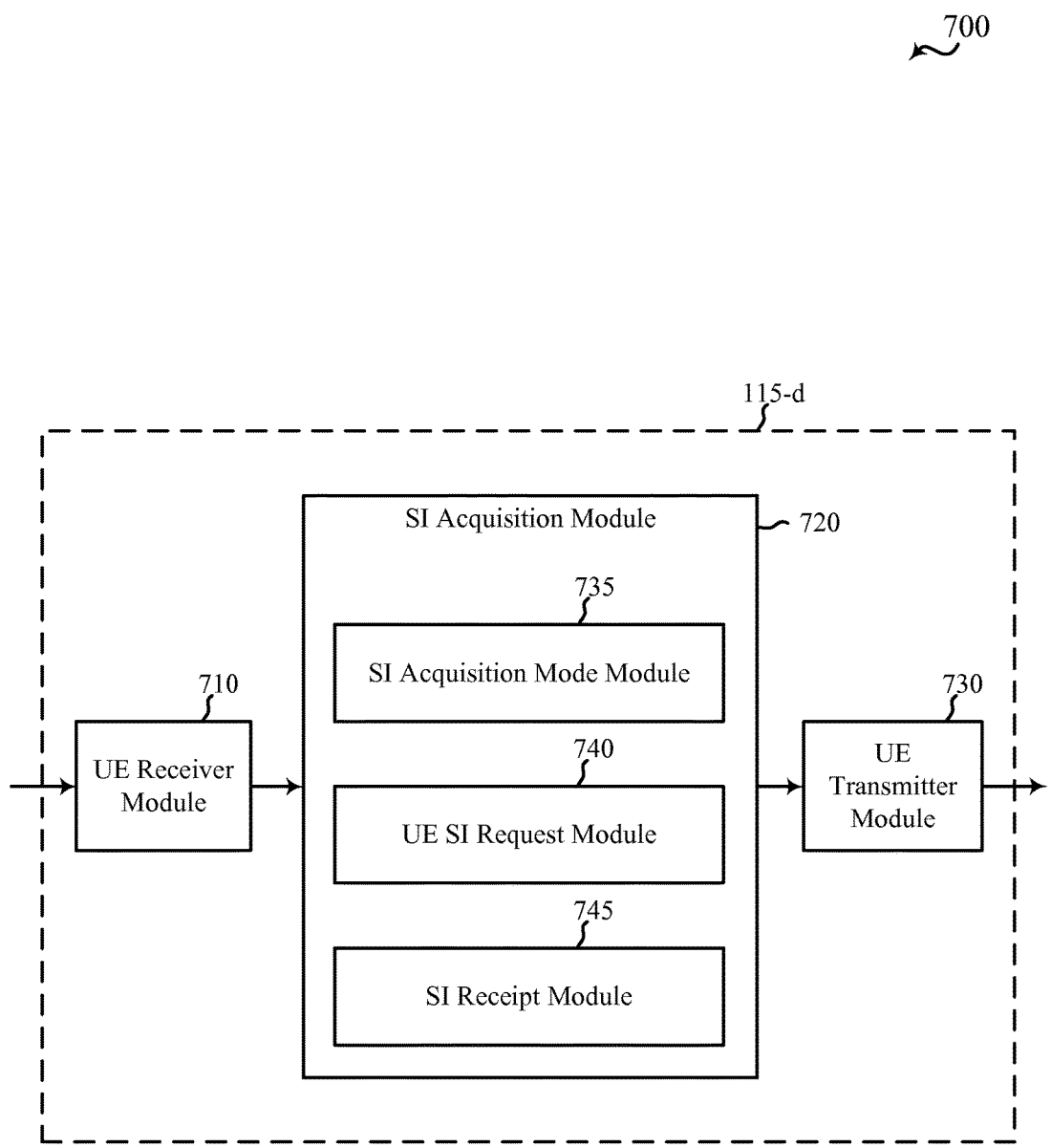
FIG. 7 shows a block diagram of a UE for use in wireless communication, in accordance with various aspects of the present disclosure.

FIG. 7 shows a block diagram 700 of a UE 115-*d* for use in wireless communication, in accordance with various aspects of the present disclosure. The UE 115-*d* may be an example of aspects of one or more of the UEs 115 described with reference to FIGS. 1-6. The UE 115-*d* may also be or include a processor. The UE 115-*d* may include a UE receiver module 710, an SI acquisition module 720, or a UE transmitter module 730. The SI acquisition module 720 may include an SI acquisition mode module 735, a UE SI request module 740, or an SI receipt module 745. Each of these modules may be in communication with each other.

The modules of the UE 115-*d* may, individually or collectively, be implemented using one or more application-specific integrated circuits (ASICs) adapted to perform some or all of the applicable functions in hardware. Alternatively, the functions may be performed by one or more other processing units (or cores), on one or more integrated circuits. In other examples, other types of integrated circuits may be used (e.g., Structured/Platform ASICs, Field Programmable Gate Arrays (FPGAs), a System on Chip (SoC), or other Semi-Custom ICs), which may be programmed in any manner known in the art. The functions of each module may also be implemented, in whole or in part, with instructions embodied in a memory, formatted to be executed by one or more general or application-specific processors.

In some examples, the UE receiver module 710 may include at least one radio frequency (RF) receiver. The UE receiver module 710 or RF receiver may be used to receive various types of data or control signals (i.e., transmissions) over one or more communication links of a wireless communication system, such as one or more communication links of the wireless communication system 100 described with reference to FIG. 1. As an example, the UE receiver module 710 may be used to receive a periodic sync signal, as described with reference to FIGS. 3A, 3B, and 4. The UE receiver module 710 may also be used to receive various signals that include one or more forms of SI, as also described with reference to FIGS. 3A, 3B, and 4. The receipt and processing of the synchronization signals and the SI signals (for example, the periodic sync signals 310, 325, 340, or 355 of FIG. 3A, and the broadcast MSIBs 315, 330, 342, or the unicast MSIB 358 of FIG. 3A) may be additionally facilitated through the SI acquisition module 720, as described in greater detail below.

In some examples, the UE transmitter module 730 may include at least one RF transmitter. The UE transmitter module 730 or RF transmitter may be used to transmit various types of data or control signals (i.e., transmissions) over one or more communication links of a wireless communication system, such as one or more communication links of the wireless communication system 100 described with reference to FIG. 1. As an example, the UE transmitter module 730 may be used to transmit an MSIB transmission request signal 332, 345, 360, as described with reference to FIG. 3A. The transmission of the MSIB transmission request signals 332, 345, 360, for example, may be additionally facilitated through the SI acquisition module 720, as described in greater detail below.

The SI acquisition module 720 may be used to manage one or more aspects of wireless communication for the UE 115-*d*. In particular, in the UE 115-*d*, the SI acquisition module 720 may be used to facilitate the acquisition of SI from a base station 105, in accordance to aspects of some of the embodiments described above. The SI acquisition module 720 may include an SI acquisition mode module 735, a UE SI request module 740, or an SI receipt module 745.

The SI acquisition mode module 735 may be used by the UE 115-*d* to facilitate receipt by the UE 115-*d* of a periodic sync signal 310, 325, 340, 355, as illustrated in FIGS. 3A, 3B, and 4, for example. The received periodic sync signal 310, 325, 340, 355 may indicate to the UE 115-*d* whether the UE 115-*d* is to transmit a request signal, such as an MSIB transmission request signal 332, 345, 360, for example, in order to receive a transmission of SI. For example, the UE 115-*d* may receive a periodic sync signal 310 that indicates to the UE 115-*d* that SI may be broadcast by a base station 105 regardless of any requests sent by the UE 115-*d*. In this instance, the SI acquisition mode module 735 may determine that no request is necessary in order for the UE 115-*d* to receive SI. In another example, however, the UE 115-*d* may receive a periodic sync signal 325, 340, 355, which may each indicate that the UE 115-*d* is to transmit a request for SI (in the form of an MSIB transmission request signal 332, 345, 360, for example) in order to receive SI. In this instance, the SI acquisition mode module 735 may determine that a request is necessary in order for the UE 115-*d* to receive SI. Thus, the SI acquisition mode module 735 may be configured to determine whether the UE 115-*d* is operating in a network having a broadcast SI mode or an on-demand SI mode.

In the event that the UE 115-*d* is operating in a network using an on-demand SI mode, meaning that the UE 115-*d* is to transmit a request to receive SI, the UE SI request module 740 may be used to facilitate the creation of such a request. As an example, the UE SI request module 740 may be used to formulate any one of the MSIB transmission request signals 332, 345, 360 of FIG. 3A. The UE SI request module 740 may use information included with the periodic sync signal 325, 340, 355 to determine how to formulate the MSIB transmission request signals 332, 345, 360. For example, the periodic sync signal 325, 340, 355 may include information indicating where the MSIB transmission request signals 332, 345, 360 should be sent, as well as the timing of such signals.

The SI receipt module 745 may be used to facilitate the receipt of SI transmitted to the UE 115-*d*. The SI may be transmitted as a broadcast without any need for a request sent by the UE 115-*d*. In this example, the SI acquisition mode module 735 may indicate to the SI receipt module 745 that SI is to be received via a broadcast. The SI receipt module 745 may then facilitate receipt of the SI using information included with the periodic sync signal 310, such as a predetermined channel or timing of the SI broadcast. In another example. the SI may be transmitted as either a broadcast or a unicast in response to a request sent by the UE 115-*d*. In these examples, the SI acquisition mode module 735 may indicate to the SI receipt module 745 that SI is to be received as either a broadcast or a unicast in response to a request. The SI receipt module 745 may then facilitate receipt of the SI using information included with the periodic sync signals 325, 340, 355, such as a predetermined channel or timing of the SI broadcast or unicast.

Figure 8:
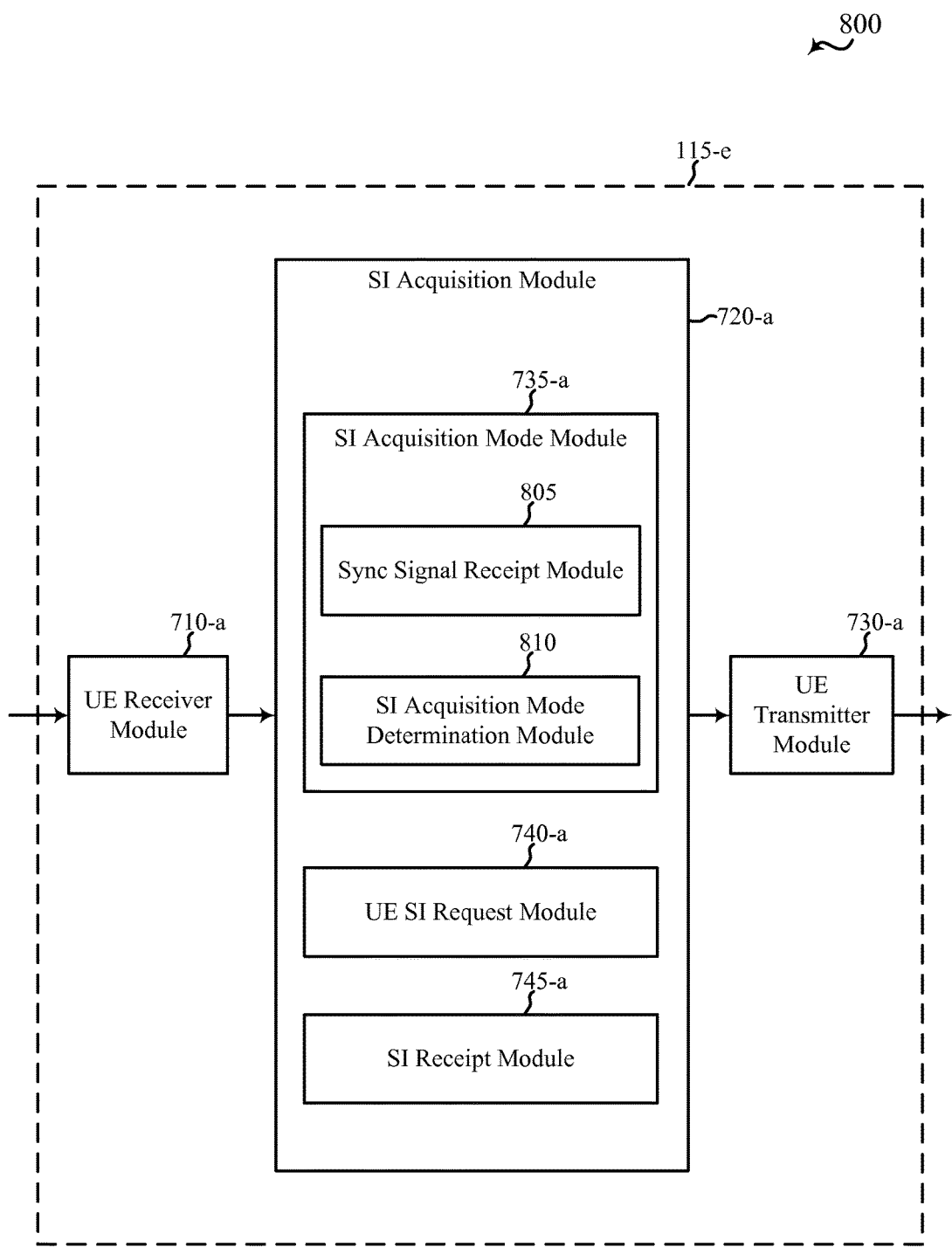
FIG. 8 shows a block diagram of a UE for use in wireless communication, in accordance with various aspects of the present disclosure.

FIG. 8 shows a block diagram 800 of a UE 115-*e* for use in wireless communication, in accordance with various examples. The UE 115-*e* may be an example of one or more aspects of a UE 115 described with reference to FIGS. 1-7. The UE 115-*e* may include a UE receiver module 710-*a*, an SI acquisition module 720-*a*, and/or a UE transmitter module 730-*a*, which may be examples of the corresponding modules of UE 115-*d* (of FIG. 7). The UE 115-*e* may also include a processor (not shown). Each of these components may be in communication with each other. The SI acquisition module 720-*a* may include an SI acquisition mode module 735-*a*, a UE SI request module 740-*a*, and/or an SI receipt module 745-*a*. The SI acquisition mode module 735-*a* may further include a sync signal receipt module 805 and/or an SI acquisition mode determination module 810. The UE receiver module 710-*a* and the UE transmitter module 730-*a* may perform the functions of the UE receiver module 710 and the UE transmitter module 730, of FIG. 7, respectively.

The modules of the UE 115-*e* may, individually or collectively, be implemented using one or more ASICs adapted to perform some or all of the applicable functions in hardware. Alternatively, the functions may be performed by one or more other processing units (or cores), on one or more integrated circuits. In other examples, other types of integrated circuits may be used (e.g., Structured/Platform ASICs, FPGAs, a SoC, or other Semi-Custom ICs), which may be programmed in any manner known in the art. The functions of each module may also be implemented, in whole or in part, with instructions embodied in a memory, formatted to be executed by one or more general or application-specific processors.

The SI acquisition mode module 735-*a* may include a sync signal receipt module 805 and/or an SI acquisition mode determination module 810. The sync signal receipt module 805 may be used by the UE 115-*e* to facilitate receipt by the UE 115-*e* of a periodic sync signal 310, 325, 340, 355, as illustrated in FIGS. 3A, 3B, and 4, for example. The received periodic sync signal 310, 325, 340, 355 may indicate to the UE 115-*e* whether the UE 115-*e* is to transmit a request signal, such as an MSIB transmission request signal 332, 345, 360, for example, in order to receive a transmission of SI. Thus, the SI acquisition mode determination module 810 may be used to determine, from the received periodic sync signal 310, 325, 340, 355, whether an SI acquisition mode is fixed or on-demand. For example, the UE 115-*e*, through the sync signal receipt module 805, may receive a periodic sync signal 310 that indicates to the UE 115-*e* that SI may be broadcast by a base station 105 regardless of any requests sent by the UE 115-*e*. In this instance, the SI acquisition mode determination module 810 may determine that no request is necessary in order for the UE 115-*e* to receive SI. In another example, however, the UE 115-*e* may receive, via the sync signal receipt module 805, a periodic sync signal 325, 340, 355, which may each indicate that the UE 115-*e* is to transmit a request for SI (in the form of an MSIB transmission request signal 332, 345, 360, for example) in order to receive SI. In this instance, the SI acquisition mode determination module 810 may determine that a request is necessary in order for the UE 115-*e* to receive SI. Thus, the SI acquisition mode determination module 810 may be configured to determine whether the UE 115-*e* is operating in a network having a fixed broadcast SI mode or an on-demand SI mode.

In the event that the UE 115-*e* is operating in a network using an on-demand SI mode, meaning that the UE 115-*e* is to transmit a request to receive SI, the UE SI request module 740-*a* may be used to facilitate the creation of such a request. As an example, the UE SI request module 740-*a* may be used to formulate any one of the MSIB transmission request signals 332, 345, 360 of FIG. 3A. The UE SI request module 740-*a* may use information included with the periodic sync signal 325, 340, 355 to determine how to formulate the MSIB transmission request signals 332, 345, 360. For example, the periodic sync signal 325, 340, 355 may include information indicating where the MSIB transmission request signals 332, 345, 360 should be sent, as well as the timing of such signals.

The SI receipt module 745-*a* may be used to facilitate the receipt of SI transmitted to the UE 115-*e*. The SI may be transmitted as a broadcast without any need for a request sent by the UE 115-*e*. In this example, the SI acquisition mode module 735-*a* may indicate to the SI receipt module 745-*a* that SI is to be received via a broadcast. The SI receipt module 745-*a* may then facilitate receipt of the SI using information included with the periodic sync signal 310, such as a predetermined channel or timing of the SI broadcast. The UE 115-*e* may receive the SI, in some examples, by monitoring an SI-RNTI on a common physical control channel (e.g., a PDCCH), decoding a downlink assignment message associated with the SI-RNTI, and receiving the SI on a shared channel (e.g., a PDSCH).

In another example. the SI may be transmitted as either a broadcast or a unicast in response to a request sent by the UE 115-*e*. In these examples, the SI acquisition mode module 735-*a* may indicate to the SI receipt module 745-*a* that SI is to be received as either a broadcast or a unicast in response to a request. The SI receipt module 745-*a* may then facilitate receipt of the SI using information included with the periodic sync signals 325, 340, 355, such as a predetermined channel or timing of the SI broadcast or unicast. The UE 115-*e* may receive the SI, in some examples, by monitoring an SI-RNTI on a common physical control channel (e.g., a PDCCH), decoding a downlink assignment message associated with the SI-RNTI, and receiving the MSIB on a shared channel (e.g., a PDSCH). Alternatively, when an RNTI; (e.g., a C-RNTI or Z-RNTI) is assigned for the UE 115-*e*, the UE 115-*e* may monitor the RNTI on a common physical control channel (e.g., a PDCCH), decode a downlink assignment message associated with the RNTI, and receive the SI on a shared channel (e.g., a PDSCH) according to information contained in the downlink assignment message. In another alternative, the UE 115-*e* may monitor an SI-RNTI in order to receive broadcast SI, while the UE may also use an RNTI dedicatedly allocated for the UE (e.g., C-RNTI or zone RNTI) to receive unicast SI.

In each of the examples described above with respect to the UEs 115-*d*, 115-*e* of FIGS. 7 and 8, the terms broadcast operation and broad-beam operation may be used interchangeably, at the level at which operations of UEs 115-*d*, 115-*e* have been described. Similarly, the terms unicast operation and narrow-beam operation may be used interchangeably, at the level at which operations of UEs 115-*d*, 115-*e* have been described. In general, if the UE 115-*d*, 115-*e* is operating in a massive MIMO network, the UE 115-*d*, 115-*e* may receive the periodic sync signal 310, 325, 340, 355 as part of a broad-beam operation, and may receive the SI as part of either a broad-beam or a narrow-beam operation. On the other hand, if the UE 115-*d*, 115-*e* is operating in a non-massive MIMO network, the UE 115-*d*, 115-*e* may receive the periodic sync signal 310, 325, 340, 355 as part of a broadcast operation, and may receive the SI as part of either a broadcast or a unicast operation.

Figure 9:
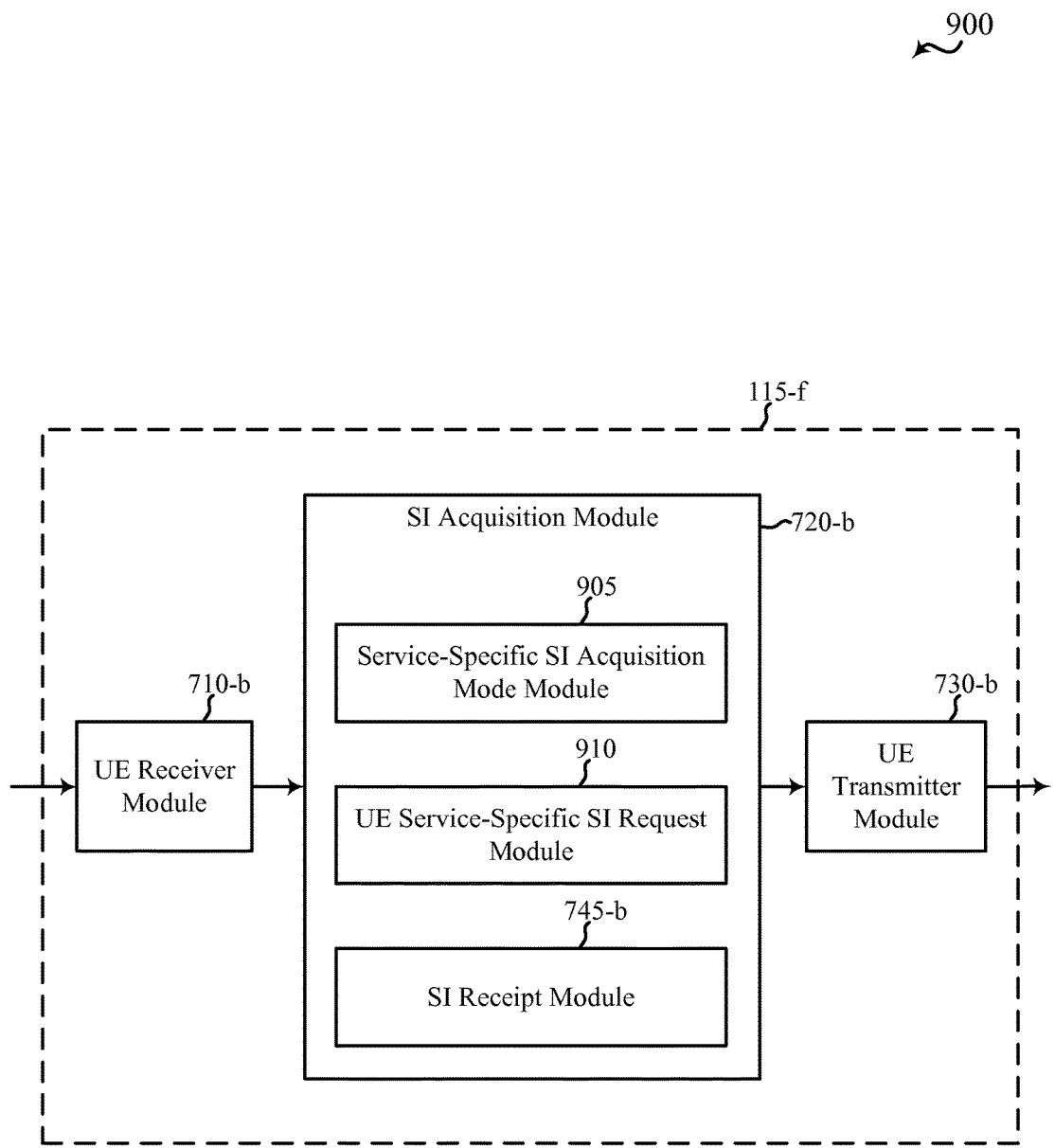
FIG. 9 shows a block diagram of a UE for use in wireless communication, in accordance with various aspects of the present disclosure.

FIG. 9 shows a block diagram 900 of a UE 115-*f* for use in wireless communication, in accordance with various aspects of the present disclosure. The UE 115-*f* may be an example of aspects of one or more of the UEs 115 described with reference to FIGS. 1-8. The UE 115-*f* may also be or include a processor. The UE 115-*f* may include a UE receiver module 710-*b*, an SI acquisition module 720-*b*, or a UE transmitter module 730-*b*, which may be examples of the corresponding modules of UE 115-*d* (of FIG. 7). The SI acquisition module 720-*b* may include a service-specific SI acquisition mode module 905, a UE service-specific SI request module 910, or an SI receipt module 745-*b*. The SI receipt module 745-*b* may be an example of the SI receipt module 745 of FIG. 7 or 8. Each of these modules may be in communication with each other.

The modules of the UE 115-*r* may, individually or collectively, be implemented using one or more ASICs adapted to perform some or all of the applicable functions in hardware. Alternatively, the functions may be performed by one or more other processing units (or cores), on one or more integrated circuits. In other examples, other types of integrated circuits may be used (e.g., Structured/Platform ASICs, FPGAs, an SoC, or other Semi-Custom ICs), which may be programmed in any manner known in the art. The functions of each module may also be implemented, in whole or in part, with instructions embodied in a memory, formatted to be executed by one or more general or application-specific processors.

In some examples, the UE receiver module 710-*b* may include at least one RF receiver. The UE receiver module 710-*b* or RF receiver may be used to receive various types of data or control signals (i.e., transmissions) over one or more communication links of a wireless communication system, such as one or more communication links of the wireless communication system 100 described with reference to FIG. 1. As an example, the UE receiver module 710-*b* may be used to receive a service-specific periodic sync signal, as described with reference to FIG. 3B. The UE receiver module 710-*b* may also be used to receive various signals that include one or more forms of SI, as also described with reference to FIG. 3B. The receipt and processing of the service-specific synchronization signals and the SI signals (for example, the service-specific periodic sync signals 370, 385 of FIG. 3B, and the service-specific SIBs 375, 390 (of FIG. 3B)) may be additionally facilitated through the SI acquisition module 720-*b*, as described in greater detail below.

In some examples, the UE transmitter module 730-*b* may include at least one RF transmitter. The UE transmitter module 730-*b* or RF transmitter may be used to transmit various types of data or control signals (i.e., transmissions) over one or more communication links of a wireless communication system, such as one or more communication links of the wireless communication system 100 described with reference to FIG. 1. As an example, the UE transmitter module 730-*b* may be used to transmit a SIB Tx request 372, 388, as described with reference to FIG. 3B. The transmission of the SIB Tx request 372, 388, for example, may be additionally facilitated through the SI acquisition module 720-*b*, as described in greater detail below.

The SI acquisition module 720-*b* may be used to manage one or more aspects of wireless communication for the UE 115-*f*. In particular, in the UE 115-*f*, the SI acquisition module 720-*b* may be used to facilitate the acquisition of service-specific SI from a base station 105, in accordance to aspects of some of the embodiments described above. The SI acquisition module 720-*b* may include a service-specific SI acquisition mode module 905, a UE service-specific SI request module 910, or an SI receipt module 745-*b*.

The service-specific SI acquisition mode module 905 may be used by the UE 115-*f* to facilitate receipt by the UE 115-*f* of a service-specific periodic sync signal 370, 385, as illustrated in FIG. 3B, for example. The received service-specific periodic sync signal 370, 385 may indicate to the UE 115-*f* that service-specific SI is available for the UE 115-*f*. The service-specific periodic sync signal 370, 385 may also indicate whether the UE 115-f is to transmit one or more request signals, such as an SIB Tx request 372, 388, for example, in order to receive a service-specific SIB 375, 390. For example, the UE 115-f may receive a service-specific periodic sync signal 370 that indicates to the UE 115-f that service-specific SI is available. The service-specific periodic sync signal 370 may indicate that the service-specific SI is to be broadcast at a specific time and using specific resources. In that case, the service-specific SI acquisition mode module 905 may determine that, in order to obtain the service-specific SI, the UE 115-f must listen for the service-specific SI at the designated times. Alternatively, the service-specific periodic sync signal 370 may indicate that the service-specific SI is to be requested in accordance with a schedule. In this instance, the service-specific SI acquisition mode module 905 may determine that, in order to obtain the service-specific SI, the UE 115-f must transmit one or more requests for service-specific SI in accordance with the schedule identified by the serviced-specific periodic sync signal 370. In yet another embodiment, a service-specific periodic sync signal 385 may indicate that service-specific SI is available by request but that the UE 115-f must explicitly request the service-specific SI. In this case, the service-specific SI acquisition mode module 905 may determine that the UE 115-f must identify which services it requires SI and then include that identification in a request.

In the event that the UE 115-f is operating in a network using an on-demand service-specific SI mode, meaning that the UE 115-f is to transmit a request to receive service-specific SI, the UE service-specific SI request module 910 may be used to facilitate the creation of such a request. As an example, the UE service-specific SI request module 910 may be used to formulate any one of the SIB Tx requests 372, 388 of FIG. 3B. The UE service-specific SI request module 910 may use information included with the service-specific periodic sync signals 370, 385 to determine how to formulate the SIB Tx requests 372, 388. For example, the service-specific periodic sync signal 370, 385 may include information indicating where the SIB Tx requests 372, 388 should be sent, as well as the timing of such signals.

The SI receipt module 745-b may be used to facilitate the receipt of service-specific SI transmitted to the UE 115-f. The service-specific SI may be transmitted as a broadcast without any need for a request sent by the UE 115-f. In this example, the service-specific SI acquisition mode module 905 may indicate to the SI receipt module 745-b that service-specific SI is to be received via a broadcast. The SI receipt module 745-b may then facilitate receipt of the service-specific SI using information included with the service-specific periodic sync signal 370, such as a predetermined channel or timing of the service-specific SI broadcasts. In another example, the service-specific SI may be transmitted as either a broadcast or a unicast in response to a request sent by the UE 115-f. In these examples, the service-specific SI acquisition mode module 905 may indicate to the SI receipt module 745-b that service-specific SI is to be received as either a broadcast or a unicast in response to a request. The SI receipt module 745-b may then facilitate receipt of the service-specific SI using information included with the service-specific periodic sync signal 370, 385, such as a predetermined channel or timing of the SI broadcast or unicast.

Figure 10:
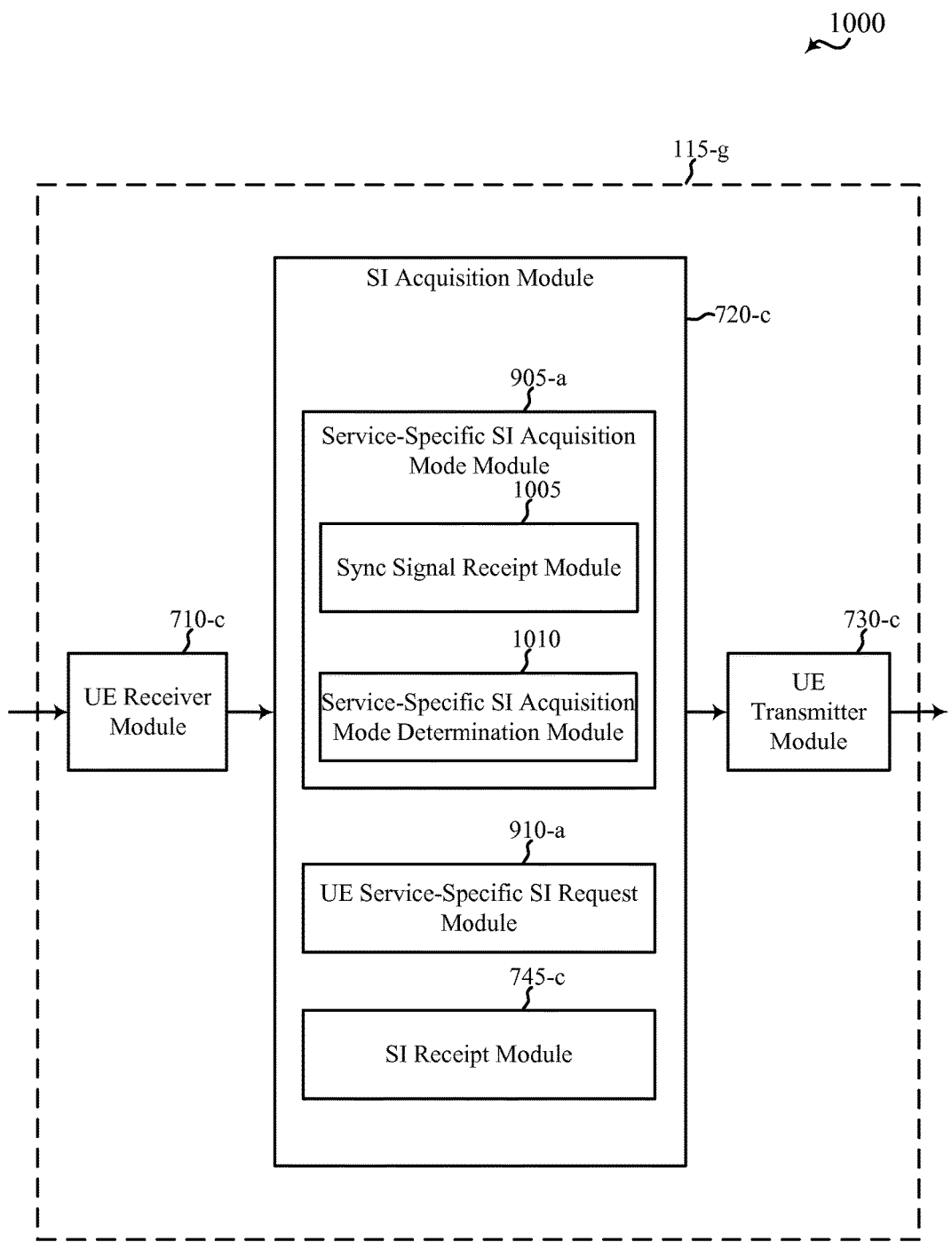
FIG. 10 shows a block diagram of a UE for use in wireless communication, in accordance with various aspects of the present disclosure.

FIG. 10 shows a block diagram 1000 of a UE 115-g for use in wireless communication, in accordance with various examples. The UE 115-g may be an example of one or more aspects of a UE 115 described with reference to FIGS. 1-9. The UE 115-g may include a UE receiver module 710-c, an SI acquisition module 720-c, and/or a UE transmitter module 730-c, which may be examples of the corresponding modules of UE 115-f (of FIG. 9). The UE 115-g may also include a processor (not shown). Each of these components may be in communication with each other. The SI acquisition module 720-c may include a service-specific SI acquisition mode module 905-a, a UE service-specific SI request module 910-a, and/or an SI receipt module 745-c. The service-specific SI acquisition mode module 905-a may further include a sync signal receipt module 1005 and/or a service-specific SI acquisition mode determination module 1010. The UE receiver module 710-c and the UE transmitter module 730-c may perform the functions of the UE receiver module 710 and the UE transmitter module 730, of FIG. 7, respectively.

The modules of the UE 115-g may, individually or collectively, be implemented using one or more ASICs adapted to perform some or all of the applicable functions in hardware. Alternatively, the functions may be performed by one or more other processing units (or cores), on one or more integrated circuits. In other examples, other types of integrated circuits may be used (e.g., Structured/Platform ASICs, FPGAs, a SoC, or other Semi-Custom ICs), which may be programmed in any manner known in the art. The functions of each module may also be implemented, in whole or in part, with instructions embodied in a memory, formatted to be executed by one or more general or application-specific processors.

The service-specific SI acquisition mode module 905-a may include a sync signal receipt module 1005 and/or a service-specific SI acquisition mode determination module 1010. The sync signal receipt module 1005 may be used by the UE 115-g to facilitate receipt by the UE 115-g of a service-specific periodic sync signal 370, 385, as illustrated in FIG. 3B, for example. The received service-specific periodic sync signal 370, 385 may indicate to the UE 115-g whether service-specific SI is available for the UE 115-g, and whether the UE 115-g is to transmit a request signal, such as SIB Tx requests 372, 388, for example, in order to receive a transmission of service-specific SI. Thus, the service-specific SI acquisition mode determination module 1010 may be used to determine, from the received service-specific periodic sync signal 370, 385, whether service-specific SI may be received as one or more broadcasts, may be explicitly requested, or may be requested in accordance with a schedule. For example, the UE 115-g may receive a service-specific periodic sync signal 370 that indicates to the UE 115-g that service-specific SI is to be broadcast at a specific time and using specific resources. In that case, the service-specific SI acquisition mode determination module 1010 may determine that, in order to obtain the service-specific SI, the UE 115-g must listen for the service-specific SI at the designated times. Alternatively, the service-specific periodic sync signal 370 may indicate that the service-specific SI is to be requested in accordance with a schedule. In this instance, the service-specific SI acquisition determination mode module 1010 may determine that, in order to obtain the service-specific SI, the UE 115-g must transmit one or more requests for service-specific SI in accordance with the schedule identified by the serviced-specific periodic sync signal 370. In yet another embodiment, a service-specific periodic sync signal 385 may indicate that service-specific SI is available by request but that the UE 115-g must explicitly request the service-specific SI. In this case, the service-specific SI acquisition mode determination module 1010 may determine that the UE 115-g must identify which services it requires SI and then include that identification in a request.

In the event that the UE 115-g is operating in a network using an on-demand service-specific SI mode, the UE service-specific SI request module 910-a may be used to facilitate the creation of such a request. As an example, the UE service-specific SI request module 910-a may be used to formulate any one of the SIB Tx requests 372, 388 of FIG. 3B. The UE service-specific SI request module 910-a may use information included with the service-specific periodic sync signals 370, 385 to determine how to formulate the SIB Tx requests 372, 388. For example, the service-specific periodic sync signal 370, 385 may include information indicating where the SIB Tx requests 372, 388 should be sent, as well as the timing of such signals.

The SI receipt module 745-c may be used to facilitate the receipt of service-specific SI transmitted to the UE 115-g. The service-specific SI may be transmitted as a broadcast without any need for a request sent by the UE 115-g. In this example, the service-specific SI acquisition mode determination module 1010 may indicate to the SI receipt module 745-c that service-specific SI is to be received via a broadcast. The SI receipt module 745-c may then facilitate receipt of the service-specific SI using information included with the service-specific periodic sync signal 370, such as a predetermined channel or timing of the service-specific SI broadcasts. In another example. the service-specific SI may be transmitted as either a broadcast or a unicast in response to a request sent by the UE 115-g. In these examples, the service-specific SI acquisition mode determination module 1010 may indicate to the SI receipt module 745-c that service-specific SI is to be received as either a broadcast or a unicast in response to a request. The SI receipt module 745-c may then facilitate receipt of the service-specific SI using information included with the service-specific periodic sync signal 370, 385, such as a predetermined channel or timing of the SI broadcast or unicast.

Figure 11:
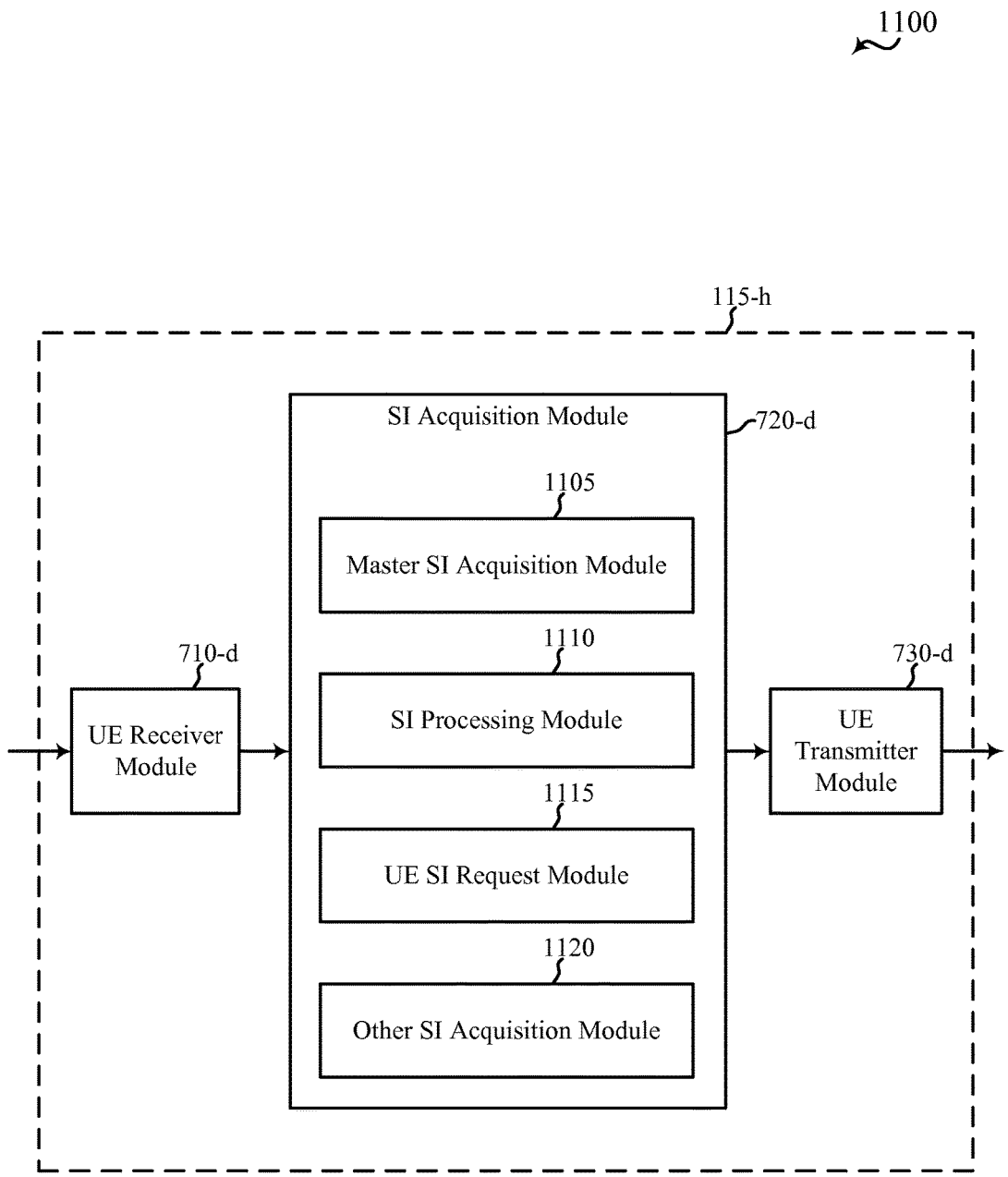
FIG. 11 shows a block diagram of a UE for use in wireless communication, in accordance with various aspects of the present disclosure.

FIG. 11 shows a block diagram 1100 of a UE 115-h for use in wireless communication, in accordance with various aspects of the present disclosure. The UE 115-h may be an example of aspects of one or more of the UEs 115 described with reference to FIGS. 1-10. The UE 115-h may include a UE receiver module 710-d, an SI acquisition module 720-d, and/or a UE transmitter module 730-d, which may be examples of the corresponding modules of UE 115-d (of FIG. 7). The UE 115-h may also include a processor (not shown). Each of these components may be in communication with each other. The SI acquisition module 720-d may include a master SI acquisition module 1105, an SI processing module 1110, a UE SI request module 1115, and/or an other SI acquisition module 1120. The UE receiver module 710-d and the UE transmitter module 730-d may perform the functions of the UE receiver module 710 and the UE transmitter module 730, of FIG. 7, respectively. In addition, the UE receiver module 710-d may be used to receive SI signals such as the OSIB 440, 445, 640, or 645 of FIGS. 4 and 6; and the UE transmitter module 730-d may be used to transmit SI signals such as the MSIB transmission request signal 332, 345, 360, 415, or 615 of FIGS. 3A, 4, and 6, or the OSIB transmission request 430 or 630 of FIGS. 4 and 6.

The modules of the UE 115-e may, individually or collectively, be implemented using one or more ASICs adapted to perform some or all of the applicable functions in hardware. Alternatively, the functions may be performed by one or more other processing units (or cores), on one or more integrated circuits. In other examples, other types of integrated circuits may be used (e.g., Structured/Platform ASICs, FPGAs, a SoC, or other Semi-Custom ICs), which may be programmed in any manner known in the art. The functions of each module may also be implemented, in whole or in part, with instructions embodied in a memory, formatted to be executed by one or more general or application-specific processors.

The master SI acquisition module 1105 may be used to receive a first set of system information (e.g., master system information, such as the master system information included in the MSIB received at 420 in FIG. 4).

The SI processing module 1110 may be used to determine, based at least in part on the first set of system information, that additional system information (e.g., non-master system information, such as the other system information described with reference to FIG. 4) is available.

The UE SI request module 1115 may be used to transmit a request (e.g., the OSIB transmission request transmitted at 430 in FIG. 4) for the additional system information. In some examples, the UE SI request module 1115 may transmit a plurality of requests for the additional system information. In some examples, a single OSIB transmission request may indicate one or a plurality of elements of additional system information that the UE 115-h would like to receive (e.g., a binary value in the OSIB transmission request may be set to TRUE for each element of additional system information that the UE 115-h would like to receive). In other examples, the UE 115-h may request some types of additional system information in different OSIB transmission requests, and the UE SI request module 1115 may be used to transmit a plurality of OSIB transmission requests.

The other SI acquisition module 1120 may be used to receive the additional system information (e.g., to receive the other system information included in the OSIB received at 440 or 445 in FIG. 4).

In some embodiments, receiving the first set of system information using the master SI acquisition module 1105 may include receiving an indication of one or more sets of additional system information that are available. In some embodiments, transmitting the request for the additional system information using the SI request module 1115 may include identifying, in the request for the additional system information, one or more sets of additional system information. In some embodiments, the one or more sets of additional system information identified in the request for the additional system information may include one or more sets of additional system information indicated in the first set of system information.

In some embodiments, receiving the additional system information using the other SI acquisition module 1120 may include at least one of: receiving system information indicating which RATs are available in a region and how the UE 115-h is to select an available RAT (e.g., UE mobility rules and policies); receiving system information indicating which services are available in a region and how the UE 115-h is to obtain an available service; receiving system information relating to an MBMS or a PWS service; receiving system information relating to location, positioning, or navigation services; or receiving system information based at least in part on a determined location of the UE 115-h.

In some embodiments, transmitting the request for additional system information using the UE SI request module 1115 may include including one or more capabilities of the UE in the request. In these embodiments, receiving the additional system information using the other SI acquisition module 1120 may include receiving system information based at least in part on the one or more capabilities of the UE 115-*h* included in the request.

In some embodiments, transmitting the request for additional system information using the UE SI request module 1115 may include including a location of the UE 115-*h* in the request. In these embodiments, receiving the additional system information using the other SI acquisition module 1120 may include receiving system information based at least in part on the location of the UE 115-*h* included in the request.

In some embodiments, transmitting the request for additional system information using the UE SI request module 1115 may include including an identification of the UE 115-*h* in the request. In these embodiments, receiving the additional system information using the other SI acquisition module 1120 may include receiving system information based at least in part on the identification of the UE 115-*h* included in the request.

Figure 12:
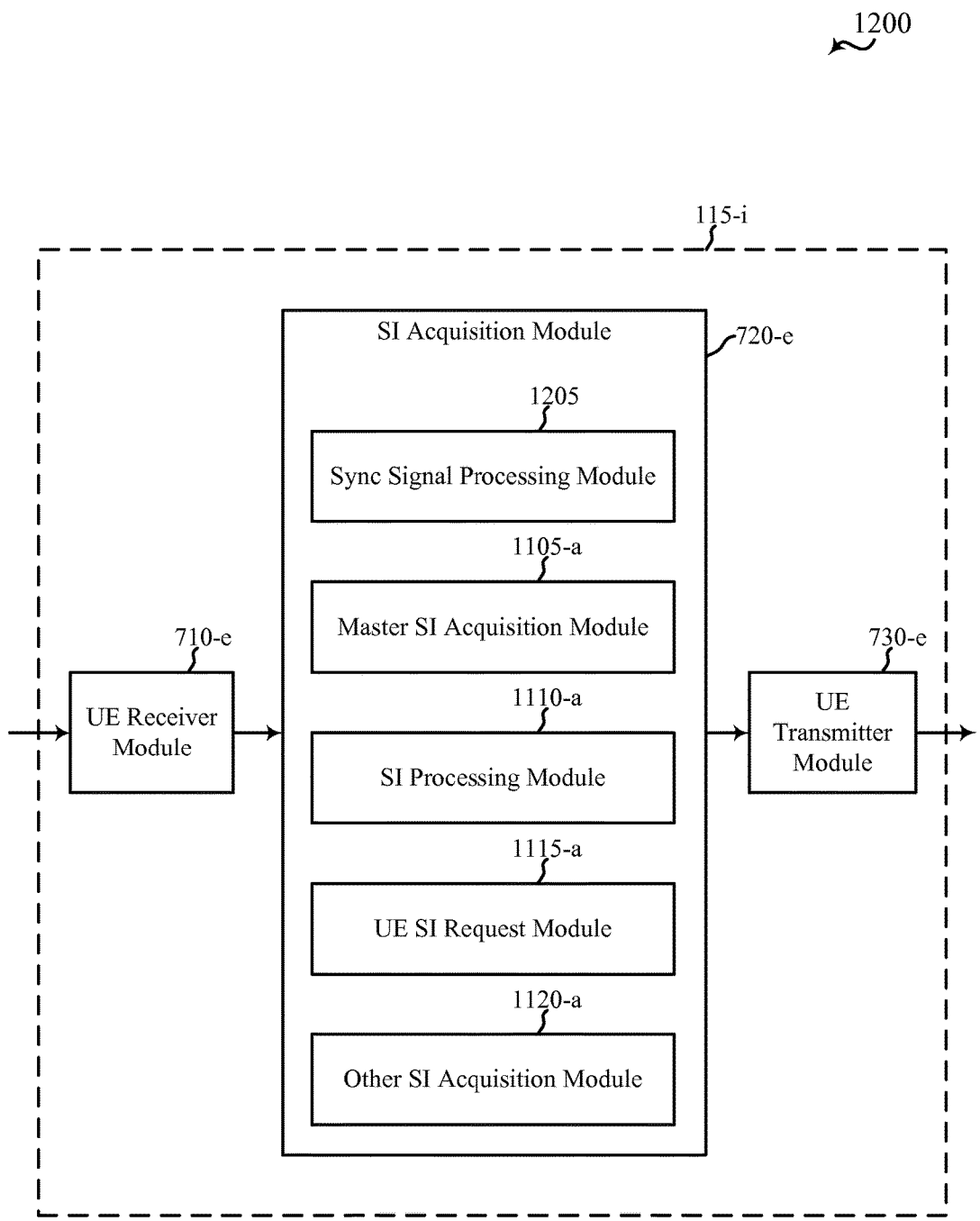
FIG. 12 shows a block diagram of a UE for use in wireless communication, in accordance with various aspects of the present disclosure.

FIG. 12 shows a block diagram 1200 of a UE 115-*i* for use in wireless communication, in accordance with various aspects of the present disclosure. The UE 115-*i* may be an example of aspects of one or more of the UEs 115 described with reference to FIGS. 1-11. The UE 115-*i* may include a UE receiver module 710-*e*, an SI acquisition module 720-*e*, and/or a UE transmitter module 730-*e*, which may be examples of the corresponding modules of UE 115-*d*, 115-*f* or 115-*h* (of FIG. 7, 9, or 11). The UE 115-*i* may also include a processor (not shown). Each of these components may be in communication with each other. The SI acquisition module 720-*e* may include a sync signal processing module 1205, a master SI acquisition module 1105-*a*, an SI processing module 1110-*a*, a UE SI request module 1115-*a*, or an other SI acquisition module 1120-*a*. The UE receiver module 710-*e* and the UE transmitter module 730-*e* may perform the functions of the UE receiver module 710 and the UE transmitter module 730, of FIG. 7, 9, or 11.

The modules of the UE 115-*i* may, individually or collectively, be implemented using one or more ASICs adapted to perform some or all of the applicable functions in hardware. Alternatively, the functions may be performed by one or more other processing units (or cores), on one or more integrated circuits. In other examples, other types of integrated circuits may be used (e.g., Structured/Platform ASICs, FPGAs, a SoC, or other Semi-Custom ICs), which may be programmed in any manner known in the art. The functions of each module may also be implemented, in whole or in part, with instructions embodied in a memory, formatted to be executed by one or more general or application-specific processors.

The sync signal processing module 1205 may be used to decode information received from a downlink channel. The decoded information may indicate that master system information (e.g., an MSIB) is received in response to a master system information request (e.g., an MSIB transmission request such as the MSIB transmission request transmitted at 415 in FIG. 4). In some examples, the downlink channel may include a synchronization signal (e.g., the instance of the periodic sync signal received at 405 in FIG. 4). The decoded information may include information decoded from the synchronization signal.

The UE SI request module 1115-*a* may be used to transmit a master system information request in accordance with the information decoded from the downlink channel by the sync signal processing module 1205.

The master SI acquisition module 1105-*a* may be used to receive the master system information (e.g., the master system information included in the MSIB received at 420 in FIG. 4). The master system information may include system information that allows the UE 115-*i* to perform an initial access of a network using one or more of an identification of the network, an identification of a base station in the network, cell selection configuration and access restrictions, or a network access configuration.

The SI processing module 1110-*a* may be used to determine, based at least in part on the master system information, that additional system information (e.g., non-master system information, such as the other system information described with reference to FIG. 4) is available.

The UE SI request module 1115-*a* may also be used to transmit a request (e.g., the OSIB transmission request transmitted at 430 in FIG. 4) for the additional system information. In some examples, the UE SI request module 1115-*a* may transmit a plurality of requests for the additional system information. In some examples, a single OSIB transmission request may indicate one or a plurality of elements of additional system information that the UE 115-*i* would like to receive (e.g., a binary value in the OSIB transmission request may be set to TRUE for each element of additional system information that the UE 115-*i* would like to receive). In other examples, the UE 115-*i* may request some types of additional system information in different OSIB transmission requests, and the UE SI request module 1115-*a* may be used to transmit a plurality of OSIB transmission requests.

The other SI acquisition module 1120-*a* may be used to receive the additional system information (e.g., to receive the other system information included in the OSIB received at 440 or 445 in FIG. 4).

In some embodiments, receiving the master system information using the master SI acquisition module 1105-*a* may include receiving an indication of one or more sets of additional system information that are available. In some embodiments, transmitting the request for the additional system information using the UE SI request module 1115-*a* may include identifying, in the request for the additional system information, one or more sets of additional system information. In some embodiments, the one or more sets of additional system information identified in the request for the additional system information may include one or more sets of additional system information indicated in the master system information.

Figure 13:
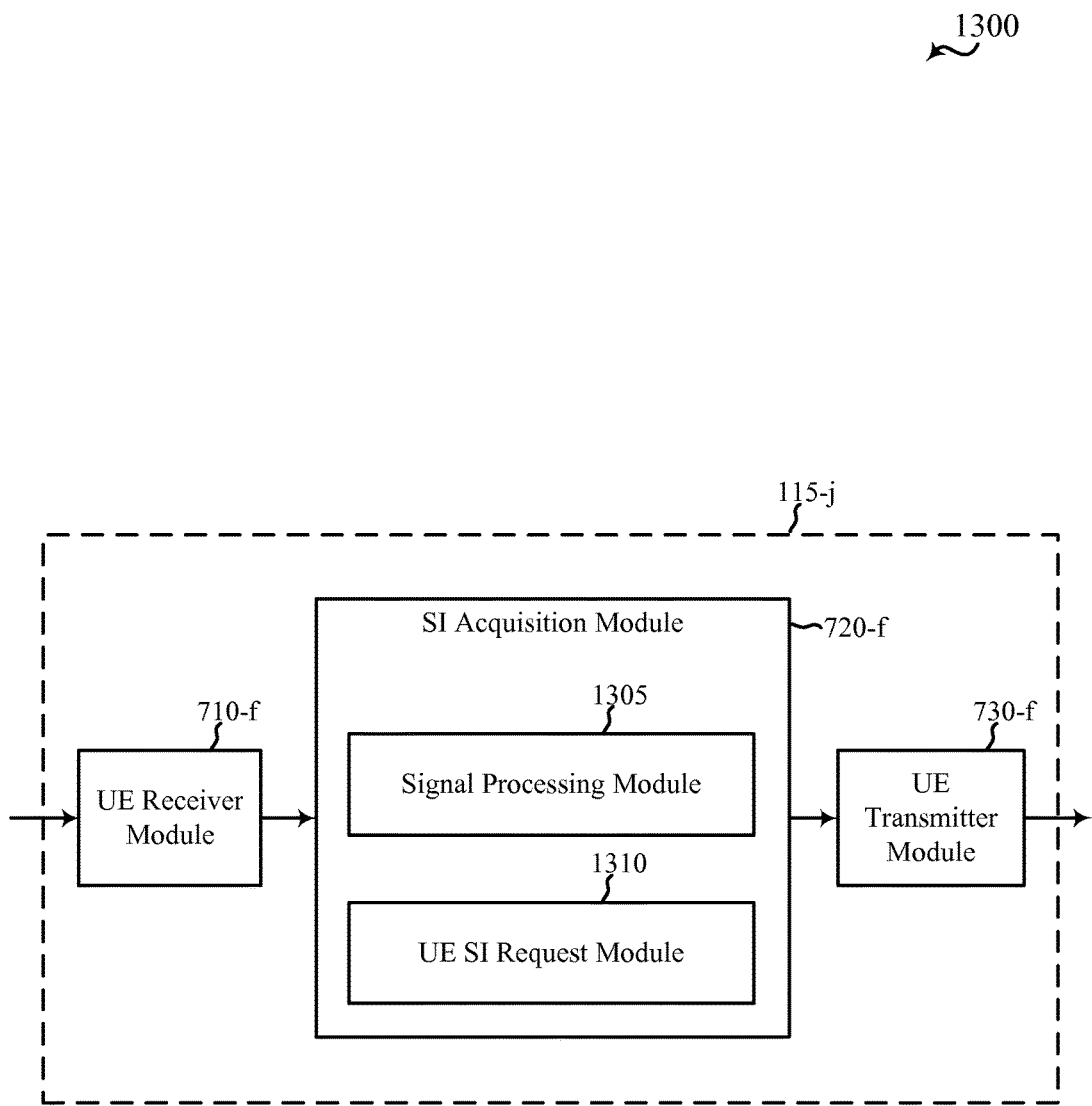
FIG. 13 shows a block diagram of a UE for use in wireless communication, in accordance with various aspects of the present disclosure.

FIG. 13 shows a block diagram 1300 of a UE 115-*j* for use in wireless communication, in accordance with various aspects of the present disclosure. The UE 115-*j* may be an example of aspects of one or more of the UEs 115 described with reference to FIGS. 1-12. The UE 115-*j* may include a UE receiver module 710-*f*, an SI acquisition module 720-*f*, or a UE transmitter module 730-*f*, which may be examples of the corresponding modules of UE 115-*d* (of FIG. 7). The UE 115-*j* may also include a processor (not shown). Each of these components may be in communication with each other. The SI acquisition module 720-*f* may include a signal processing module 1305 or a UE SI request module 1310. The UE receiver module 710-*f* and the UE transmitter module 730-*f* may perform the functions of the UE receiver module 710 and the UE transmitter module 730, of FIG. 7, respectively. In addition, the UE receiver module 710-*f* may be used to receive SI signals such as the OSIB 440, 445, 640, or 645 of FIGS. 4 and 6, a value tag associated with SI, or a zone identifier; and the UE transmitter module 730-*f* may be used to transmit SI signals such as the MSIB transmission request signal 332, 345, 360, 415, or 615 of FIGS. 3A, 4, and 6, or the OSIB transmission request 430 or 630 of FIGS. 4 and 6.

The modules of the UE 115-*j* may, individually or collectively, be implemented using one or more ASICs adapted to perform some or all of the applicable functions in hardware. Alternatively, the functions may be performed by one or more other processing units (or cores), on one or more integrated circuits. In other examples, other types of integrated circuits may be used (e.g., Structured/Platform ASICs, FPGAs, a SoC, or other Semi-Custom ICs), which may be programmed in any manner known in the art. The functions of each module may also be implemented, in whole or in part, with instructions embodied in a memory, formatted to be executed by one or more general or application-specific processors.

The signal processing module 1305 may be used to receive a first signal (e.g., a sync signal or paging message such as the instance of the periodic sync signal or paging message received at 605 in FIG. 6 or the MSIB received at 620 in FIG. 6). In some cases, the signal processing module 1305 may receive the first signal while the UE 115-*j* is communicating with a network using first system information. The signal processing module 1305 may also be used to determine, based at least in part on the first signal, to request updated system information.

The UE SI request module 1310 may be used to request updated system information (e.g., to transmit the MSIB transmission request transmitted at 615 in FIG. 6 or the OSIB transmission request transmitted at 630 in FIG. 6) based at least in part on the determination made by the signal processing module 1305.

In some embodiments, determining to request the updated system information using the signal processing module 1305 may include at least one of: identifying that the UE 115-*j* has moved into a zone using second system information that is different from the first system information; identifying that the network has changed at least a portion of the first system information; or identifying that the UE 115-*j* has moved more than a predetermined distance from a location where the UE 115-*j* obtained the first system information a previous time (e.g., from the location where the UE obtained the first system information last time).

In some embodiments, receiving the first signal using the signal processing module 1305 may include receiving a zone identifier (e.g., an area code, a BSIC, or another cell identifier). In some cases, the zone identifier may be received as part of a synchronization signal. In some cases, the zone identifier may be transmitted as part of a synchronization signal. In some cases, the zone identifier may identify one of the neighbor RATs of zones 510, 515, or 520 described with reference to FIG. 5. In these embodiments, the signal processing module 1305 may use the zone identifier to identify that the UE 115-*j* has moved from a first zone to a second zone. In some embodiments, determining to request updated system information using the signal processing module 1305 may include identifying a distance between a current location of the UE 115-*j* and a location where the UE 115-*j* obtained the first system information a previous time (e.g., the last time), and determining that the identified distance exceeds a predetermined threshold. In some cases, the predetermined threshold may be received from the network. In some cases, a location signal identifying a location of the UE 115-*j* may also be received. The location signal may be received, for example, as part of receiving the first signal. The location signal may also be received in other ways, such as via a Global Navigation Satellite System (GNSS; e.g., GPS, Galileo, GLONASS or BeiDou).

Figure 14:
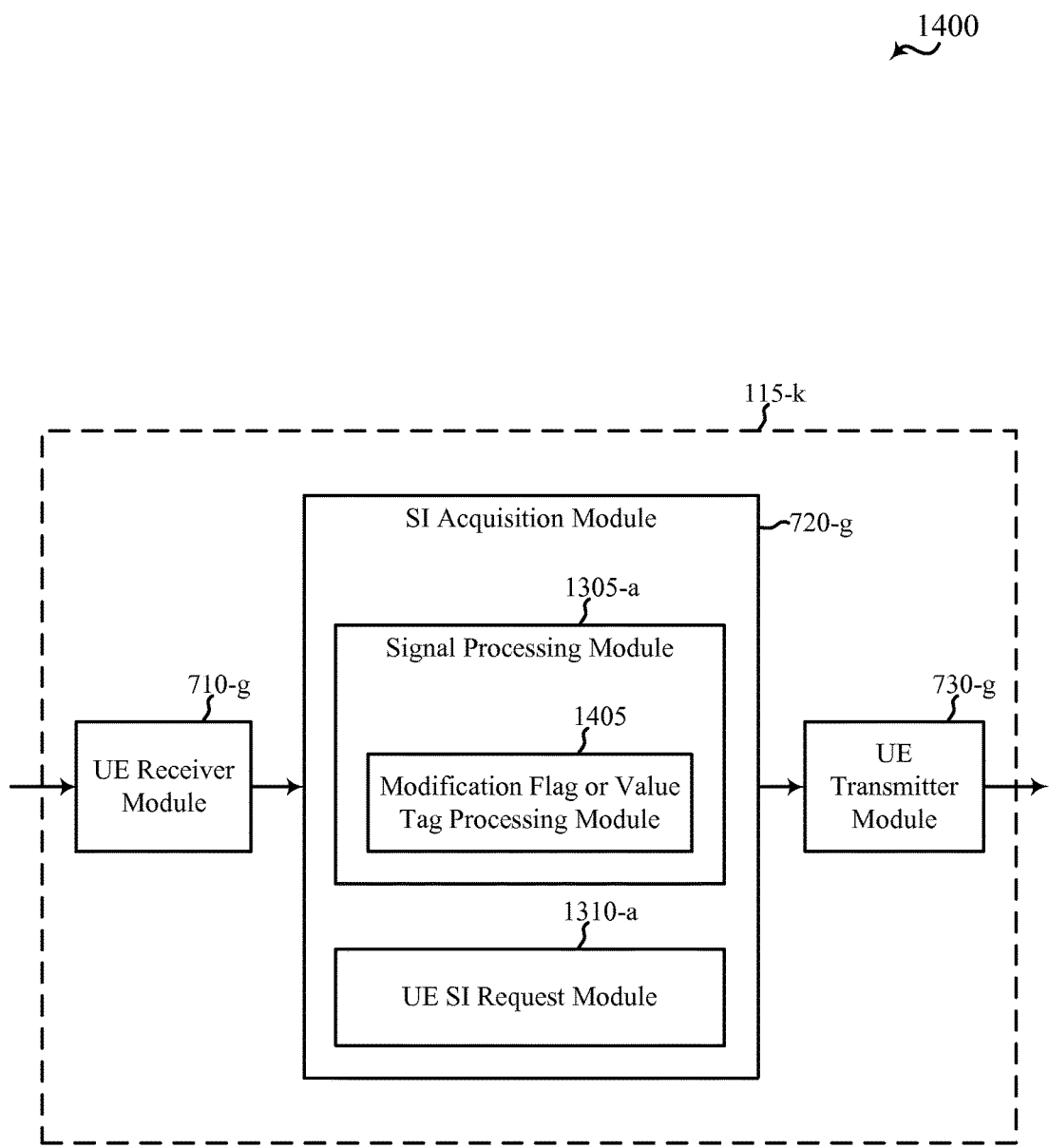
FIG. 14 shows a block diagram of a UE for use in wireless communication, in accordance with various aspects of the present disclosure.

FIG. 14 shows a block diagram 1400 of a UE 115-*k* for use in wireless communication, in accordance with various aspects of the present disclosure. The UE 115-*k* may be an example of aspects of one or more of the UEs 115 described with reference to FIGS. 1-13. The UE 115-*k* may include a UE receiver module 710-*g*, an SI acquisition module 720-*g*, or a UE transmitter module 730-*g*, which may be examples of the corresponding modules of UE 115-*d* or 115-*j* (of FIG. 7, 9, or 11). The UE 115-*k* may also be or include a processor (not shown). Each of these components may be in communication with each other. The SI acquisition module 720-*g* may include a signal processing module 1305-*a* or a UE SI request module 1310-*a*. The UE receiver module 710-*g* and the UE transmitter module 730-*g* may perform the functions of the UE receiver module 710 and the UE transmitter module 730, of FIG. 7, 9, or 11.

The modules of the UE 115-*k* may, individually or collectively, be implemented using one or more ASICs adapted to perform some or all of the applicable functions in hardware. Alternatively, the functions may be performed by one or more other processing units (or cores), on one or more integrated circuits. In other examples, other types of integrated circuits may be used (e.g., Structured/Platform ASICs, FPGAs, a SoC, or other Semi-Custom ICs), which may be programmed in any manner known in the art. The functions of each module may also be implemented, in whole or in part, with instructions embodied in a memory, formatted to be executed by one or more general or application-specific processors.

The signal processing module 1305-*a* may be used to receive a first signal (e.g., a sync signal or paging message such as the instance of the periodic sync signal or paging message received at 605 in FIG. 6 or the MSIB received at 620 in FIG. 6). In some cases, the signal processing module 1305-*a* may receive the first signal while the UE 115-*k* is communicating with a network using first system information, and the first signal may include an indication that at least a portion of the first system information has changed.

The signal processing module 1305-*a* may include a modification flag or value tag processing module 1405. The modification flag or value tag processing module 1405 may be used, in some examples, to receive one or more modification flags, each of which indicates, by a counter value or Boolean variable (e.g., a binary value), that a corresponding portion of the first system information has changed. In some examples, the corresponding portion of the first system information may include a portion of master system information, such as an MSIB or element of an MSIB, In other examples, the corresponding portion of the first system information may include additional non-master system information, such as an OSIB or element of an OSIB. The master system information may include one or more of an identification of the network, an identification of a base station in the network, cell selection configuration and access restrictions, or network access configuration information. The master system information may also or alternatively include, for example, one or more other elements of the master system information described with reference to FIG. 3A. The additional non-master system information may include one or more elements of the other system information described with reference to FIG. 4 or 6. In some embodiments, the modification flag may be received with (or as a part of) the first signal.

The modification flag or value tag processing module 1405 may also be used, in some examples, to receive one or more value tags corresponding to at least a portion (or different portions) of the first system information that has/have changed. In some examples, the one or more value tags may correspond to one or more portions of master system information (e.g., one or more MSIBs, or one or more elements of one or more MSIBs), one or more portions of additional non-master system information (e.g., one or more OSIBs, or one or more elements of one or more OSIBs), or a combination thereof. The master system information may include one or more of an identification of the network, an identification of a base station in the network, cell selection configuration and access restrictions, or network access configuration information. The master system information may also or alternatively include, for example, one or more other elements of the master system information described with reference to FIG. 3A. The additional non-master system information may include one or more elements of the other system information described with reference to FIG. 4 or 6. In some embodiments, one or more value tags may be received with (or as part of) the first signal.

The signal processing module 1305-a or modification flag or value tag processing module 1405 may also be used to determine, based at least in part on the first signal, a modification flag included in the first signal, or one or more value tags included in the first signal, to request updated system information. In some cases, determining to request updated system information may include determining a received modification flag is set to TRUE. In some cases, determining to request updated system information may include comparing a received value tag with a previously received value tag), and determining to request the updated system information based at least in part on the comparison (e.g., determining to request the updated system information when the value tags do not match).

The UE SI request module 1310-a may be used to request updated system information based at least in part on the determination made by the signal processing module 1305-a (e.g., to transmit the MSIB transmission request at 615 in FIG. 6 or to transmit the OSIB transmission request at 630 in FIG. 6).

Figure 15:
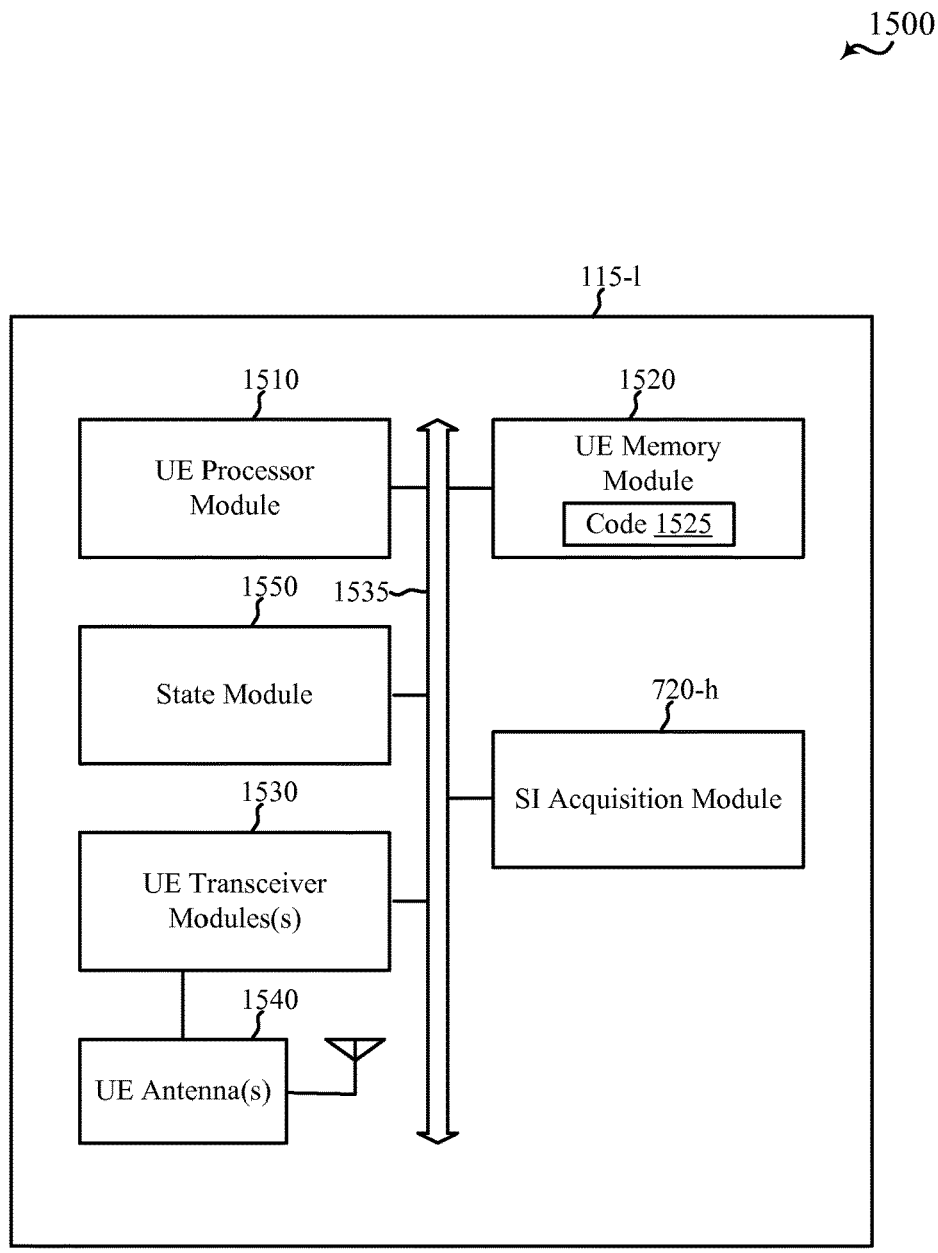
FIG. 15 shows a block diagram of a UE for use in wireless communication, in accordance with various aspects of the present disclosure.

FIG. 15 shows a block diagram 1500 of a UE 115-l for use in wireless communication, in accordance with various aspects of the present disclosure. The UE 115-l may have various configurations and may be included or be part of a personal computer (e.g., a laptop computer, a netbook computer, a tablet computer, etc.), a cellular telephone, a smart phone, a PDA, a wireless modem, a USB dongle, a wireless router, a digital video recorder (DVR), an internet appliance, a gaming console, an e-reader, etc. The UE 115-l may, in some examples, have an internal power supply (not shown), such as a small battery, to facilitate mobile operation. In some examples, the UE 115-l may be an example of aspects of one or more of the UEs 115 described with reference to FIGS. 1-14. The UE 115-l may be configured to implement at least some of the UE features and functions described with reference to FIGS. 1-14.

The UE 115-l may include a UE processor module 1510, a UE memory module 1520, at least one UE transceiver module (represented by UE transceiver module(s) 1530), at least one UE antenna (represented by UE antenna(s) 1540), or SI acquisition module 720-h. Each of these components may be in communication with each other, directly or indirectly, over one or more buses 1535.

The UE memory module 1520 may include random access memory (RAM) or read-only memory (ROM). The UE memory module 1520 may store computer-readable, computer-executable code 1525 containing instructions that are configured to, when executed, cause the UE processor module 1510 to perform various functions described herein related to wireless communication, including, for example, transmissions of a pilot signal. Alternatively, the code 1525 may not be directly executable by the UE processor module 1510 but be configured to cause the UE 115-l (e.g., when compiled and executed) to perform various of the functions described herein.

The UE processor module 1510 may include an intelligent hardware device, e.g., a central processing unit (CPU), a microcontroller, an ASIC, etc. The UE processor module 1510 may process information received through the UE transceiver module(s) 1530 or information to be sent to the UE transceiver module(s) 1530 for transmission through the UE antenna(s) 1540. The UE processor module 1510 may handle various aspects of communicating over (or managing communications over) a wireless medium.

The UE transceiver module(s) 1530 may include a modem configured to modulate packets and provide the modulated packets to the UE antenna(s) 1540 for transmission, and to demodulate packets received from the UE antenna(s) 1540. The UE transceiver module(s) 1530 may, in some examples, be implemented as one or more UE transmitter modules and one or more separate UE receiver modules. The UE transceiver module(s) 1530 may support communications on one or more wireless channels. The UE transceiver module(s) 1530 may be configured to communicate bi-directionally, via the UE antenna(s) 1540, with one or more base stations, such as one or more of the base stations 105 described with reference to FIG. 1, 2, 4, or 6. While the UE 115-l may include a single UE antenna, there may be examples in which the UE 115-l may include multiple UE antennas 1540.

The UE state module 1550 may be used, for example, to manage transitions of the UE 115-l between RRC connected states, and may be in communication with other components of the UE 115-l, directly or indirectly, over the one or more buses 1535. The UE state module 1550, or portions of it, may include a processor, and/or some or all of the functions of the UE state module 1550 may be performed by the UE processor module 1510 or in connection with the UE processor module 1510.

The SI acquisition module 720-h may be configured to perform or control some or all of the system information acquisition features or functions described with reference to FIGS. 1-14. The SI acquisition module 720-h, or portions of it, may include a processor, or some or all of the functions of the SI acquisition module 720-h may be performed by the UE processor module 1510 or in connection with the UE processor module 1510. In some examples, the SI acquisition module 720-h may be an example of the SI acquisition module 720 described with reference to FIGS. 7-14.

Figure 16:
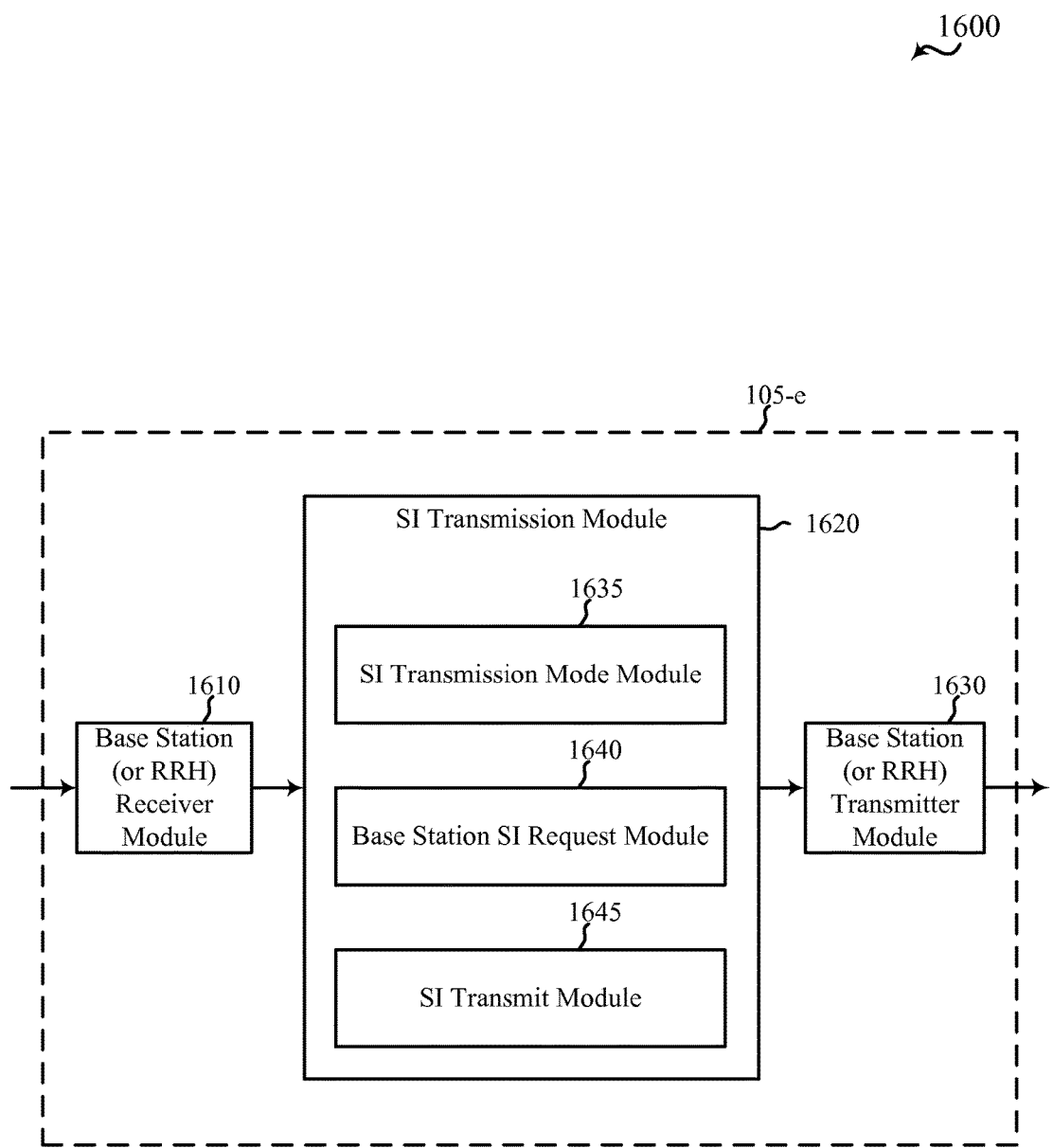
FIG. 16 shows a block diagram of a base station for use in wireless communication, in accordance with various aspects of the present disclosure.

FIG. 16 shows a block diagram 1600 of a base station 105-e for wireless communication, in accordance with various aspects of the present disclosure. The base station 105-e may be an example of one or more aspects of a base stations 105 described with reference to FIGS. 1-6. The base station 105-e may also be or include a processor. The base station 105-e may include a base station (or RRH) receiver module 1610, an SI transmission module 1620, or a base station (or RRH) transmitter module 1630. The SI transmission module 1620 may include an SI transmission mode module 1635, a base station SI request module 1640, or an SI transmit module 1645. Each of these modules may be in communication with each other. In configurations of the base station 105-e including one or more RRHs, aspects of one or more of the modules 1610, 1620, or 1630 may be moved to each of the one or more RRHs.

The base station 105-e, through the base station receiver module 1610, the SI transmission module 1620, and/or the base station transmitter module 1630, may be configured to perform aspects of the functions described herein. For example, the base station 105-*e* may be configured to determine an SI transmission mode, receive requests for the SI (from a UE 115, for example), and transmit the SI in accordance with one or more of the received requests and the determined transmission modes, as described in greater detail herein.

The components of the base station 105-*e* may, individually or collectively, be implemented using one or more ASICs adapted to perform some or all of the applicable functions in hardware. Alternatively, the functions may be performed by one or more other processing units (or cores), on one or more integrated circuits. In other examples, other types of integrated circuits may be used (e.g., Structured/Platform ASICs, FPGAs, a SoC, or other Semi-Custom ICs), which may be programmed in any manner known in the art. The functions of each component may also be implemented, in whole or in part, with instructions embodied in a memory, formatted to be executed by one or more general or application-specific processors.

In some examples, the base station receiver module 1610 may include at least one RF receiver. The base station receiver module 1610 or RF receiver may be used to receive various types of data or control signals (i.e., transmissions) over one or more communication links of a wireless communication system, such as one or more communication links of the wireless communication system 100 described with reference to FIG. 1. As an example, the base station receiver module 1610 may be used to receive an MSIB transmission request signal 332, 345, 360, as described with reference to FIGS. 3A, 3B, and 4. The receipt and processing of the SI request signals (for example, the MSIB transmission request signal 332, 345, 360 of FIG. 3A) may be additionally facilitated through the SI transmission module 1620, as described in greater detail below.

In some examples, the base station transmitter module 1630 may include at least one RF transmitter. The base station transmitter module 1630 or RF transmitter may be used to transmit various types of data or control signals (i.e., transmissions) over one or more communication links of a wireless communication system, such as one or more communication links of the wireless communication system 100 described with reference to FIG. 1. As an example, the base station transmitter module 1630 may be used to transmit a periodic sync signal 310, 325, 340, or 355, as described with reference to FIGS. 3A, 3B, and 4. The base station transmitter module 1630 may also be used to transmit various signals that include one or more forms of SI, such as the broadcast MSIBs 315, 330, 342, or the unicast MSIB 358, as also described with reference to FIGS. 3A, 3B, and 4. The transmission of the synchronization signals and the SI signals may be additionally facilitated through the SI transmission module 1620, as described in greater detail below.

The SI transmission module 1620 may be used to manage one or more aspects of wireless communication for the base station 105-*e*. In particular, the SI transmission module 1620 may be used to facilitate the transmission of SI from the base station 105-*e*, in accordance to aspects of some of the embodiments described above. The SI transmission module 1620 may include an SI transmission mode module 1635, a base station SI request module 1640, or an SI transmit module 1645.

The SI transmission mode module 1635 may be used by the base station 105-*e* to facilitate determination by the base station 105-*e* of an SI transmission mode and transmission by the base station 105-*e* of a periodic sync signal 310, 325, 340, 355, as illustrated in FIGS. 3A, and 4, for example.

Examples of the different transmission modes may be illustrated and described above with relation to FIG. 3A. For example, one transmission mode may include an SI broadcast having fixed periodic scheduling and targeting a cell edge, as illustrated in the transmission/reception timeline 305 of FIG. 3A. In this example, the base station 105-*e* may transmit a periodic sync signal 310 which may indicate to UEs 115 that SI information is to be periodically broadcast without the need for the UEs 115 to transmit a specific request for SI. This SI transmission mode may be beneficially used when many UEs 115 are requesting SI. Because the SI transmission is a broadcast, the number of UEs 115 requiring SI will have no effect on the transmission of SI. However, this SI transmission mode may also include some drawbacks. Namely, a broadcast that targets a cell edge may require a significant transmission power and thus may result in radio resource wastage if the number of UEs 115 camped on the cell or zone is low. Additionally, in this transmission mode, the base station 105-*e* may broadcast SI regardless of the number of UEs 115 camped on the cell or zone. Even if no UEs 115 are camped on the cell or zone, the base station 105-*e* may continue to broadcast SI, thus resulting in resource wastage and possible interference.

Another transmission mode may include an SI broadcast having an on-demand periodic scheduling and that targets a cell edge, as illustrated in the transmission/reception timeline 320 of FIG. 3A. In this example, the base station 105-*e* may transmit a periodic sync signal 325 which may indicate to UEs 115 that SI information is to be periodically broadcast in response to an MSIB transmission request signal 332. This SI transmission mode may be beneficially used such that the base station 105-*e* is not required to perform resource allocation and data scheduling on a per UE basis but can just continue a periodic broadcast. Additionally, if no UEs 115 are requesting SI, the base station 105-*e* may discontinue its broadcasts in order to save energy and reduce interference. Conversely, the broadcast targeting of a cell edge may still require a significant power usage, which may still result in power wastage and possible interference.

Yet another transmission mode may include an SI broadcast having an on-demand aperiodic scheduling and that targets a group of UEs 115, as illustrated in the transmission/reception timeline 335 of FIG. 3A. In this example, the base station 105-*e* may transmit a periodic sync signal 340 which may indicate to UEs 115 that SI information is to be aperiodically broadcast in response to an MSIB transmission request signal 345. This SI transmission mode may be beneficially used such that the base station 105-*e* is able to stop SI broadcasts when no UEs are requesting SI, thus saving energy and reducing possible interference. Additionally, because the base station 105-*e* is targeting only a group of UEs 115 (instead of a cell edge), less transmission power is required. However, in this transmission mode, the base station 105-*e* may be required to optimize SI transmission for groups of UEs, thus potentially levying a higher processing load. Additionally, this mode is still not as efficient as unicast transmission, though efficiency may depend on a number of UEs 115 requesting SI.

A fourth transmission mode may include an SI unicast having on-demand aperiodic scheduling and that targets a single UE 115, as illustrated in the transmission/reception timeline 350 of FIG. 3A. In this example, the base station 105-*e* may transmit a periodic sync signal 355 which may indicate to UEs 115 that SI information is to be aperiodically unicast in response to an MSIB transmission request signal 360. This SI transmission mode has benefits of allowing the base station 105-*e* to stop SI transmission when no UEs 115 are requesting SI, and can provide high efficiency in providing SI to UEs 115. This mode may, however, have an accompanying increase in processing loads at the base station 105-e.

The transmission modes described above have been generally described using the terms broadcast and unicast, which may be most appropriately used when the network in which the base station 105-e is participating is a non-massive MIMO network. On the other hand, if a massive MIMO environment is configured, broad-beam and narrow-beam transmissions may be used in place of broadcast or unicast transmissions. A broad-beam transmission may provide wide coverage which can serve more than one UE 115, though a broad-beam transmission may require additional radio resources with respect to a narrow-beam transmission which serves only a single UE 115.

In general, a broad-beam or broadcast operation offers better efficiency in situations where there are many UEs 115 attempting to acquire SI, while a narrow-beam or unicast operation offers better efficiency in situations where there are a smaller number of UEs 115 attempting to acquire SI.

The SI transmission mode module 1635 may facilitate a transition between transmission modes, for example. One implementation may include the changing of transmission modes based on a number of UEs 115 requesting SI acquisition, network load, congestion status, or available radio resources.

For example, in a non-massive MIMO situation, if the number of UEs 115 requesting SI acquisition is greater than a predetermined threshold number N, then the SI transmission mode module 1635 may determine to include an indicator in a periodic sync signal 310 that indicates that the SI will be periodically broadcast (e.g., the indicator may indicate that SI transmission is fixed). In this situation, the base station 105-e may periodically broadcast the SI without requiring a specific SI request from a UE 115, and UEs 115 may acquire the SI by monitoring an SI-RNTI and/or an RNTI assigned for the concerned UE (e.g., a C-RNTI/Z-RNTI) if present, for example, and as described above.

If, however, in the non-massive MIMO situation, the number of UEs 115 requesting SI acquisition is not greater than or equal to the predetermined threshold number N or is smaller than the predetermined the threshold number $N_2$, the SI transmission mode module 1635 may determine to include an indicator in a periodic sync signal 325, 340, 355 that indicates that the SI will be transmitted in response to a request (e.g., the indicator may indicate that SI transmission is on-demand). In this situation, the base station 105-e may transmit the SI in response to a specific SI request from a UE 115, and UEs 115 may acquire the SI by monitoring an SI-RNTI and/or an RNTI assigned for the concerned UE (e.g., a C-RNTI/Z-RNTI) if present, for example, and as described above. In this situation, the base-station 105-e may transmit the SI by either broadcasting the SI in accordance with on-demand periodic scheduling targeting a cell edge, broadcasting the SI in accordance with on-demand aperiodic scheduling targeting a group of UEs 115, or unicasting the SI in accordance with on-demand aperiodic scheduling targeting a single UE 115.

In a massive MIMO situation, if the number of UEs 115 requesting SI acquisition is greater than a predetermined threshold number N, then the SI transmission mode module 1635 may determine to include an indicator in a periodic sync signal 310 that indicates that the SI will be periodically transmitted via a broad-beam operation (e.g., the indicator may indicate that SI transmission is fixed). In this situation, the base station 105-e may periodically transmit via broad-beam the SI without requiring a specific SI request from a UE 115, and UEs 115 may acquire the SI by monitoring an SI-RNTI and/or an RNTI assigned for the concerned UE (e.g., a C-RNTI/Z-RNTI) if present, for example, and as described above.

If, however, in the massive MIMO situation, the number of UEs 115 requesting SI acquisition is not greater than or equal to the predetermined threshold number N, or is smaller than the predetermined threshold number $N_2$, the SI transmission mode module 1635 may determine to include an indicator in a periodic sync signal 325, 340, 355 that indicates that the SI will be transmitted in response to a request (e.g., the indicator may indicate that SI transmission is on-demand). The SI transmission may be either broad-beam or narrow-beam. In this situation, the base station 105-e may transmit the SI in response to a specific SI request from a UE 115, and UEs 115 may acquire the SI by monitoring an SI-RNTI and/or an RNTI assigned for the concerned UE (e.g., a C-RNTI/Z-RNTI) if present, for example, and as described above. In this situation, the base-station 105-e may transmit the SI by either using a broad-beam transmission of the SI in accordance with on-demand periodic scheduling targeting a cell edge, using a broad-beam transmission of the SI in accordance with on-demand aperiodic scheduling targeting a group of UEs 115, or by using a narrow-beam transmission of the SI in accordance with on-demand aperiodic scheduling targeting a single UE 115.

In the event that the base station 105-e is operating in a network using an on-demand SI mode, meaning that the base station 105-e is to receive a request from a UE 115 prior to the base station 105-e transmitting SI, the base station SI request module 1640 may be used to facilitate the receipt of such a request. As an example, the base station SI request module 1640 may be used to receive any one of the MSIB transmission request signals 332, 345, 360 of FIG. 3A. The MSIB transmission request signals 332, 345, 360 may be sent in accordance with information included with the periodic sync signals 325, 340, 355, such as destination and/or timing to be used for the MSIB transmission request signals 332, 345, 360.

The SI transmit module 1645 may be used to facilitate the transmission of SI to the UEs 115. The SI may be transmitted as a broadcast or broad-beam operation without any need for a request sent by a UE 115. In this example, the SI transmission mode module 1635 may indicate to the SI transmit module 1645 that SI is to be transmitted via a broadcast or a broad-beam operation. The SI transmit module 1645 may then facilitate transmission of the SI in accordance with information included with the periodic sync signal 310, such as on a predetermined channel or timing of the SI broadcast. In another example, the SI may be transmitted as either a broadcast or a unicast (or a broad-beam operation or a narrow-beam operation) in response to a request sent by a UE 115. In these examples, the SI transmission mode module 1635 may indicate to the SI transmit module 1645 that SI is to be transmitted as either a broadcast or a unicast (or a broad-beam operation or a narrow-beam operation) in response to a request. The SI transmit module 1645 may then facilitate transmission of the SI in accordance with information included with the periodic sync signals 325, 340, 355, such as use of a predetermined channel or timing of the SI broadcast or unicast (or broad-beam operation or narrow-beam operation).

Figure 17:
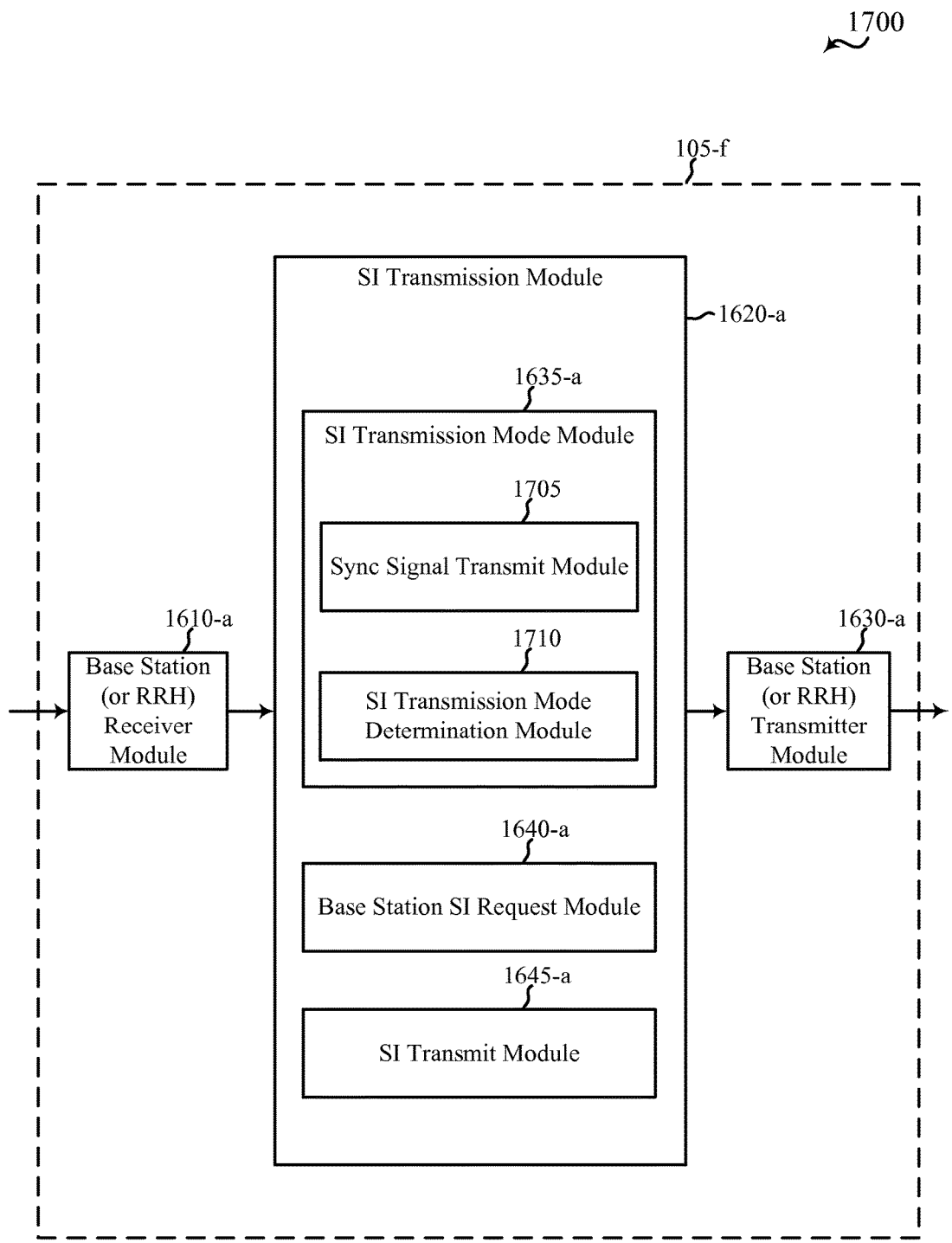
FIG. 17 shows a block diagram of a base station for use in wireless communication, in accordance with various aspects of the present disclosure.

FIG. 17 shows a block diagram 1700 of a base station 105-f for use in wireless communication, in accordance with various examples. The base station 105-f may be an example of one or more aspects of a base station 105 described with reference to FIGS. 1-6 and 14. The base station 105-*f* may include a base station (or RRH) receiver module 1610-*a*, an SI transmission module 1620-*a*, or a base station (or RRH) transmitter module 1630-*a*, which may be examples of the corresponding modules of base station 105-*e* (of FIG. 16). The base station 105-*f* may also include a processor (not shown). Each of these components may be in communication with each other. The SI transmission module 1620-*a* may include an SI transmission mode module 1635-*a*, a base station SI request module 1640-*a*, or an SI transmit module 1645-*a*. The SI transmission mode module 1635-*a* may further include a sync signal transmit module 1705 or an SI transmission mode determination module 1710. The base station receiver module 1610-*a* and the base station transmitter module 1630-*a* may perform the functions of the base station receiver module 1610 and the base station transmitter module 1630, of FIG. 16, respectively. In configurations of the base station 105-*f* including one or more RRHs, aspects of one or more of the modules 1610-*a*, 1620-*a*, or 1630-*a* may be moved to each of the one or more RRHs.

The modules of the base station 105-*f* may, individually or collectively, be implemented using one or more ASICs adapted to perform some or all of the applicable functions in hardware. Alternatively, the functions may be performed by one or more other processing units (or cores), on one or more integrated circuits. In other examples, other types of integrated circuits may be used (e.g., Structured/Platform ASICs, FPGAs, a SoC, or other Semi-Custom ICs), which may be programmed in any manner known in the art. The functions of each module may also be implemented, in whole or in part, with instructions embodied in a memory, formatted to be executed by one or more general or application-specific processors.

The sync signal transmit module 1705 of the SI transmission mode module 1635-*a* may be used by the base station 105-*f* to transmit a periodic sync signal to indicate to UEs 115 whether SI acquisition is to be performed via a fixed periodic mode or via an on-demand mode. The sync signal transmit module 1705 may transmit a periodic sync signal 310, 325, 340, 355, as illustrated in FIG. 3A, for example.

The base station 105-*f* may further operate in a specific SI transmission mode, which may be determined through the use of the SI transmission mode determination module 1710. Examples of the different transmission modes may be illustrated and described above with relation to FIG. 3A. For example, one transmission mode may include an SI broadcast having fixed periodic scheduling and targeting a cell edge, as illustrated in the transmission/reception timeline 305 of FIG. 3A. In this example, the base station 105-*f* may transmit a periodic sync signal 310 which may indicate to UEs 115 that SI information is to be periodically broadcast without the need for the UEs 115 to transmit a specific request for SI.

Another transmission mode may include an SI broadcast having an on-demand periodic scheduling and that targets a cell edge, as illustrated in the transmission/reception timeline 320 of FIG. 3A. In this example, the base station 105-*f* may transmit a periodic sync signal 325 which may indicate to UEs 115 that SI information is to be periodically broadcast in response to an MSIB transmission request signal 332.

Yet another transmission mode may include an SI broadcast having an on-demand aperiodic scheduling and that targets a group of UEs 115, as illustrated in the transmission/reception timeline 335 of FIG. 3A. In this example, the base station 105-*f* may transmit a periodic sync signal 340 which may indicate to UEs 115 that SI information is to be aperiodically broadcast in response to an MSIB transmission request signal 345.

A fourth transmission mode may include an SI unicast having on-demand aperiodic scheduling and that targets a single UE 115, as illustrated in the transmission/reception timeline 350 of FIG. 3A. In this example, the base station 105-*f* may transmit a periodic sync signal 355 which may indicate to UEs 115 that SI information is to be aperiodically unicast in response to an MSIB transmission request signal 360.

The transmission modes described above have been generally described using the terms broadcast and unicast, which may be most appropriately used when the network in which the base station 105-*f* is participating is a non-massive MIMO network. On the other hand, if a massive MIMO environment is configured, broad-beam and narrow-beam transmissions may be used in place of broadcast or unicast transmissions. A broad-beam transmission may provide wide coverage which can serve more than one UE 115, though a broad-beam transmission may require additional radio resources with respect to a narrow-beam transmission which serves only a single UE 115.

In general, a broad-beam or broadcast operation offers better efficiency in situations where there are many UEs 115 attempting to acquire SI, while a narrow-beam or unicast operation offers better efficiency in situations where there are a smaller number of UEs 115 attempting to acquire SI.

The SI transmission mode determination module 1710 may facilitate a transition between transmission modes, for example. One implementation may include the changing of transmission modes based on a number of UEs 115 requesting SI acquisition, network load, congestion status, or available radio resources.

For example, in a non-massive MIMO situation, if the number of UEs 115 requesting SI acquisition is greater than a predetermined threshold number N, then the SI transmission mode determination module 1710 may determine to include an indicator in a periodic sync signal 310 that indicates that the SI will be periodically broadcast (e.g., the indicator may indicate that SI transmission is fixed). In this situation, the base station 105-*f* may periodically broadcast the SI without requiring a specific SI request from a UE 115, and UEs 115 may acquire the SI by monitoring an SI-RNTI and/or an RNTI assigned for the concerned UE (e.g., a C-RNTI/Z-RNTI) if present, for example, and as described above.

If, however, in the non-massive MIMO situation, the number of UEs 115 requesting SI acquisition is not greater than or equal to the predetermined threshold number N, or is smaller than the predetermined threshold number $N_2$, the SI transmission mode determination module 1710 may determine to include an indicator in a periodic sync signal 325, 340, 355 that indicates that the SI will be transmitted in response to a request (e.g., the indicator may indicate that SI transmission is on-demand). In this situation, the base station 105-*f* may transmit the SI in response to a specific SI request from a UE 115, and UEs 115 may acquire the SI by monitoring an SI-RNTI and/or an RNTI assigned for the concerned UE (e.g., a C-RNTI/Z-RNTI) if present, for example, and as described above. In this situation, the base-station 105-*f* may transmit the SI by either broadcasting the SI in accordance with on-demand periodic scheduling targeting a cell edge, broadcasting the SI in accordance with on-demand aperiodic scheduling targeting a group of UEs 115, or unicasting the SI in accordance with on-demand aperiodic scheduling targeting a single UE 115.

In a massive MIMO situation, if the number of UEs 115 requesting SI acquisition is greater than a predetermined threshold number N, then the SI transmission mode determination module 1710 may determine to include an indicator in a periodic sync signal 310 that indicates that the SI will be periodically transmitted via a broad-beam operation (e.g., the indicator may indicate that SI transmission is fixed). In this situation, the base station 105-$f$ may periodically transmit via broad-beam the SI without requiring a specific SI request from a UE 115, and UEs 115 may acquire the SI by monitoring an SI-RNTI and/or an RNTI assigned for the concerned UE (e.g., a C-RNTI/Z-RNTI) if present, for example, and as described above.

If, however, in the massive MIMO situation, the number of UEs 115 requesting SI acquisition is not greater than or equal to the predetermined threshold number N, or is smaller than the predetermined threshold number $N_2$, the SI transmission mode determination module 1710 may determine to include an indicator in a periodic sync signal 325, 340, 355 that indicates that the SI will be transmitted in response to a request (e.g., the indicator may indicate that SI transmission is on-demand). The SI transmission may be either broad-beam or narrow-beam. In this situation, the base station 105-$f$ may transmit the SI in response to a specific SI request from a UE 115, and UEs 115 may acquire the SI by monitoring an SI-RNTI and/or an RNTI assigned for the concerned UE (e.g., a C-RNTI/Z-RNTI) if present, for example, and as described above. In this situation, the base-station 105-$f$ may transmit the SI by either using a broad-beam transmission of the SI in accordance with on-demand periodic scheduling targeting a cell edge, using a broad-beam transmission of the SI in accordance with on-demand aperiodic scheduling targeting a group of UEs 115, or by using a narrow-beam transmission of the SI in accordance with on-demand aperiodic scheduling targeting a single UE 115.

In the event that the base station 105-$f$ is operating in a network using an on-demand SI mode, meaning that the base station 105-$f$ is to receive a request from a UE 115 prior to the base station 105-$f$ transmitting SI, the base station SI request module 1640-$a$ may be used to facilitate the receipt of such a request. As an example, the base station SI request module 1640-$a$ may be used to receive any one of the MSIB transmission request signals 332, 345, 360 of FIG. 3A. The MSIB transmission request signals 332, 345, 360 may be sent in accordance with information included with the periodic sync signals 325, 340, 355, such as destination and/or timing to be used for the MSIB transmission request signals 332, 345, 360.

The SI transmit module 1645-$a$ may be used to facilitate the transmission of SI to the UEs 115. The SI may be transmitted as a broadcast or broad-beam operation without any need for a request sent by a UE 115. In this example, the SI transmission mode module 1635-$a$ may indicate to the SI transmit module 1645-$a$ that SI is to be transmitted via a broadcast or a broad-beam operation. The SI transmit module 1645-$a$ may then facilitate transmission of the SI in accordance with information included with the periodic sync signal 310, such as on a predetermined channel or timing of the SI broadcast. In another example. the SI may be transmitted as either a broadcast or a unicast (or a broad-beam operation or a narrow-beam operation) in response to a request sent by a UE 115. In these examples, the SI transmission mode module 1635-$a$ may indicate to the SI transmit module 1645-$a$ that SI is to be transmitted as either a broadcast or a unicast (or a broad-beam operation or a narrow-beam operation) in response to a request. The SI transmit module 1645-$a$ may then facilitate transmission of the SI in accordance with information included with the periodic sync signals 325, 340, 355, such as use of a predetermined channel or timing of the SI broadcast or unicast (or broad-beam operation or narrow-beam operation).

Figure 18:
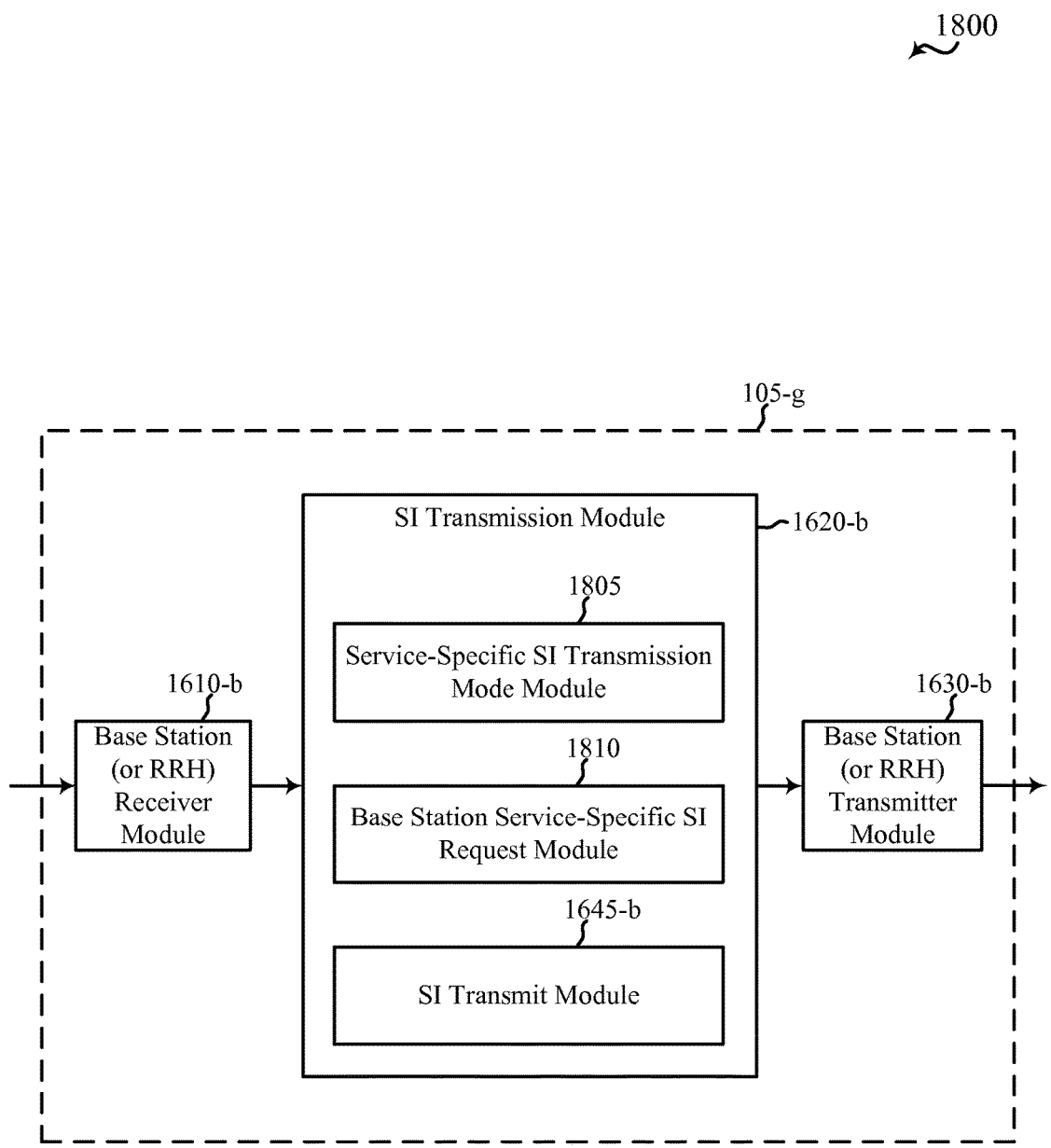
FIG. 18 shows a block diagram of a base station for use in wireless communication, in accordance with various aspects of the present disclosure.

FIG. 18 shows a block diagram 1800 of a base station 105-$g$ for use in wireless communication, in accordance with various aspects of the present disclosure. The base station 105-$g$ may be an example of aspects of one or more of the base stations 105 described with reference to FIGS. 1-6, 16, and 17. The base station 105-$g$ may include a base station (or RRH) receiver module 1610-$b$, an SI transmission module 1620-$b$, or a base station (or RRH) transmitter module 1630-$b$, which may be examples of the corresponding modules of base station 105-$e$ (of FIG. 16). The base station 105-$g$ may also include a processor (not shown). Each of these components may be in communication with each other. The SI transmission module 1620-$b$ may include a service-specific SI transmission mode module 1805, a base station service-specific SI request module 1810, or an SI transmit module 1645-$b$. The base station receiver module 1610-$b$ and the base station transmitter module 1630-$b$ may perform the functions of the base station receiver module 1610 and the base station transmitter module 1630, of FIG. 16, respectively. In addition, the base station receiver module 1610-$b$ may be used to receive SI signals such as the SIB Tx requests 372, 388 of FIG. 3B; and the base station transmitter module 1630-$b$ may be used to transmit service-specific SIBs 375, 390 of FIG. 3B. In configurations of the base station 105-$g$ including one or more RRHs, aspects of one or more of the modules 1610-$b$, 1620-$b$, or 1630-$b$ may be moved to each of the one or more RRHs.

The modules of the base station 105-$g$ may, individually or collectively, be implemented using one or more ASICs adapted to perform some or all of the applicable functions in hardware. Alternatively, the functions may be performed by one or more other processing units (or cores), on one or more integrated circuits. In other examples, other types of integrated circuits may be used (e.g., Structured/Platform ASICs, FPGAs, a SoC, or other Semi-Custom ICs), which may be programmed in any manner known in the art. The functions of each module may also be implemented, in whole or in part, with instructions embodied in a memory, formatted to be executed by one or more general or application-specific processors.

In some examples, the base station receiver module 1610-$b$ may include at least one RF receiver. The base station receiver module 1610-$b$ or RF receiver may be used to receive various types of data or control signals (i.e., transmissions) over one or more communication links of a wireless communication system, such as one or more communication links of the wireless communication system 100 described with reference to FIG. 1. As an example, the base station receiver module 1610-$b$ may be used to receive a request for service-specific SI, as described with reference to FIG. 3B. The receipt and processing of the service-specific SI requests (for example, the SIB Tx requests 372, 388 of FIG. 3B) may be additionally facilitated through the SI transmission module 1620-$b$, as described in greater detail below.

In some examples, the base station transmitter module 1630-$b$ may include at least one RF transmitter. The base station transmitter module 1630-$b$ or RF transmitter may be used to transmit various types of data or control signals (i.e., transmissions) over one or more communication links of a wireless communication system, such as one or more communication links of the wireless communication system 100 described with reference to FIG. 1. As an example, the base station transmitter module 1630-*b* may be used to transmit a service-specific periodic sync signal 370, 385 and service-specific SIBs 375, 390, as described with reference to FIG. 3B. The transmission of the service-specific periodic sync signals 370, 385 and service-specific SIBs 375, 390, for example, may be additionally facilitated through the SI transmission module 1620-*b*, as described in greater detail below.

The SI transmission module 1620-*b* may be used to manage one or more aspects of wireless communication for the base station 105-*g*. In particular, in the base station 105-*g*, the SI transmission module 1620-*b* may be used to facilitate the transmission of service-specific SI to a UE 115, in accordance to aspects of some of the embodiments described above. The SI transmission module 1620-*b* may include a service-specific SI transmission mode module 1805, a base station service-specific SI request module 1810, or an SI transmit module 1645-*b*.

The service-specific SI transmission mode module 1805 may be used by the base station 105-*g* to facilitate transmission by the base station 105-*g* of a service-specific periodic sync signal 370, 385, as illustrated in FIG. 3B, for example. The transmitted service-specific periodic sync signal 370, 385 may indicate to a UE 115 that service-specific SI is available for the UE 115. The service-specific periodic sync signal 370, 385 may also indicate whether the UE 115 is to transmit one or more request signals, such as an SIB Tx request 372, 388, for example, in order to receive a service-specific SIB 375, 390. A service-specific periodic sync signal 370 may indicate that the service-specific SI is to be broadcast at a specific time and using specific resources. Alternatively, a service-specific periodic sync signal 370 may indicate that the service-specific SI is to be requested in accordance with a schedule. In yet another embodiment, a service-specific periodic sync signal 385 may indicate that service-specific SI is available by request but that a UE 115 must explicitly request the service-specific SI.

In the event that the service-specific SI transmission mode module 1805 indicates in a service-specific periodic sync signal 370, 385 that a UE 115 is to transmit a request for service-specific SI, the base station service-specific SI request module 1810 may be used by the base station 105-*g* to receive any such requests. Requests for service-specific SI may be in the form of SIB Tx requests 372, 288, as described in FIG. 3B. An SIB Tx request 372 may be received by the base station service-specific SI request module 1810 at a time indicated in a schedule included with the service-specific periodic sync signal 370, and may thus indicate to the base station 105-*g* that a corresponding service-specific SI is to be transmitted to the requesting UE 115. Alternatively, the base station 105-*g* may receive an SIB Tx request 388 which explicitly requests service-specific SI.

The SI transmit module 1645-*b* may be used to facilitate the transmission of service-specific SI to a UE 115. The service-specific SI may be transmitted as a broadcast without any need for a request sent by a UE 115. In this example, the service-specific SI transmission mode module 1805 may indicate to the SI transmit module 1645-*b* that service-specific SI is to be transmitted via a broadcast. The SI transmit module 1645-*b* may then facilitate transmission of the service-specific SI in accordance with a service-specific periodic sync signal 370, for example, using a predetermined channel or timing of the service-specific SI broadcasts. In another example, the service-specific SI may be transmitted as either a broadcast or a unicast in response to a request sent by a UE 115. In these examples, the service-specific SI transmission mode module 1805 may indicate to the SI transmit module 1645-*b* that service-specific SI is to be transmitted as either a broadcast or a unicast in response to a request. The SI transmit module 1645-*b* may then facilitate transmission of the service-specific SI in accordance with information included with the service-specific periodic sync signal 370, 385 and in accordance with a received SIB Tx request 372, 388.

Figure 19:
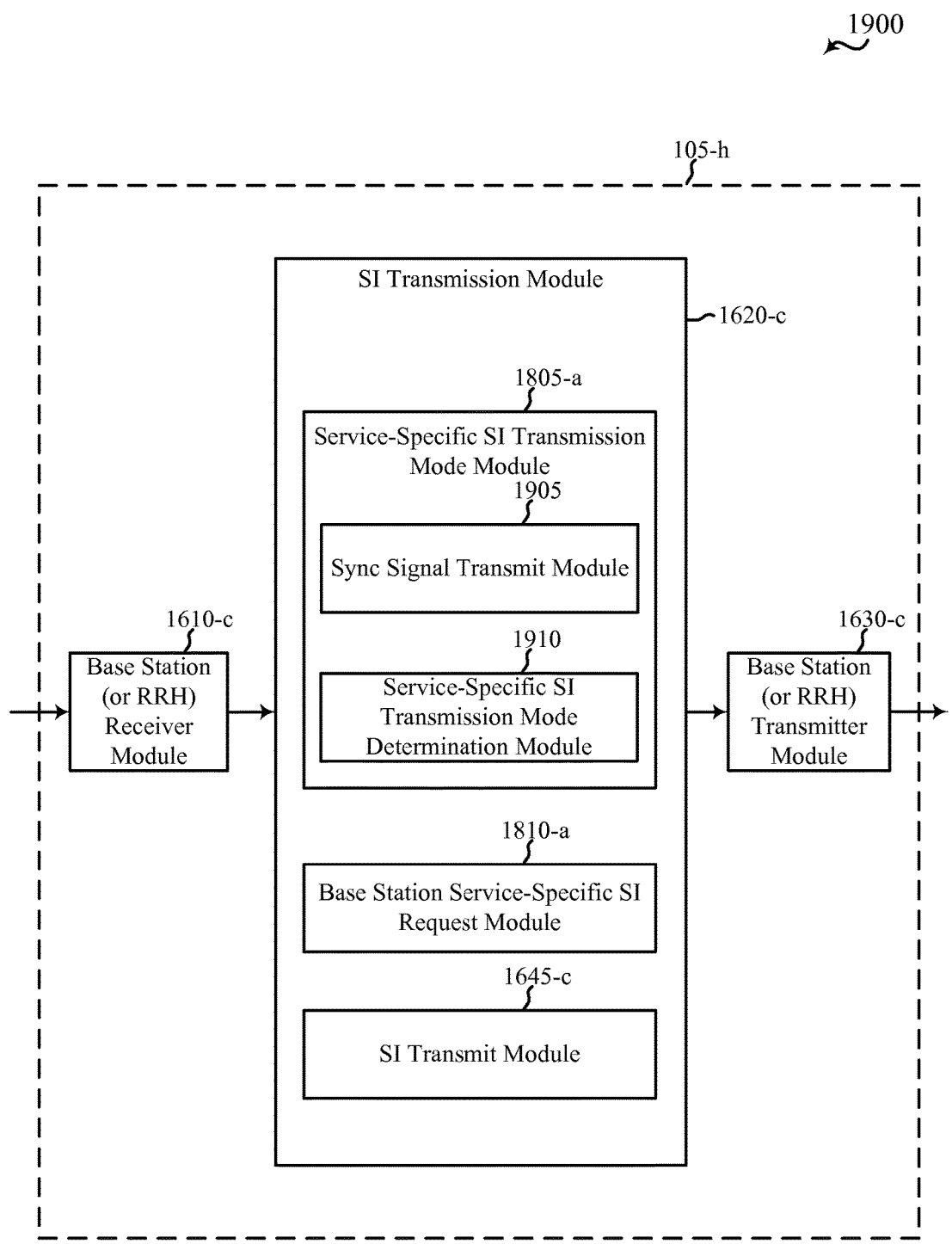
FIG. 19 shows a block diagram of a base station for use in wireless communication, in accordance with various aspects of the present disclosure.

FIG. 19 shows a block diagram 1900 of a base station 105-*h* for use in wireless communication, in accordance with various aspects of the present disclosure. The base station 105-*h* may be an example of aspects of one or more of the base stations 105 described with reference to FIGS. 1-6 and 16-18. The base station 105-*h* may include a base station (or RRH) receiver module 1610-*c*, an SI transmission module 1620-*c*, or a base station (or RRH) transmitter module 1630-*c*, which may be examples of the corresponding modules of base station 105-*e* (of FIG. 16). The base station 105-*h* may also include a processor (not shown). Each of these components may be in communication with each other. The SI transmission module 1620-*c* may include a service-specific SI transmission mode module 1805-*a*, a base station service-specific SI request module 1810-*a*, or an SI transmit module 1645-*c*. The service-specific SI transmission mode module 1805-*a* may further include a sync signal transmit module 1905 and/or a service-specific SI transmission mode determination module 1910. The base station receiver module 1610-*c* and the base station transmitter module 1630-*c* may perform the functions of the base station receiver module 1610 and the base station transmitter module 1630, of FIG. 16, respectively. In addition, the base station receiver module 1610-*c* may be used to receive SI signals such as the SIB Tx requests 372, 388 of FIG. 3B; and the base station transmitter module 1630-*c* may be used to transmit service-specific SIBs 375, 390 of FIG. 3B. In configurations of the base station 105-*h* including one or more RRHs, aspects of one or more of the modules 1610-*c*, 1620-*c*, or 1630-*c* may be moved to each of the one or more RRHs.

The modules of the base station 105-*h* may, individually or collectively, be implemented using one or more ASICs adapted to perform some or all of the applicable functions in hardware. Alternatively, the functions may be performed by one or more other processing units (or cores), on one or more integrated circuits. In other examples, other types of integrated circuits may be used (e.g., Structured/Platform ASICs, FPGAs, a SoC, or other Semi-Custom ICs), which may be programmed in any manner known in the art. The functions of each module may also be implemented, in whole or in part, with instructions embodied in a memory, formatted to be executed by one or more general or application-specific processors.

The SI transmission module 1620-*c* may be used to manage one or more aspects of wireless communication for the base station 105-*h*. In particular, in the base station 105-*h*, the SI transmission module 1620-*c* may be used to facilitate the transmission of service-specific SI to a UE 115, in accordance to aspects of some of the embodiments described above.

The service-specific SI transmission mode module 1805-*a* may include a sync signal transmit module 1905 and/or a service-specific SI transmission mode determination module 1910. The sync signal transmit module 1905 may be used by the base station 105-*h* to facilitate transmission by the base station 105-*h* of a service-specific periodic sync signal 370, 385, as illustrated in FIG. 3B, for example. The transmitted service-specific periodic sync signal 370, 385 may indicate to a UE 115 whether service-specific SI is available for the UE 115, and whether the UE 115 may obtain the service-specific SI through broadcast or request. Thus, the service-specific SI transmission mode determination module 1910 may be used to determine how a UE 115 is to obtain service-specific SI, and then the service-specific SI transmission mode determination module 1910 can include that indication within a service-specific periodic sync signal 370, 385. Therefore, a service-specific periodic sync signal 370, 385 may indicate whether a UE 115 is to transmit one or more request signals, such as an SIB Tx request 372, 388, for example, in order to receive a service-specific SIB 375, 390. A service-specific periodic sync signal 370 may indicate that the service-specific SI is to be broadcast at a specific time and using specific resources. Alternatively, a service-specific periodic sync signal 370 may indicate that the service-specific SI is to be requested in accordance with a schedule. In yet another embodiment, a service-specific periodic sync signal 385 may indicate that service-specific SI is available by request but that a UE 115 must explicitly request the service-specific SI.

In the event that the service-specific SI transmission mode determination module 1910 indicates in a service-specific periodic sync signal 370, 385 that a UE 115 is to transmit a request for service-specific SI, the base station service-specific SI request module 1810-a may be used by the base station 105-h to receive any such requests. Requests for service-specific SI may be in the form of SIB Tx requests 372, 288, as described in FIG. 3B. An SIB Tx request 372 may be received by the base station service-specific SI request module 1810-a at a time indicated in a schedule included with the service-specific periodic sync signal 370, and may thus indicate to the base station 105-h that a corresponding service-specific SI is to be transmitted to the requesting UE 115. Alternatively, the base station 105-h may receive an SIB Tx request 388 which explicitly requests service-specific SI.

The SI transmit module 1645-c may be used to facilitate the transmission of service-specific SI to a UE 115. The service-specific SI may be transmitted as a broadcast without any need for a request sent by a UE 115. In this example, the service-specific SI transmission mode determination module 1910 may indicate to the SI transmit module 1645-c that service-specific SI is to be transmitted via a broadcast. The SI transmit module 1645-c may then facilitate transmission of the service-specific SI in accordance with a service-specific periodic sync signal 370, for example, using a predetermined channel or timing of the service-specific SI broadcasts. In another example. the service-specific SI may be transmitted as either a broadcast or a unicast in response to a request sent by a UE 115. In these examples, the service-specific SI transmission mode determination module 1910 may indicate to the SI transmit module 1645-c that service-specific SI is to be transmitted as either a broadcast or a unicast in response to a request. The SI transmit module 1645-c may then facilitate transmission of the service-specific SI in accordance with information included with the service-specific periodic sync signal 370, 385 and in accordance with a received SIB Tx request 372, 388.

Figure 20:
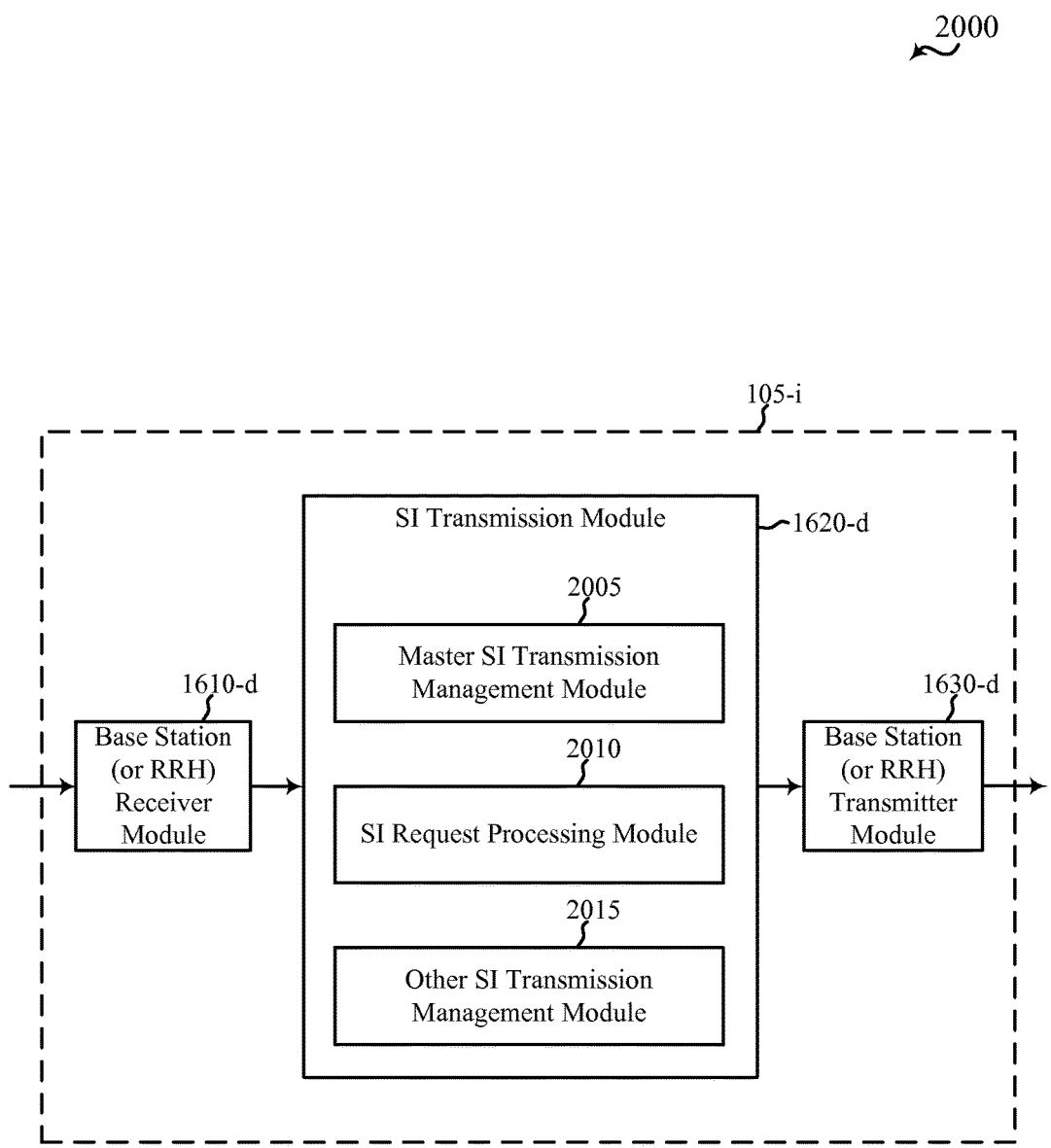
FIG. 20 shows a block diagram of a base station for use in wireless communication, in accordance with various aspects of the present disclosure.

FIG. 20 shows a block diagram 2000 of a base station 105-i for use in wireless communication, in accordance with various aspects of the present disclosure. The base station 105-i may be an example of aspects of one or more of the base stations 105 described with reference to FIGS. 1-6 and 16-19. The base station 105-i may include a base station (or RRH) receiver module 1610-d, an SI transmission module 1620-d, or a base station (or RRH) transmitter module 1630-d, which may be examples of the corresponding modules of base station 105-e (of FIG. 16). The base station 105-i may also include a processor (not shown). Each of these components may be in communication with each other. The SI transmission module 1620-d may include a master SI transmission management module 2005, an SI request processing module 2010, or an other SI transmission management module 2015. The base station receiver module 1610-d and the base station transmitter module 1630-d may perform the functions of the base station receiver module 1610 and the base station transmitter module 1630, of FIG. 16, respectively. In addition, the base station receiver module 1610-d may be used to receive SI signals such as the MSIB transmission request signal 332, 345, 360, 415, or 615 of FIGS. 3A, 4, and 6, or the OSIB transmission request 430 or 630 of FIGS. 4 and 6; and the base station transmitter module 1630-d may be used to transmit SI signals such as the OSIB 440, 445, 640, or 645 of FIGS. 4 and 6. In configurations of the base station 105-i including one or more RRHs, aspects of one or more of the modules 1610-d, 1620-d, or 1630-d may be moved to each of the one or more RRHs.

The modules of the base station 105-i may, individually or collectively, be implemented using one or more ASICs adapted to perform some or all of the applicable functions in hardware. Alternatively, the functions may be performed by one or more other processing units (or cores), on one or more integrated circuits. In other examples, other types of integrated circuits may be used (e.g., Structured/Platform ASICs, FPGAs, a SoC, or other Semi-Custom ICs), which may be programmed in any manner known in the art. The functions of each module may also be implemented, in whole or in part, with instructions embodied in a memory, formatted to be executed by one or more general or application-specific processors.

The master SI transmission management module 2005 may be used to transmit a first set of system information (e.g., master system information, such as the master system information included in the MSIB transmitted at 420 in FIG. 4).

The SI request processing module 2010 may be used to receive a request (e.g., the OSIB transmission request received at 430 in FIG. 4) for additional system information (e.g., non-master system information, such as the other information described with reference to FIG. 4).

The other SI transmission management module 2015 may be used to transmit the additional system information based at least in part on the request (e.g., to transmit the other system information included in the OSIB transmitted at 440 or 445 in FIG. 4).

In some embodiments, transmitting the first set of system information using the master SI transmission management module 2005 may include transmitting an indication of one or more sets of additional system information that are available. In some embodiments, receiving the request for the additional system information using the SI request processing module 2010 may include receiving one or multiple requests for additional system information corresponding to multiple sets of additional system information to be transmitted. For example, the SI request processing module 2010 may receive a single OSIB transmission request indicating one or a plurality of elements of additional system information that a UE would like to receive (e.g., a binary value in the OSIB transmission request may be set to TRUE for each element of additional system information that the UE would like to receive). In other examples, a UE may request some types of additional system information in different OSIB transmission requests, and the SI request processing module 2010 may receive a plurality of OSIB transmission requests.

In some embodiments, transmitting the additional system information using the other SI transmission management module 2015 may include at least one of: transmitting system information indicating which RATs are available in a region and how a UE is to select an available RAT; transmitting system information indicating which services are available in a region and how a UE is to obtain an available service; transmitting system information relating to an MBMS or a PWS service; transmitting system information relating to location, positioning, or navigation services; or transmitting system information based at least in part on a determined location of a UE.

In some embodiments, receiving the request for additional system information using the SI request processing module 2010 may include receiving, in the request, one or more capabilities of a UE transmitting the request. In these embodiments, transmitting the additional system information using the other SI transmission management module 2015 may include transmitting system information based at least in part on the one or more capabilities of the base station 105-*i* included in the request.

In some embodiments, receiving the request for additional system information using the SI request processing module 2010 may include receiving, in the request, a location of a UE transmitting the request. In these embodiments, the other SI transmission management module 2015 may identify the additional system information to transmit based at least in part on the location of the UE included in the request. Alternatively, the other SI transmission management module 2015 may determine a location of the UE transmitting the request, and identify the additional system information to transmit based at least in part on the location of the UE.

In some embodiments, receiving the request for additional system information using the SI request processing module 2010 may include receiving, in the request, an identification of a UE transmitting the request. In these embodiments, the other SI transmission management module 2015 may identify the additional system information to transmit based at least in part on the identification of the UE included in the request. In some cases, the additional system information may be identified by accessing a database that includes the identification of the UE transmitting the request and one or more capabilities of the UE.

Figure 21:
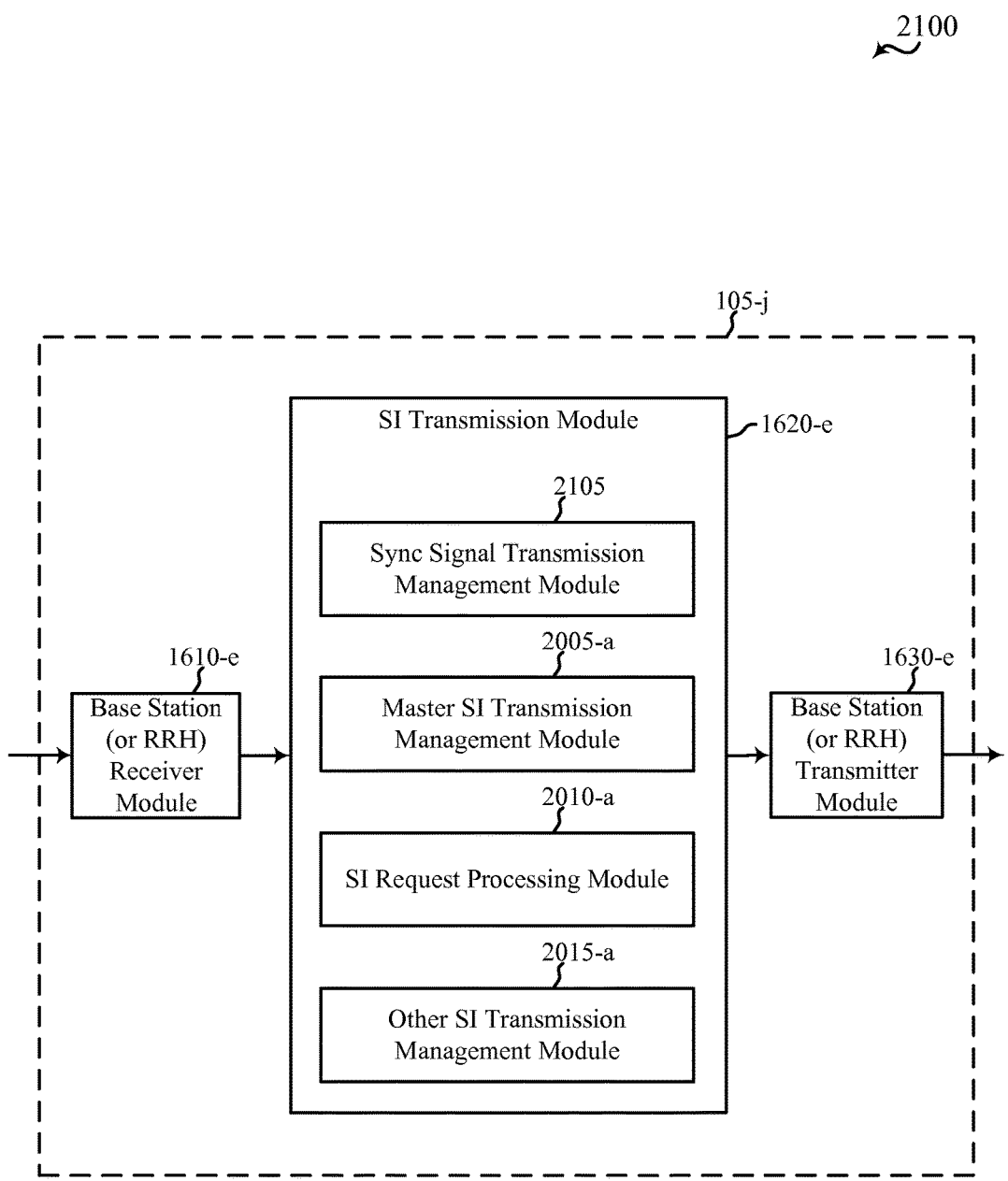
FIG. 21 shows a block diagram of a base station for use in wireless communication, in accordance with various aspects of the present disclosure.

FIG. 21 shows a block diagram 2100 of a base station 105-*j* for use in wireless communication, in accordance with various aspects of the present disclosure. The base station 105-*j* may be an example of aspects of one or more of the base stations 105 described with reference to FIGS. 1-6 and 16-20. The base station 105-*j* may include a base station (or RRH) receiver module 1610-*e*, an SI transmission module 1620-*e*, or a base station (or RRH) transmitter module 1630-*e*, which may be examples of the corresponding modules of base station 105-*e*, 105-*g*, or 105-*i* (of FIG. 16, 18, or 20). The base station 105-*j* may also include a processor (not shown). Each of these components may be in communication with each other. The SI transmission module 1620-*e* may include a sync signal transmission management module 2105, a master SI transmission management module 2005-*a*, an SI request processing module 2010-*a*, or an other SI transmission management module 2015-*a*. The base station receiver module 1610-*e* and the base station transmitter module 1630-*e* may perform the functions of the base station receiver module 1610 and the base station transmitter module 1630, of FIG. 16, 18, or 20. In configurations of the base station 105-*j* including one or more RRHs, aspects of one or more of the modules 1610-*e*, 1620-*e*, or 1630-*e* may be moved to each of the one or more RRHs.

The modules of the base station 105-*j* may, individually or collectively, be implemented using one or more ASICs adapted to perform some or all of the applicable functions in hardware. Alternatively, the functions may be performed by one or more other processing units (or cores), on one or more integrated circuits. In other examples, other types of integrated circuits may be used (e.g., Structured/Platform ASICs, FPGAs, a SoC, or other Semi-Custom ICs), which may be programmed in any manner known in the art. The functions of each module may also be implemented, in whole or in part, with instructions embodied in a memory, formatted to be executed by one or more general or application-specific processors.

The sync signal transmission management module 2105 may be used to broadcast information on a downlink channel. The information may indicate that master system information (e.g., an MSIB) is transmitted in response to a master system information request (e.g., an MSIB transmission request such as the MSIB transmission request received at 415 in FIG. 4) received from a UE. In some examples, the downlink channel may include a synchronization signal (e.g., the instance of the periodic sync signal transmitted at 405 in FIG. 4). The information may be included in (or associated with) the synchronization signal.

The SI request processing module 2010-*a* may be used to receive a master system information request (e.g., in accordance with the information broadcast on the downlink channel). In some cases, receiving the master system information request may include receiving, in the request, an identification of one or more capabilities of a UE transmitting the request.

The master SI transmission management module 2005-*a* may be used to transmit, in response to receiving the master system information request, the master system information (e.g., the master system information included in the MSIB received at 420 in FIG. 4). In some cases, the master system information may include system information that allows a UE to perform an initial access of a network using one or more of an identification of the network, an identification of the base station, cell selection configuration and access restrictions, or a network access configuration.

The SI request processing module 2010-*a* may also be used to receive a request for additional system information (e.g., the OSIB transmission request received at 430 in FIG. 4).

In some examples, the other SI transmission management module 2015-*a* may be used to transmit the additional system information (e.g., non-master system information, such as the other system information described with reference to FIG. 4) based at least in part on the request. In some cases, the additional system information may be identified based at least in part on one or more capabilities of the UE identified in the master system information request. The additional system information may also be identified based at least in part on information received in the request.

In some embodiments, transmitting the first set of system information using the master SI transmission management module 2005-*a* may include transmitting an indication of one or more sets of additional system information that are available. In some embodiments, receiving the request for the additional system information by the SI request processing module 2010-*a* may include receiving multiple requests for additional system information corresponding to multiple sets of additional system information to be transmitted. For example, the SI request processing module 2010-*a* may receive a single OSIB transmission request indicating one or a plurality of elements of additional system information that a UE would like to receive (e.g., a binary value in the OSIB transmission request may be set to TRUE for each element of additional system information that the UE would like to receive). In other examples, a UE may request some types of additional system information in different OSIB transmission requests, and the SI request processing module 2010-*a* may receive a plurality of OSIB transmission requests.

Figure 22:
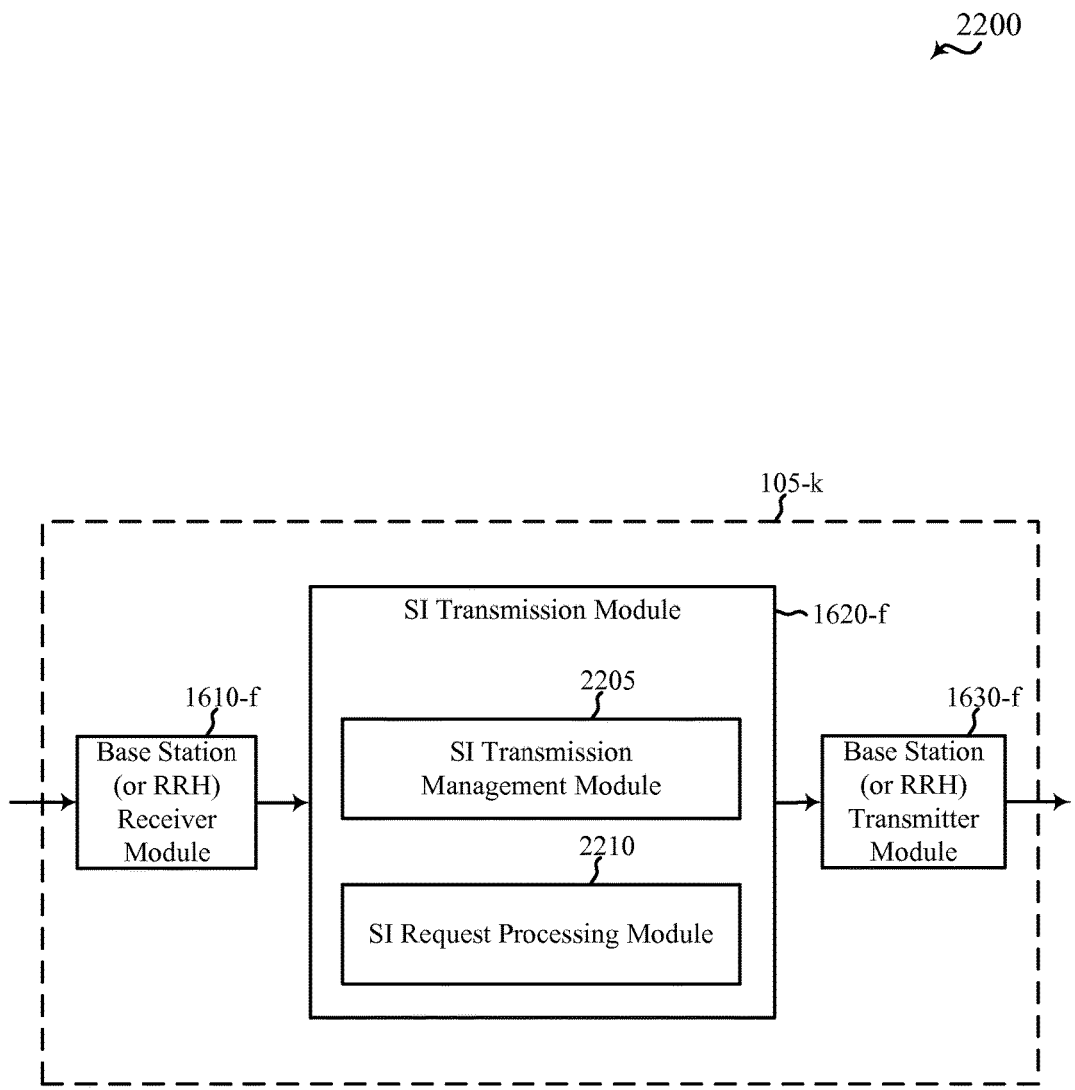
FIG. 22 shows a block diagram of a base station for use in wireless communication, in accordance with various aspects of the present disclosure.

FIG. 22 shows a block diagram 2200 of a base station 105-*k* for use in wireless communication, in accordance with various aspects of the present disclosure. The base station 105-*k* may be an example of aspects of one or more of the base stations 105 described with reference to FIGS. 1-6 and 16-21. The base station 105-*k* may include a base station (or RRH) receiver module 1610-*f*, an SI transmission module 1620-*f*, or a base station (or RRH) transmitter module 1630-*f*, which may be examples of the corresponding modules of base station 105-*e* (of FIG. 16). The base station 105-*k* may also include a processor (not shown). Each of these components may be in communication with each other. The SI transmission module 1620-*f* may include an SI transmission management module 2205 or an SI request processing module 2210. The base station receiver module 1610-*f* and the base station transmitter module 1630-*f* may perform the functions of the base station receiver module 1610 and the base station transmitter module 1630, of FIG. 16, respectively. In addition, the base station receiver module 1610-*f* may be used to receive SI signals such as the MSIB transmission request signal 332, 345, 360, 415, or 615 of FIGS. 3A, 3B, 4, and 6, or the OSIB transmission request 430 or 630 of FIGS. 4 and 6; and the base station transmitter module 1630-*f* may be used to transmit SI signals such as the OSIB 440, 445, 640, or 645 of FIGS. 4 and 6, a value tag associated with SI, or a zone identifier. In configurations of the base station 105-*k* including one or more RRHs, aspects of one or more of the modules 1610-*f*, 1620-*f*, or 1630-*f* may be moved to each of the one or more RRHs.

The modules of the base station 105-*k* may, individually or collectively, be implemented using one or more ASICs adapted to perform some or all of the applicable functions in hardware. Alternatively, the functions may be performed by one or more other processing units (or cores), on one or more integrated circuits. In other examples, other types of integrated circuits may be used (e.g., Structured/Platform ASICs, FPGAs, a SoC, or other Semi-Custom ICs), which may be programmed in any manner known in the art. The functions of each module may also be implemented, in whole or in part, with instructions embodied in a memory, formatted to be executed by one or more general or application-specific processors.

The SI transmission management module 2205 may be used to transmit a first signal (e.g., a sync signal or paging message such as the instance of the periodic sync signal or paging message transmitted at 605 in FIG. 6 or the MSIB transmitted at 620 in FIG. 6) from a base station to a UE. At the time of transmission of the first signal, the UE may communicate with a network using first system information. The first signal may include information to allow the UE to determine to request updated system information.

The SI request processing module 2210 may be used to receive a request from the UE for updated system information (e.g., the MSIB transmission request received at 615 in FIG. 6 or the OSIB transmission request received at 630 in FIG. 6).

The SI transmission management module 2205 may also be used to transmit the updated system information (e.g., the MSIB transmitted at 620 in FIG. 6 or the OSIB transmitted at 640 or 645 in FIG. 6) based at least in part on the request.

In some embodiments, transmitting the first signal using the SI transmission management module 2205 may include transmitting a zone identifier (e.g., an area code, a BSIC, or another cell identifier). In some cases, the zone identifier may be transmitted as part of a synchronization signal. In some cases, the zone identifier may identify one of the neighbor RATs of zones 510, 515, or 520 described with reference to FIG. 5.

Figure 23:
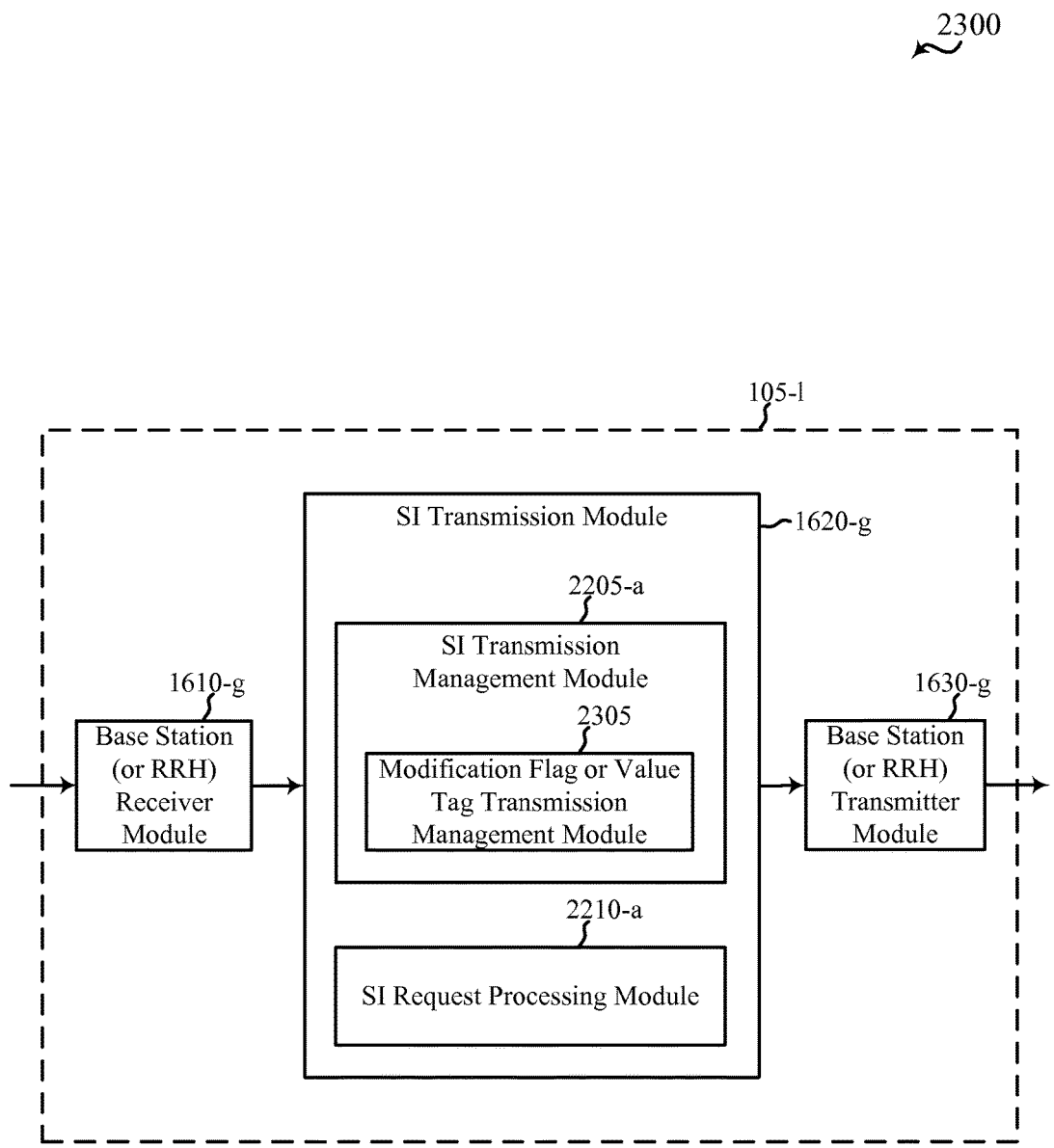
FIG. 23 shows a block diagram of a base station for use in wireless communication, in accordance with various aspects of the present disclosure.

FIG. 23 shows a block diagram 2300 of a base station 105-*l* for use in wireless communication, in accordance with various aspects of the present disclosure. The base station 105-*l* may be an example of aspects of one or more of the base stations 105 described with reference to FIGS. 1-6 and 16-22. The base station 105-*l* may include a base station (or RRH) receiver module 1610-*g*, an SI transmission module 1620-*g*, or a base station (or RRH) transmitter module 1630-*g*, which may be examples of the corresponding modules of base station 105-*e*, 105-*g*, or 105-*k* (of FIG. 16, 18, or 20). The base station 105-*l* may also include a processor (not shown). Each of these components may be in communication with each other. The SI transmission module 1620-*g* may include an SI transmission management module 2205-*a* or an SI request processing module 2210-*a*. The base station receiver module 1610-*g* and the base station transmitter module 1630-*g* may perform the functions of the base station receiver module 1610 and the base station transmitter module 1630, of FIG. 16, 18, 20, or 22. In configurations of the base station 105-*l* including one or more RRHs, aspects of one or more of the modules 1610-*g*, 1620-*g*, or 1630-*g* may be moved to each of the one or more RRHs.

The modules of the base station 105-*l* may, individually or collectively, be implemented using one or more ASICs adapted to perform some or all of the applicable functions in hardware. Alternatively, the functions may be performed by one or more other processing units (or cores), on one or more integrated circuits. In other examples, other types of integrated circuits may be used (e.g., Structured/Platform ASICs, FPGAs, a SoC, or other Semi-Custom ICs), which may be programmed in any manner known in the art. The functions of each module may also be implemented, in whole or in part, with instructions embodied in a memory, formatted to be executed by one or more general or application-specific processors.

The SI transmission management module 2205-*a* may be used to transmit a first signal (e.g., a sync signal or paging message such as the instance of the periodic sync signal or paging message transmitted at 605 in FIG. 6, or the MSIB transmitted at 620 in FIG. 6) from a base station to a UE. At the time of transmission of the first signal, the UE may communicate with a network using first system information. The first signal may include information to allow the UE to determine to request updated system information. The first signal may also include an indication that at least a portion of the first system information has changed.

The SI transmission management module 2205-*a* may include a modification flag or value tag transmission management module 2305. The modification flag or value tag transmission management module 2305 may be used, in some examples, to transmit one or more modification flags, each of which indicates, by a counter value or Boolean variable (e.g., a binary value), that a corresponding portion of the first system information has changed. In some examples, the corresponding portion of the first system information may include a portion of master system information, such as an MSIB or element of an MSIB, In other examples, the corresponding portion of the first system information may include additional non-master system information, such as an OSIB or element of an OSIB. The master system information may include one or more of an identification of the network, an identification of a base station in the network, cell selection configuration and access restrictions, or network access configuration information. The master system information may also or alternatively include, for example, one or more other elements of the master system information described with reference to FIG. 3A. The additional non-master system information may include one or more elements of the other system information described with reference to FIG. 4 or 6. In some embodiments, the modification flag may be transmitted with (or as a part of) the first signal.

The modification flag or value tag transmission management module 2305 may also be used, in some examples, to transmit one or more value tags corresponding to at least a portion (or different portions) of the first system information that has/have changed. In some examples, the one or more value tags may correspond to one or more portions of master system information (e.g., one or more MSIBs, or one or more elements of one or more MSIBs), one or more portions of additional non-master system information (e.g., one or more OSIBs, or one or more elements of one or more OSIBs), or a combination thereof. The master system information may include one or more of an identification of the network, an identification of a base station in the network, cell selection configuration and access restrictions, or network access configuration information. The master system information may also or alternatively include, for example, one or more other elements of the master system information described with reference to FIG. 3A. The additional non-master system information may include one or more elements of the other system information described with reference to FIG. 4 or 6. In some embodiments, one or more value tags may be transmitted with (or as a part of) the first signal.

The SI request processing module 2210-a may be used to receive a request from the UE for updated system information (e.g., to receive the MSIB transmission request at 615 in FIG. 6, to receive the OSIB transmission request at 630 in FIG. 6).

The SI transmission management module 2205-a may also be used to transmit the updated system information (e.g., the MSIB transmitted at 620 in FIG. 6 or the OSIB transmitted at 640 or 645 in FIG. 6) based at least in part on the request.

Figure 24A:
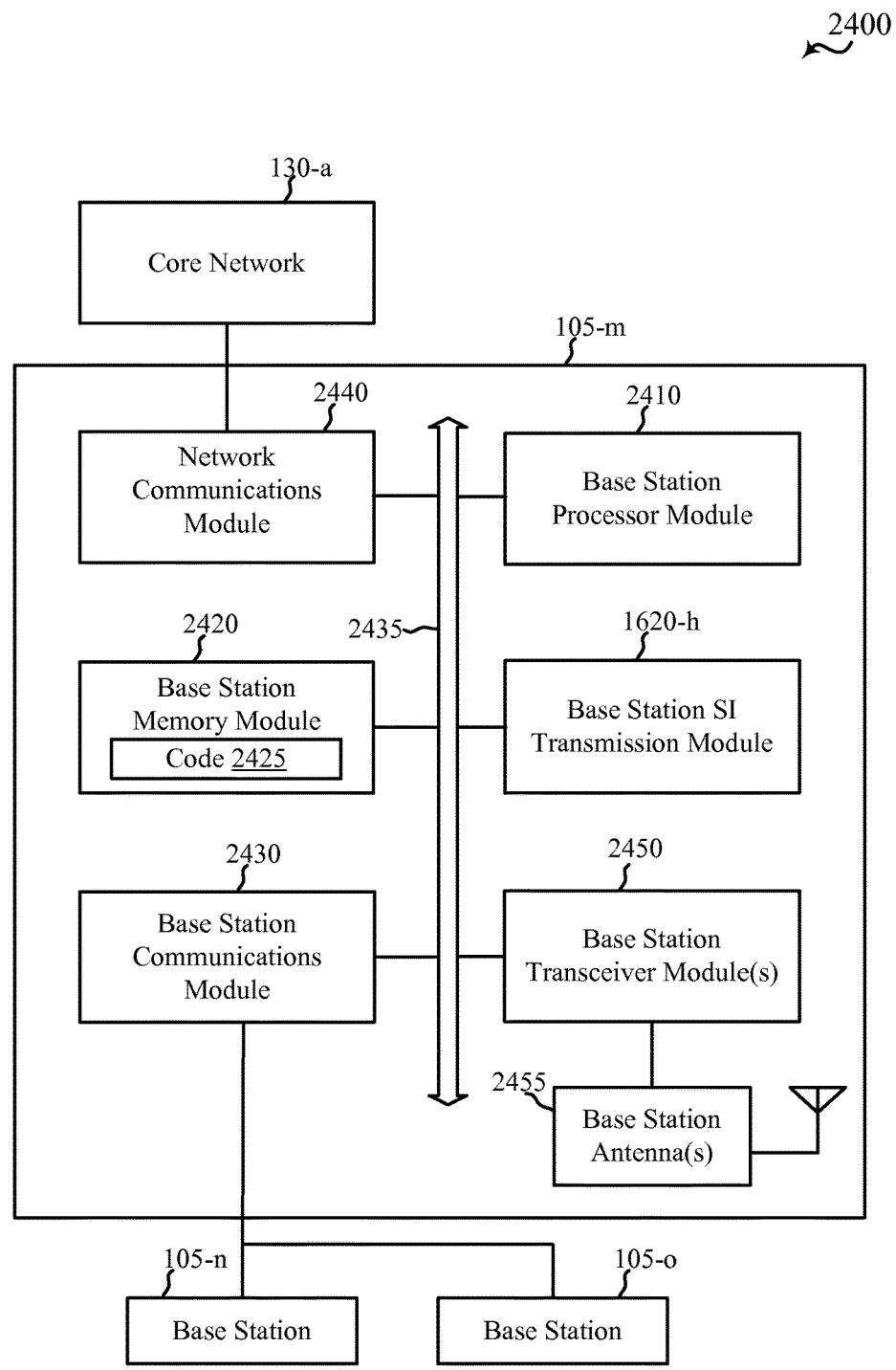
FIG. 24A shows a block diagram of a base station (e.g., a base station forming part or all of an eNB) for use in wireless communication, in accordance with various aspects of the present disclosure.

FIG. 24A shows a block diagram 2400 of a base station 105-m (e.g., a base station forming part or all of an eNB) for use in wireless communication, in accordance with various aspects of the present disclosure. In some examples, the base station 105-m may be an example of one or more aspects of the base station 105 described with reference to FIGS. 1-6 and 16-23. The base station 105-m may be configured to implement or facilitate at least some of the base station features and functions described with reference to FIGS. 1-6 and 14-19.

The base station 105-m may include a base station processor module 2410, a base station memory module 2420, at least one base station transceiver module (represented by base station transceiver module(s) 2450), at least one base station antenna (represented by base station antenna(s) 2455), or a base station SI transmission module 1620-h. The base station 105-m may also include one or more of a base station communications module 2430 or a network communications module 2440. Each of these components may be in communication with each other, directly or indirectly, over one or more buses 2435.

The base station memory module 2420 may include RAM or ROM. The base station memory module 2420 may store computer-readable, computer-executable code 2425 containing instructions that are configured to, when executed, cause the base station processor module 2410 to perform various functions described herein related to wireless communication, including, for example, transmission of a synchronization signal. Alternatively, the code 2425 may not be directly executable by the base station processor module 2410 but be configured to cause the base station 105-m (e.g., when compiled and executed) to perform various of the functions described herein.

The base station processor module 2410 may include an intelligent hardware device, e.g., a CPU, a microcontroller, an ASIC, etc. The base station processor module 2410 may process information received through the base station transceiver module(s) 2450, the base station communications module 2430, or the network communications module 2440. The base station processor module 2410 may also process information to be sent to the transceiver module(s) 2450 for transmission through the base station antenna(s) 2455, to the base station communications module 2430, for transmission to one or more other base stations 105-n and 105-o, or to the network communications module 2440 for transmission to a core network 130-a, which may be an example of one or more aspects of the core network 130 described with reference to FIG. 1. The base station processor module 2410 may handle, alone or in connection with the base station SI transmission module 1620-h, various aspects of communicating over (or managing communications over) a wireless medium.

The base station transceiver module(s) 2450 may include a modem configured to modulate packets and provide the modulated packets to the base station antenna(s) 2455 for transmission, and to demodulate packets received from the base station antenna(s) 2455. The base station transceiver module(s) 2450 may, in some examples, be implemented as one or more base station transmitter modules and one or more separate base station receiver modules. The base station transceiver module(s) 2450 may support communications on one or more wireless channels. The base station transceiver module(s) 2450 may be configured to communicate bi-directionally, via the base station antenna(s) 2455, with one or more UEs, such as one or more of the UEs 115 described with reference to FIG. 1, 2, 4, 6, 7, 8, 9, 10, 11, 12, 13, 14, or 15. The base station 105-m may, for example, include multiple base station antennas 2455 (e.g., an antenna array). The base station 105-m may communicate with the core network 130-a through the network communications module 2440. The base station 105-m may also communicate with other base stations, such as the base stations 105-n and 105-o, using the base station communications module 2430.

The base station SI transmission module 1620-h may be configured to perform or control some or all of the base station features or functions described with reference to FIGS. 1-6 and 14-19 related to transmission of system information. The base station SI transmission module 1620-h, or portions of it, may include a processor, or some or all of the functions of the base station SI transmission module 1620-h may be performed by the base station processor module 2410 or in connection with the base station processor module 2410. In some examples, the base station SI transmission module 1620-*h* may be an example of the SI transmission module 1620 described with reference to FIGS. 16-19.

Figure 24B:
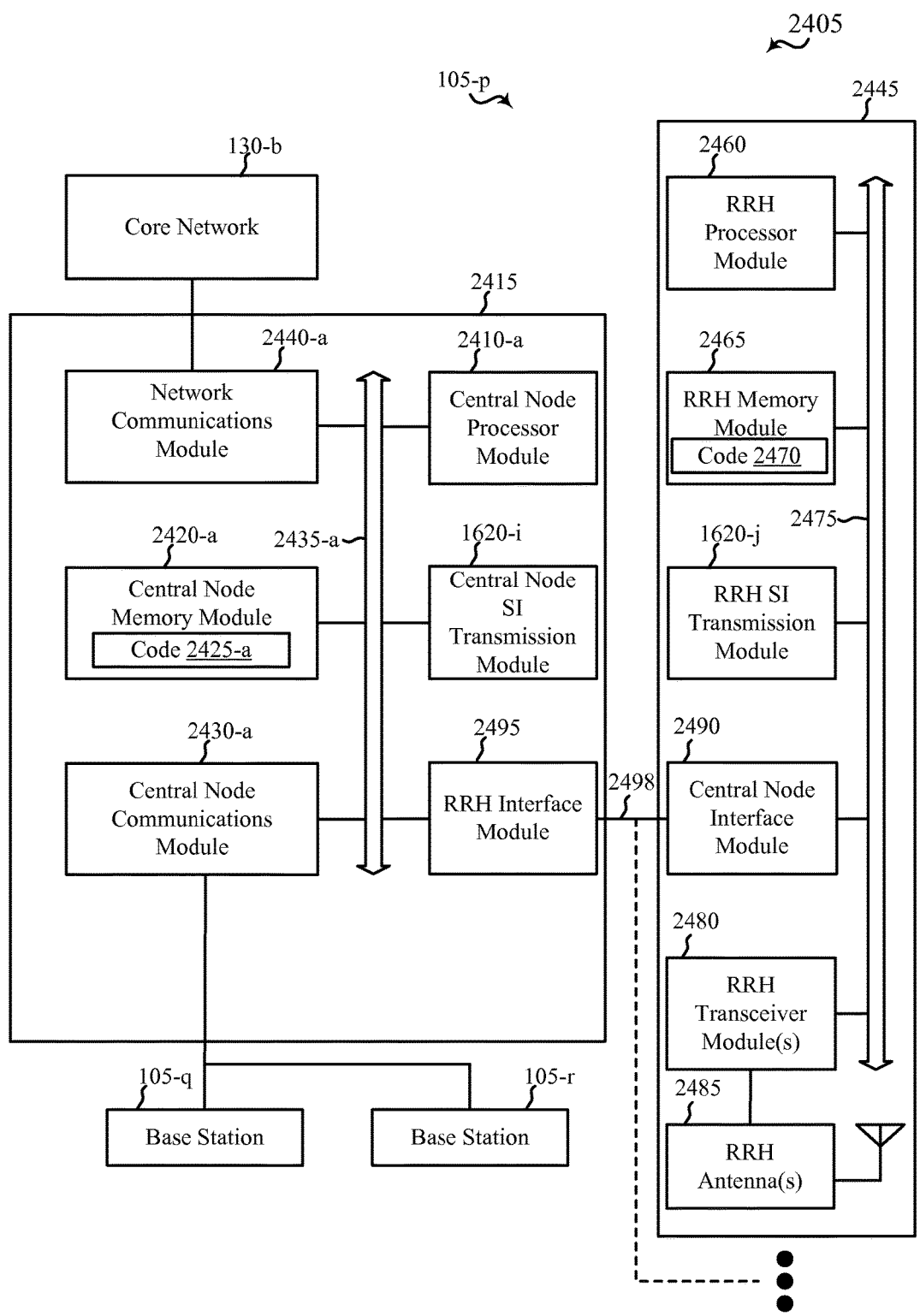
FIG. 24B shows a block diagram of a base station (e.g., a base station forming part or all of an eNB) for use in wireless communication, in accordance with various aspects of the present disclosure.

FIG. 24B shows a block diagram 2405 of a base station 105-*p* (e.g., a base station forming part or all of an eNB) for use in wireless communication, in accordance with various aspects of the present disclosure. In some examples, the base station 105-*p* may be an example of one or more aspects of the base station 105 described with reference to FIGS. 1-6 and 16-23. The base station 105-*p* may be configured to implement or facilitate at least some of the base station features and functions described with reference to FIGS. 1-6 and 16-23.

The base station 105-*p* may include a central node (or base station server) 2415 and one or more RRHs 2445. The central node 2415 may include a central node processor module 2410-*a*, a central node memory module 2420-*a*, a central node SI transmission module 1620-*i*, or a RRH interface module 2495. In some cases, the central node memory module 2420-*a* may include code 2425-*a*. The central node 2415 may also include one or more of a central node communications module 2430-*a* that may communicate with one or more other central nodes or base stations, such as base stations 105-*q* or 105-*r*, or a network communications module 2440-*a* that may communicate with a core network 130-*b*. Each of these components may be in communication with each other, directly or indirectly, over one or more buses 2435-*a*. The central node processor module 2410-*a*, central node memory module 2420-*a*, central node SI transmission module 1620-*i*, central node communications module 2430-*a*, network communications module 2440-*a*, and one or more buses 2435-*a* may perform the functions of the base station processor module 2410, base station memory module 2420, base station SI transmission module 1620, base station communications module 2430, network communications module 2440, and buses 2435, of FIG. 24A, respectively.

Each of the one or more RRHs 2445 may include a central node interface module 2490, at least one RRH transceiver module (represented by RRH transceiver module(s) 2480), and at least one RRH antenna (represented by RRH antenna(s) 2485), Each of these components may be in communication with each other, directly or indirectly, over one or more RRH buses 2475. The RRH transceiver module(s) 2480 and RRH antenna(s) 2485 may perform the functions of the base station transceiver module(s) 2450 and base station antenna(s) 2455, of FIG. 24A, respectively.

The RRH 2445 may also include one or more of a RRH processor module 2460, a RRH memory module 2465 (possibly storing code 2470), or a RRH SI transmission module 1620-*j*. Each of the RRH processor module 2460, RRH memory module 2465, and RRH SI transmission module 1620-*j* may communicate with other modules of the RRH 2445 via the one or more buses 2475. In some examples, some of the functions of the central node processor module 2410-*a*, central node memory module 2420-*a*, or central node SI transmission module 1620-*i* may be offloaded to (or replicated in) the RRH processor module 2460, RRH memory module 2465, or RRH SI transmission module 1620-*j*, respectively.

The RRH interface module 2495 and central node interface module 2490 may provide a communications interface, between the central node 2415 and RRH 2445, and establish a bi-directional communication link 2498 between the central node 2415 and RRH 2445. The communication link 2498 may in some cases be an optical communication link, but may also take other forms.

The deployment of one or more RRHs 2445 in communication with central node 2415 may be used, for example, to increase the coverage area of the base station 105-*p* or position the central node 2415 and RRHs 2445 in more useful locations. For example, the RRH 2445 may be positioned at a location free of RF obstructions or on a smaller cell tower.

Figure 25:
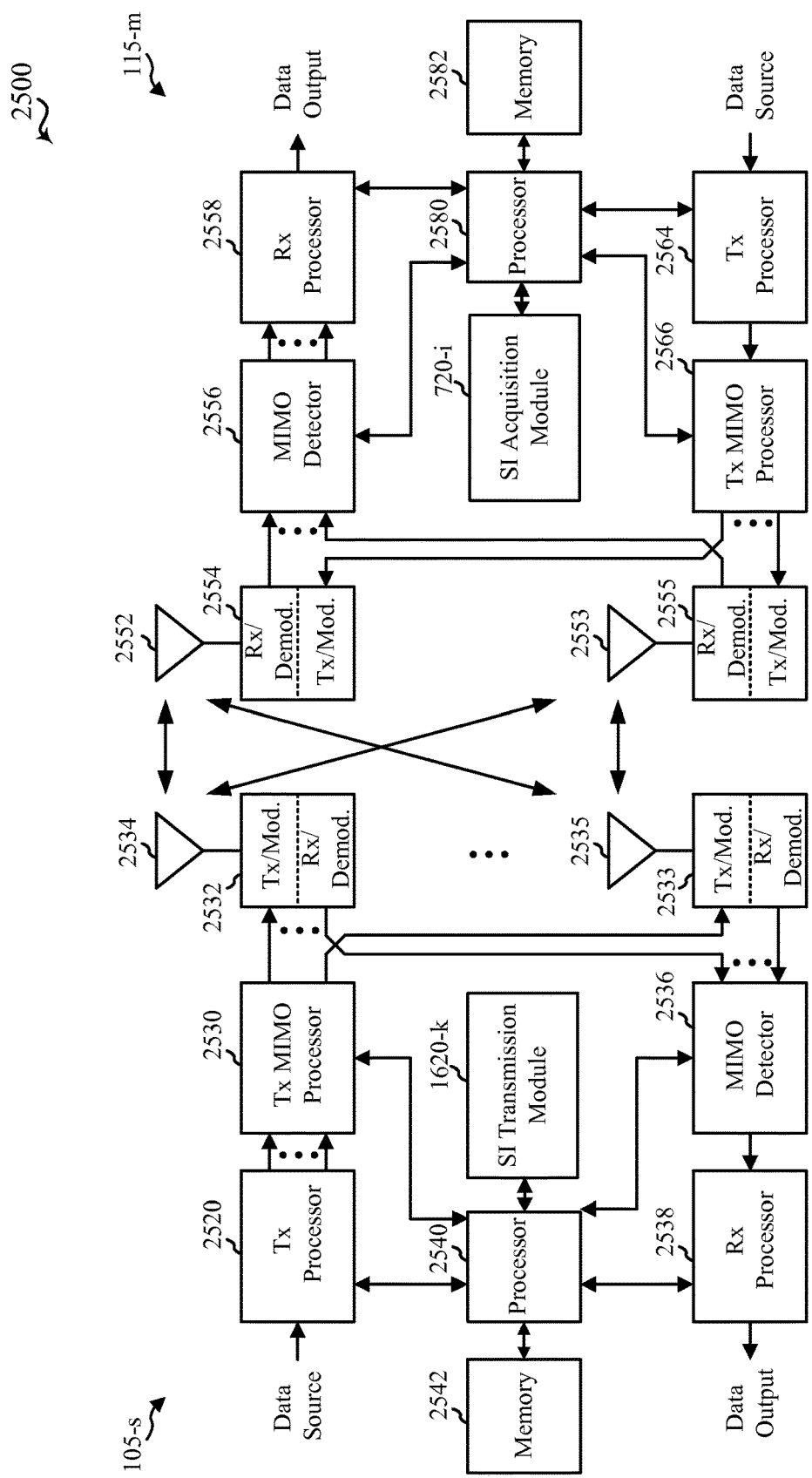
FIG. 25 is a block diagram of a multiple input multiple output (MIMO) communication system including a base station and a UE, in accordance with various aspects of the present disclosure.

FIG. 25 is a block diagram of a MIMO communication system 2500 including a base station 105-*s* and a UE 115-*m*, in accordance with various aspects of the present disclosure. The MIMO communication system 2500 may illustrate aspects of the wireless communication system 100 described with reference to FIG. 1. The base station 105-*s* may be an example of aspects of the base station 105 described with reference to FIG. 1, 2, 4, 6, 16, 17, 18, 19, 20, 21, 22, 23, or 24. The base station 105-*s* may be equipped with antennas 2534 through 2535, and the UE 115-*m* may be equipped with antennas 2552 through 2553. In the MIMO communication system 2500, the base station 105-*s* may be able to send data over multiple communication links at the same time. Each communication link may be called a "layer" and the "rank" of the communication link may indicate the number of layers used for communication. For example, in a 2×2 MIMO communication system where base station 105-*s* transmits two "layers," the rank of the communication link between the base station 105-*s* and the UE 115-*m* is two. In some examples, the MIMO communication system 2500 may be configured for communication using non-massive MIMO techniques. In other examples, the MIMO communication system 2500 may be configured for communication using massive MIMO techniques.

At the base station 105-*s*, a Tx processor 2520 may receive data from a data source. The transmit processor 2520 may process the data. The transmit processor 2520 may also generate control symbols or reference symbols. A transmit MIMO processor 2530 may perform spatial processing (e.g., precoding) on data symbols, control symbols, or reference symbols, if applicable, and may provide output symbol streams to the transmit modulators 2532 through 2533. Each modulator 2532 through 2533 may process a respective output symbol stream (e.g., for OFDM, etc.) to obtain an output sample stream. Each modulator 2532 through 2533 may further process (e.g., convert to analog, amplify, filter, and upconvert) the output sample stream to obtain a downlink (DL) signal. In one example, DL signals from modulators 2532 through 2533 may be transmitted via the antennas 2534 through 2535, respectively.

The UE 115-*m* may be an example of aspects of the UEs 115 described with reference to FIG. 1, 2, 4, 6, 7, 8, 9, 10, 11, 12, 13, 14, or 15. At the UE 115-*m*, the UE antennas 2552 through 2553 may receive the DL signals from the base station 105-*s* and may provide the received signals to the modulator/demodulators 2554 through 2555, respectively. Each modulator/demodulator 2554 through 2555 may condition (e.g., filter, amplify, downconvert, and digitize) a respective received signal to obtain input samples. Each modulator/demodulator 2554 through 2555 may further process the input samples (e.g., for OFDM, etc.) to obtain received symbols. A MIMO detector 2556 may obtain received symbols from all the modulator/demodulators 2554 through 2555, perform MIMO detection on the received symbols, if applicable, and provide detected symbols. A receive (Rx) processor 2558 may process (e.g., demodulate, deinterleave, and decode) the detected symbols, providing decoded data for the UE 115-*m* to a data output, and provide decoded control information to a processor 2580, or memory 2582.

The processor 2580 may in some cases execute stored instructions to instantiate an SI acquisition module 720-*i*. The SI acquisition module 720-*i* may be an example of aspects of the SI acquisition module 720 described with reference to FIGS. 7-15.

On the uplink (UL), at the UE 115-*m*, a transmit processor 2564 may receive and process data from a data source. The transmit processor 2564 may also generate reference symbols for a reference signal. The symbols from the transmit processor 2564 may be precoded by a transmit MIMO processor 2566 if applicable, further processed by the modulator/demodulators 2554 through 2555 (e.g., for SC-FDMA, etc.), and be transmitted to the base station 105-*s* in accordance with the communication parameters received from the base station 105-*s*. At the base station 105-*s*, the UL signals from the UE 115-*m* may be received by the antennas 2534 through 2535, processed by the demodulators 2532 through 2533, detected by a MIMO detector 2536 if applicable, and further processed by a receive processor 2538. The receive processor 2538 may provide decoded data to a data output and to the processor 2540 or memory 2542.

The processor 2540 may in some cases execute stored instructions to instantiate an SI transmission module 1620-*k*. The SI transmission module 1620-*k* may be an example of aspects of the SI transmission 1620 module described with reference to FIGS. 16-24.

The components of the UE 115-*m* may, individually or collectively, be implemented with one or more ASICs adapted to perform some or all of the applicable functions in hardware. Each of the noted modules may be a means for performing one or more functions related to operation of the MIMO communication system 2500. Similarly, the components of the base station 105-*s* may, individually or collectively, be implemented with one or more ASICs adapted to perform some or all of the applicable functions in hardware. Each of the noted components may be a means for performing one or more functions related to operation of the MIMO communication system 2500.

Figure 26:
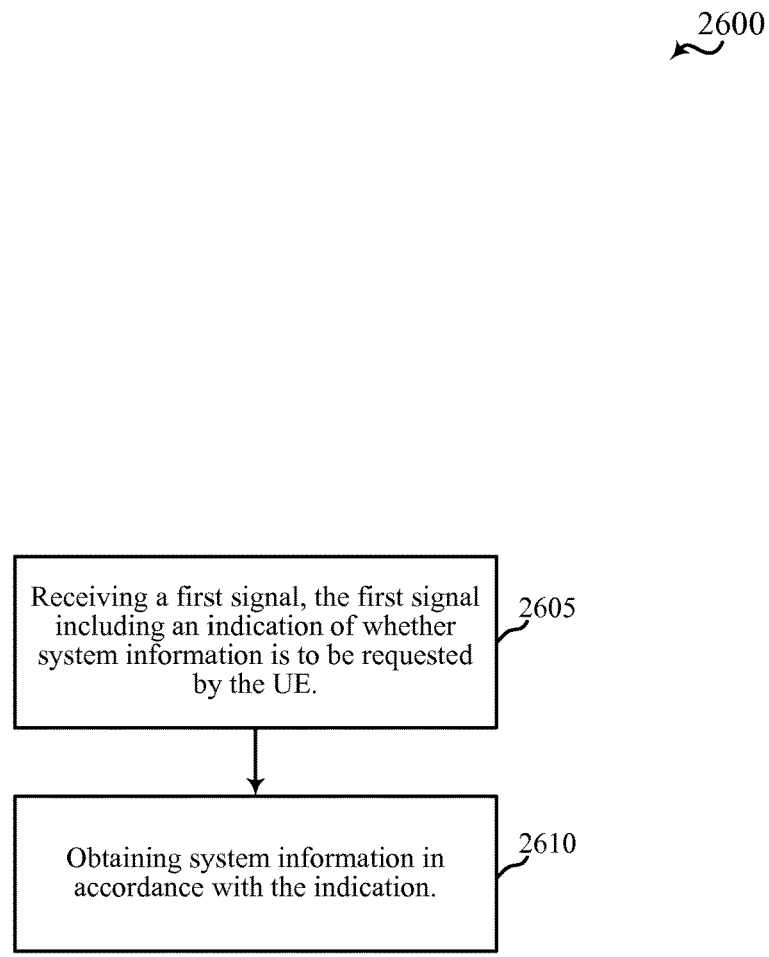
FIG. 26 is a flow chart illustrating an example of a method for wireless communication at a UE, in accordance with various aspects of the present disclosure.

FIG. 26 is a flow chart illustrating an example of a method 2600 for wireless communication at a UE, in accordance with various aspects of the present disclosure. For clarity, the method 2600 is described below with reference to aspects of one or more of the UEs 115 described with reference to FIG. 1-8, 15, or 25. In some examples a UE may execute one or more sets of codes to control the functional elements of the UE to perform the functions described below. In some examples, the method 2600 may be performed by a UE during an initial access procedure.

At block 2605, a UE may receive a first signal, the first signal including an indication of whether SI is to be requested by the UE. The first signal may, in some examples, be a periodic sync signal, and may indicate to the UE that SI is to be acquired through a fixed periodic broadcast or broad-beam transmission or through an on-demand broadcast, unicast, broad-beam transmission or narrow-beam transmission. The operations at block 2605 may be performed using the SI acquisition module 720 described with reference to FIG. 7, 8, 15, or 25, the SI acquisition mode module 735 described with reference to FIG. 7 or 8, or the sync signal receipt module 805 described with reference to FIG. 8.

At block 2610, a UE may obtain SI in accordance with the indication. Thus, if the indication indicates that SI is to be broadcast without the UE requesting the SI, then the UE may receive the SI in a periodic broadcast or broad-beam transmission. If the indication indicates that SI is to be transmitted in response to a UE request, then the UE may receive the SI after the UE has submitted a request for the SI. The operations at block 2610 may be performed using the SI acquisition module 720 described with reference to FIG. 7, 8, 15, or 25, or the SI receipt module 745 described with reference to FIG. 7 or 8.

Thus, the method 2600 may provide for wireless communication, and in particular, for SI acquisition. It should be noted that the method 2600 is just one implementation and that the operations of the method 2600 may be rearranged or otherwise modified such that other implementations are possible.

Figure 27:
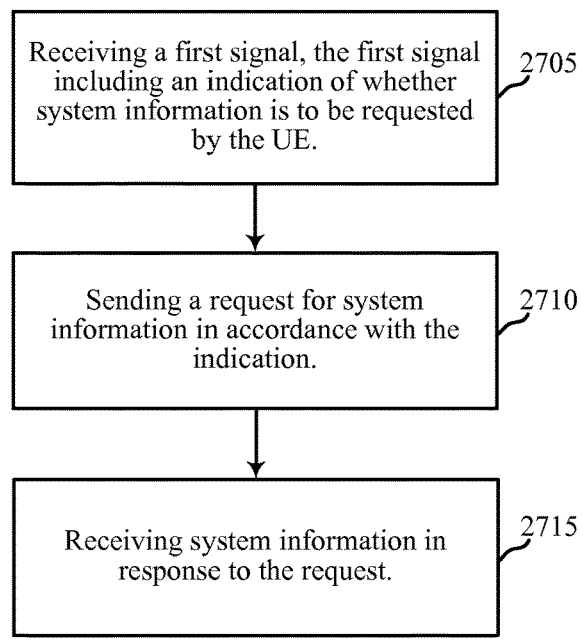
FIG. 27 is a flow chart illustrating an example of a method for wireless communication at a UE, in accordance with various aspects of the present disclosure.

FIG. 27 is a flow chart illustrating an example of a method 2700 for wireless communication at a UE, in accordance with various aspects of the present disclosure. For clarity, the method 2700 is described below with reference to aspects of one or more of the UEs 115 described with reference to FIG. 1-8, 15, or 25. In some examples a UE may execute one or more sets of codes to control the functional elements of the UE to perform the functions described below. In some examples, the method 2700 may be performed by a UE during an initial access procedure.

At block 2705, a UE may receive a first signal, the first signal including an indication of whether SI is to be requested by the UE. The first signal may, in some examples, be a periodic sync signal, and may indicate to the UE that SI is to be acquired through an on-demand broadcast, unicast, broad-beam transmission or narrow-beam transmission. The operations at block 2705 may be performed using the SI acquisition module 720 described with reference to FIG. 7, 8, 15, or 25, the SI acquisition mode module 735 described with reference to FIG. 7 or 8, or the sync signal receipt module 805 described with reference to FIG. 8.

At block 2710, a UE may send a request for SI in accordance with the indication. The request may be sent in accordance to information included within the first signal, such as destination and/or timing information. The operations at block 2710 may be performed using the SI acquisition module 720 described with reference to FIG. 7, 8, 15, or 25, or the UE SI request module 740 described with reference to FIG. 7 or 8.

At block 2715, a UE may receive SI in response to the request. The SI may be received as an on-demand periodic broadcast or broad-beam transmission, an on-demand aperiodic broadcast or broad-beam transmission, or an on-demand aperiodic unicast or narrow-beam transmission. The operations at block 2715 may be performed using the SI acquisition module 720 described with reference to FIG. 7, 8, 15, or 25, or the SI receipt module 745 described with reference to FIG. 7 or 8.

Thus, the method 2700 may provide for wireless communication, and in particular, for SI acquisition. It should be noted that the method 2700 is just one implementation and that the operations of the method 2700 may be rearranged or otherwise modified such that other implementations are possible.

Figure 28:
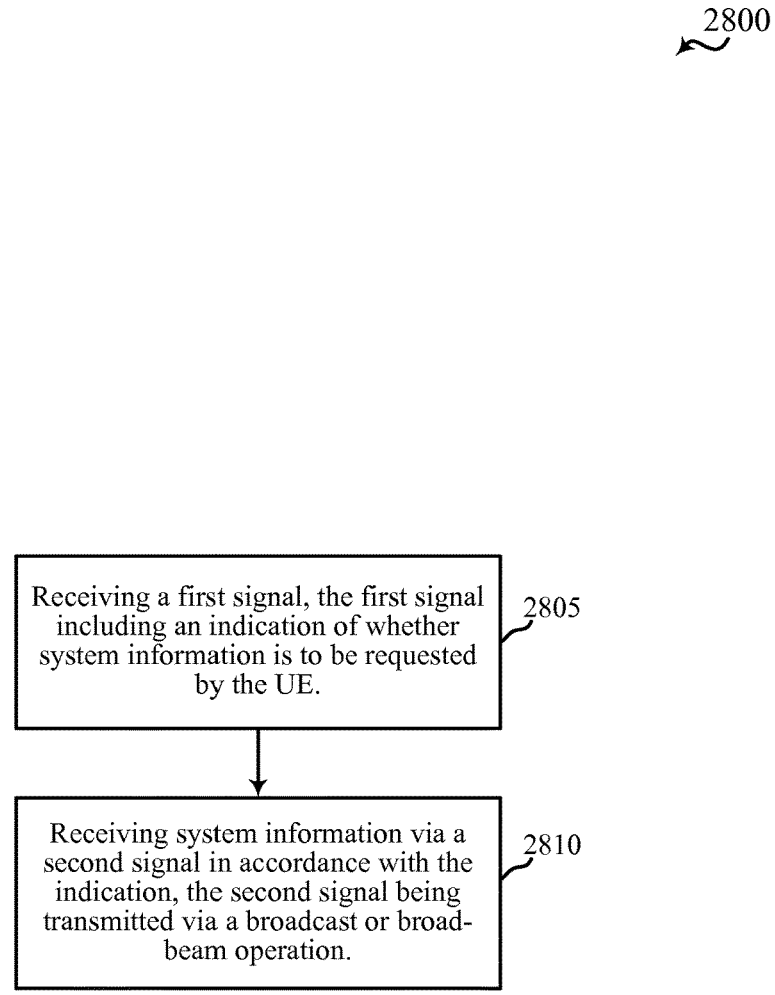
FIG. 28 is a flow chart illustrating an example of a method for wireless communication at a UE, in accordance with various aspects of the present disclosure.

FIG. 28 is a flow chart illustrating an example of a method 2800 for wireless communication at a UE, in accordance with various aspects of the present disclosure. For clarity, the method 2800 is described below with reference to aspects of one or more of the UEs 115 described with reference to FIG. 1-8, 15, or 25. In some examples a UE may execute one or more sets of codes to control the functional elements of the UE to perform the functions described below. In some examples, the method 2800 may be performed by a UE during an initial access procedure.

At block 2805, a UE may receive a first signal, the first signal including an indication of whether SI is to be requested by the UE. The first signal may, in some examples, be a periodic sync signal, and may indicate to the UE that SI is to be transmitted without a need for the UE to request the SI. The operations at block 2805 may be performed using the SI acquisition module 720 described with reference to FIG. 7, 8, 15, or 25, the SI acquisition mode module 735 described with reference to FIG. 7 or 8, or the sync signal receipt module 805 described with reference to FIG. 8.

At block 2810, a UE may receive SI via a second signal in accordance with the indication, the second signal being transmitted via a broadcast or broad-beam operation. The SI may be received as a fixed periodic broadcast or broad-beam transmission. The operations at block 2810 may be performed using the SI acquisition module 720 described with reference to FIG. 7, 8, 15, or 25, or the SI receipt module 745 described with reference to FIG. 7 or 8.

Thus, the method 2800 may provide for wireless communication, and in particular, for SI acquisition. It should be noted that the method 2800 is just one implementation and that the operations of the method 2800 may be rearranged or otherwise modified such that other implementations are possible.

Figure 29:
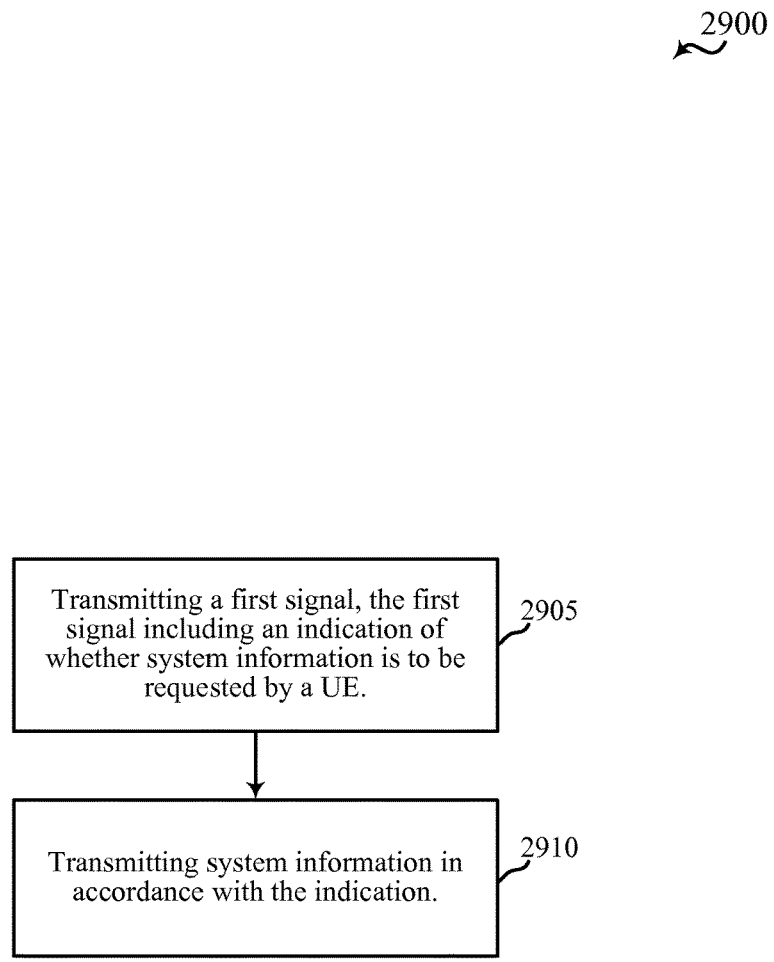
FIG. 29 is a flow chart illustrating an example of a method for wireless communication at a base station, in accordance with various aspects of the present disclosure.

FIG. 29 is a flow chart illustrating an example of a method 2900 for wireless communication at a base station, in accordance with various aspects of the present disclosure. For clarity, the method 2900 is described below with reference to aspects of one or more of the base stations 105 described with reference to FIG. 16, 17, 24A, 24B, or 25. In some examples a base station may execute one or more sets of codes to control the functional elements of the base station to perform the functions described below. In some examples, the method 2900 may be performed by a base station during an initial access procedure of a UE.

At block 2905, a base station may transmit a first signal, the first signal including an indication of whether SI is to be requested by a UE. The first signal may, in some examples, be a periodic sync signal, and may indicate to a UE that SI is to be acquired through a fixed periodic broadcast or broad-beam transmission or through an on-demand broadcast, unicast, broad-beam transmission or narrow-beam transmission. The operations at block 2905 may be performed using the SI transmission module 1620 described with reference to FIG. 16, 75, 24A, 24B, or 25, the SI transmission mode module 1635 described with reference to FIG. 16 or 17, or the sync signal transmit module 1705 described with reference to FIG. 17.

At block 2910, a base station may transmit SI in accordance with the indication. Thus, if the indication indicates that SI is to be broadcast without a UE requesting the SI, then the base station may transmit the SI in a periodic broadcast or broad-beam transmission. If the indication indicates that SI is to be transmitted in response to a UE request, then the base station may transmit the SI after a UE has submitted a request for the SI. The operations at block 2910 may be performed using the SI transmission module 1620 described with reference to FIG. 16, 17, 24A, 24B, or 25, or the SI transmit module 1645 described with reference to FIG. 16 or 17.

Thus, the method 2900 may provide for wireless communication, and in particular, for SI transmission. It should be noted that the method 2900 is just one implementation and that the operations of the method 2900 may be rearranged or otherwise modified such that other implementations are possible.

Figure 30:
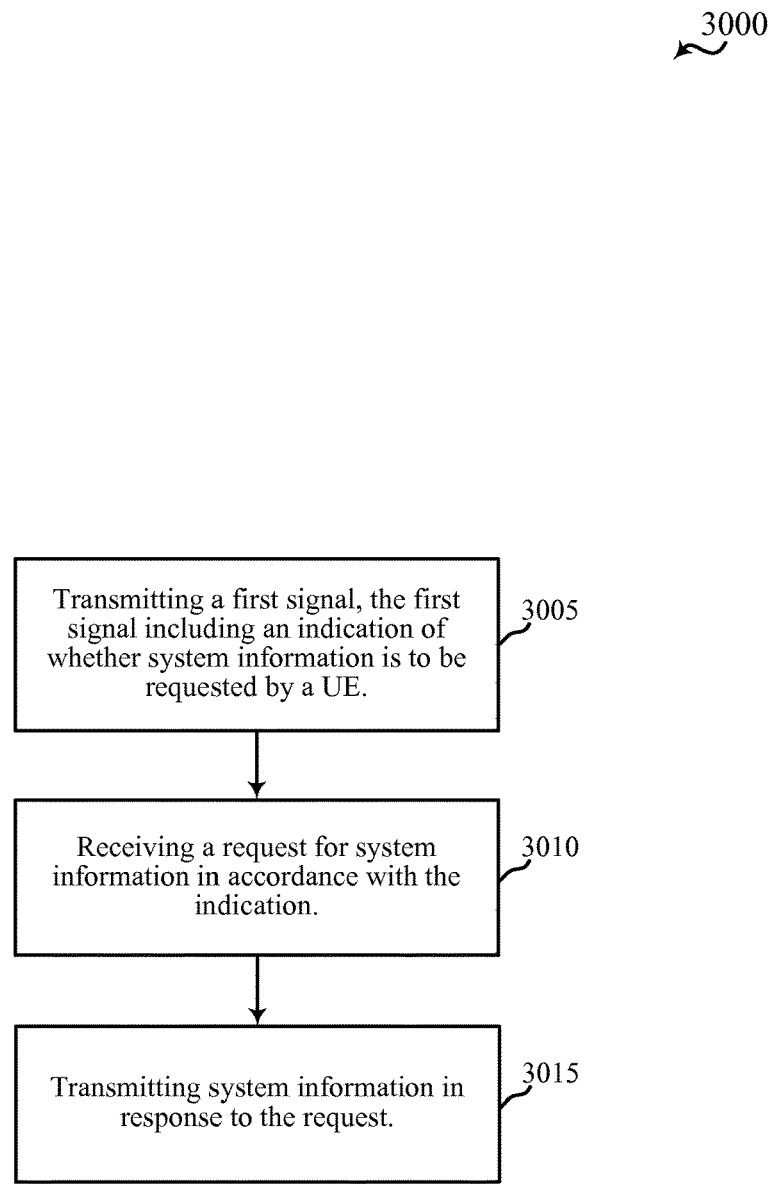
FIG. 30 is a flow chart illustrating an example of a method for wireless communication at a base station, in accordance with various aspects of the present disclosure.

FIG. 30 is a flow chart illustrating an example of a method 3000 for wireless communication at a base station, in accordance with various aspects of the present disclosure.

For clarity, the method 3000 is described below with reference to aspects of one or more of the base stations 105 described with reference to FIG. 16, 17, 24A, 24B, or 25. In some examples a base station may execute one or more sets of codes to control the functional elements of the base station to perform the functions described below. In some examples, the method 3000 may be performed by a base station during an initial access procedure of a UE.

At block 3005, a base station may transmit a first signal, the first signal including an indication of whether SI is to be requested by a UE. The first signal may, in some examples, be a periodic sync signal, and may indicate to a UE that SI is to be acquired through an on-demand broadcast, unicast, broad-beam transmission or narrow-beam transmission. The operations at block 3005 may be performed using the SI transmission module 1620 described with reference to FIG. 16, 17, 24A, 24B, or 25, the SI transmission mode module 1635 described with reference to FIG. 16 or 17, or the sync signal transmit module 1705 described with reference to FIG. 17.

At block 3010, a base station may receive a request for SI in accordance with the indication. The request may be received in accordance to information included within the first signal, such as destination and/or timing information. The operations at block 3010 may be performed using the SI transmission module 1620 described with reference to FIG. 16, 17, 24A, 24B, or 25, or the base station SI request module 1640 described with reference to FIG. 16 or 17.

At block 3015, a base station may transmit SI in response to the request. The SI may be transmitted as an on-demand periodic broadcast or broad-beam transmission, an on-demand aperiodic broadcast or broad-beam transmission, or an on-demand aperiodic unicast or narrow-beam transmission. The operations at block 3015 may be performed using the SI transmission module 1620 described with reference to FIG. 16, 17, 24A, 24B, or 25, or the SI transmit module 1645 described with reference to FIG. 16 or 17.

Thus, the method 3000 may provide for wireless communication, and in particular, for SI transmission. It should be noted that the method 3000 is just one implementation and that the operations of the method 3000 may be rearranged or otherwise modified such that other implementations are possible.

Figure 31:
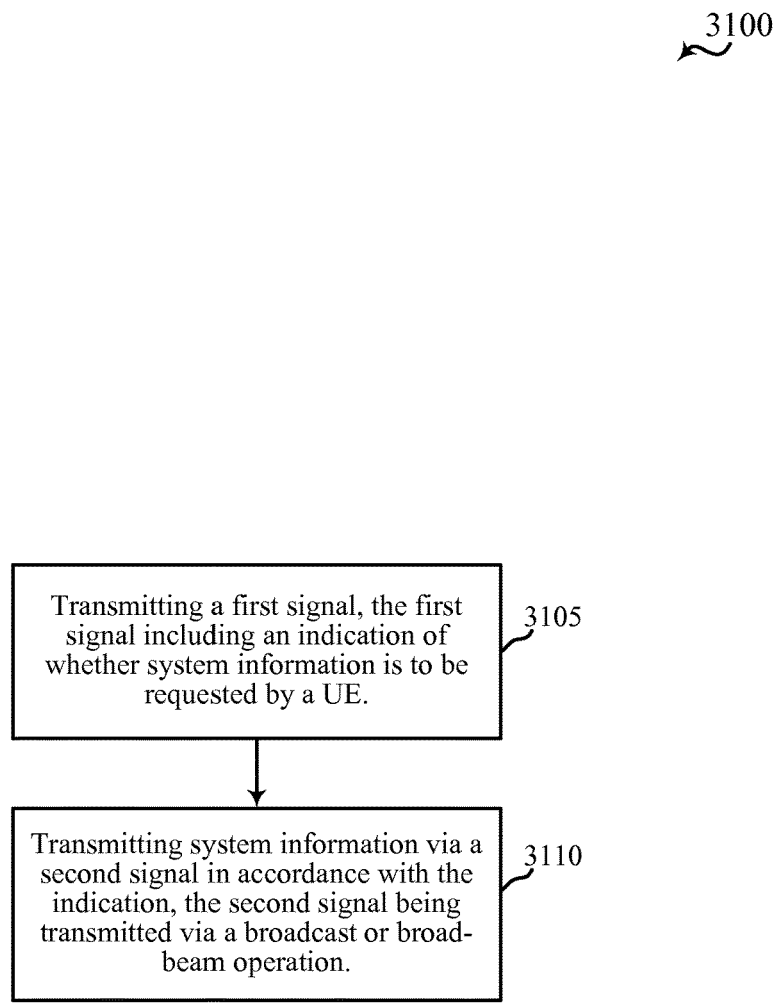
FIG. 31 is a flow chart illustrating an example of a method for wireless communication at a base station, in accordance with various aspects of the present disclosure.

FIG. 31 is a flow chart illustrating an example of a method 3100 for wireless communication at a base station, in accordance with various aspects of the present disclosure. For clarity, the method 3100 is described below with reference to aspects of one or more of the base stations 105 described with reference to FIG. 16, 17, 24A, 24B, or 25. In some examples a base station may execute one or more sets of codes to control the functional elements of the base station to perform the functions described below. In some examples, the method 3100 may be performed by a base station during an initial access procedure of a UE.

At block 3105, a base station may transmit a first signal, the first signal including an indication of whether SI is to be requested by a UE. The first signal may, in some examples, be a periodic sync signal, and may indicate to a UE that SI is to be transmitted without a need for the UE to request the SI. The operations at block 3105 may be performed using the SI transmission module 1620 described with reference to FIG. 16, 17, 24A, 24B, or 25, the SI transmission mode module 1635 described with reference to FIG. 16 or 17, or the sync signal transmit module 1705 described with reference to FIG. 17.

At block 3110, a base station may transmit SI via a second signal in accordance with the indication, the second signal being transmitted via a broadcast or broad-beam operation. The SI may be transmitted as a fixed periodic broadcast or broad-beam transmission. The operations at block 3110 may be performed using the SI transmission module 1620 described with reference to FIG. 16, 17, 24A, 24B, or 25, or the SI transmit module 1645 described with reference to FIG. 16 or 17.

Thus, the method 3100 may provide for wireless communication, and in particular, for SI transmission. It should be noted that the method 3100 is just one implementation and that the operations of the method 3100 may be rearranged or otherwise modified such that other implementations are possible.

Figure 32:
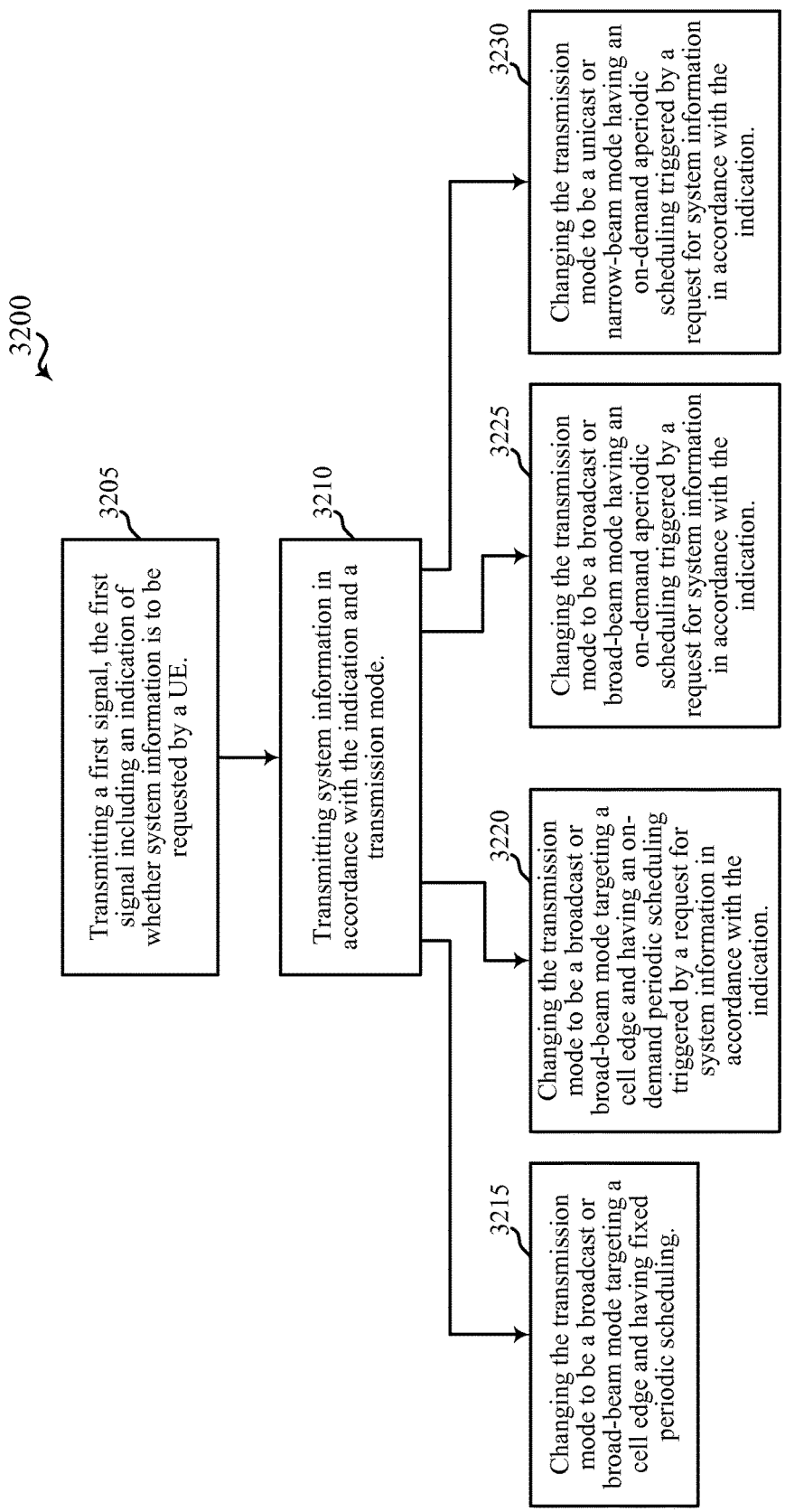
FIG. 32 is a flow chart illustrating an example of a method for wireless communication at a base station, in accordance with various aspects of the present disclosure.

FIG. 32 is a flow chart illustrating an example of a method 3200 for wireless communication at a base station, in accordance with various aspects of the present disclosure. For clarity, the method 3200 is described below with reference to aspects of one or more of the base stations 105 described with reference to FIG. 16, 17, 24A, 24B, or 25. In some examples a base station may execute one or more sets of codes to control the functional elements of the base station to perform the functions described below. In some examples, the method 3200 may be performed by a base station during an initial access procedure of a UE.

At block 3205, a base station may transmit a first signal, the first signal including an indication of whether SI is to be requested by a UE. The first signal may, in some examples, be a periodic sync signal, and may indicate to a UE that SI is to be acquired through a fixed periodic broadcast or broad-beam transmission or through an on-demand broadcast, unicast, broad-beam transmission or narrow-beam transmission. The operations at block 3205 may be performed using the SI transmission module 1620 described with reference to FIG. 16, 17, 24A, 24B, or 25, the SI transmission mode module 1635 described with reference to FIG. 16 or 17.

At block 3210, a base station may transmit SI in accordance with the indication and a transmission mode. Thus, if the indication and transmission mode indicates that SI is to be broadcast without a UE requesting the SI, then the base station may transmit the SI in a periodic broadcast or broad-beam transmission. If the indication and transmission mode indicates that SI is to be transmitted in response to a UE request, then the base station may transmit the SI after a UE has submitted a request for the SI. Depending on the transmission mode, the base station may transmit the SI as either a fixed periodic broadcast or broad-beam transmission, an on-demand periodic broadcast or broad-beam transmission, an on-demand aperiodic broadcast or broad-beam transmission, or an on-demand aperiodic unicast or narrow-beam transmission. The operations at block 3210 may be performed using the SI transmission module 1620 described with reference to FIG. 16, 17, 24A, 24B, or 25, or the SI transmit module 1645 described with reference to FIG. 16 or 17.

At blocks 3215, 3220, 3225, or 3230, the base station may change its transmission mode. Thus, the base station may perform any one or more of blocks 3215, 3220, 3225, or 3230. Changes in transmission mode may be made in response to, for example, changes in the numbers of UEs requesting SI from the base station, network load, congestion status or available radio resources.

At block 3215, a base station may change the transmission mode to be a broadcast or broad-beam mode targeting a cell edge and having fixed periodic scheduling. Changing of the transmission mode may be based on one or more of a number of UEs requesting SI acquisition, network load, congestion status, or available radio resources. The operations at block 3215 may be performed using the SI transmission module 1620 described with reference to FIG. 16, 17, 24A, 24B, or 25, the SI transmission mode module 1635 described with reference to FIG. 16 or 17, or the SI transmission mode determination module 1710 described with reference to FIG. 17.

At block 3220, a base station may change the transmission mode to be a broadcast or broad-beam mode targeting a cell edge and having an on-demand periodic scheduling triggered by a request for system information in accordance with the indication. Changing of the transmission mode may be based on one or more of a number of UEs requesting SI acquisition, network load, congestion status, or available radio resources. The operations at block 3220 may be performed using the SI transmission module 1620 described with reference to FIG. 16, 17, 24A, 24B, or 25, the SI transmission mode module 1635 described with reference to FIG. 16 or 17, or the SI transmission mode determination module 1710 described with reference to FIG. 17.

At block 3225, a base station may change the transmission mode to be a broadcast or broad-beam mode having an on-demand aperiodic scheduling triggered by a request for system information in accordance with the indication. Changing of the transmission mode may be based on one or more of a number of UEs requesting SI acquisition, network load, congestion status, or available radio resources. The operations at block 3225 may be performed using the SI transmission module 1620 described with reference to FIG. 16, 17, 24A, 24B, or 25, the SI transmission mode module 1635 described with reference to FIG. 16 or 17, or the SI transmission mode determination module 1710.

At block 3230, a base station may change the transmission mode to be a unicast or narrow-beam mode having an on-demand aperiodic scheduling triggered by a request for system information in accordance with the indication. Changing of the transmission mode may be based on one or more of a number of UEs requesting SI acquisition, network load, congestion status, or available radio resources. The operations at block 3230 may be performed using the SI transmission module 1620 described with reference to FIG. 16, 17, 24A, 24B, or 25, the SI transmission mode module 1635 described with reference to FIG. 16 or 17, or the SI transmission mode determination module 1710 described with reference to FIG. 17.

The operations at blocks 3215, 3220, 3225, 3230 may all be performed by a base station. Alternatively, a base station may perform any one or more of the operations described at blocks 3215, 3220, 3225, 3230.

Thus, the method 3200 may provide for wireless communication, and in particular, for SI transmission. It should be noted that the method 3200 is just one implementation and that the operations of the method 3200 may be rearranged or otherwise modified such that other implementations are possible.

Figure 33:
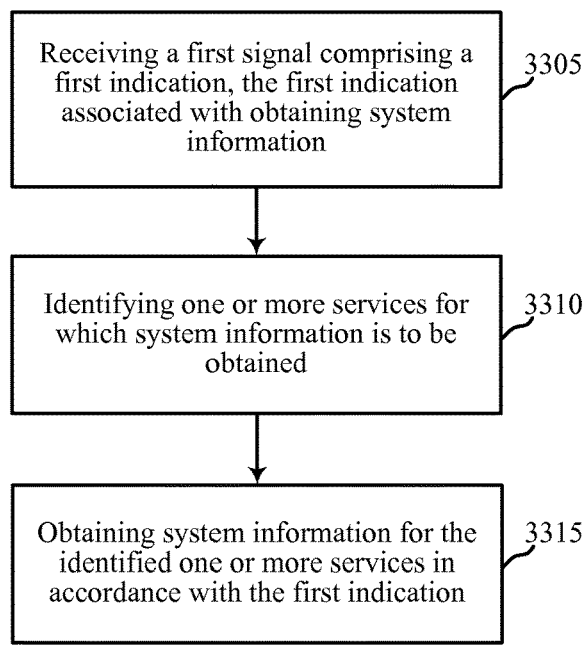
FIG. 33 is a flow chart illustrating an example of a method for wireless communication at a UE, in accordance with various aspects of the present disclosure.

FIG. 33 is a flow chart illustrating an example of a method 3300 for wireless communication at a UE, in accordance with various aspects of the present disclosure. For clarity, the method 3300 is described below with reference to aspects of one or more of the UEs 115 described with reference to FIGS. 1-15 and 25. In some examples a UE may execute one or more sets of codes to control the functional elements of the UE to perform the functions described below. In some examples, the method 3300 may be performed by a UE receiving system information in a unicast, narrow-beam, broadcast, or broad-beam manner.

At block 3305, a UE may receive a first signal comprising a first indication, the first indication associated with obtaining system information. The first indication may indicate that system information is to be obtained via request or via broadcast, for example. The operation(s) at block 3305 may be performed using the SI acquisition module 720 described with reference to FIG. 9, 10, 15, or 25, the service-specific SI acquisition mode module 905 described with reference to FIG. 9 or 10, or the sync signal receipt module 1005 described with reference to FIG. 10.

At block 3310, a UE may identify one or more services for which system information is to be obtained. The service-specific system information that is available may be identified in the first signal. Nevertheless, the UE may determine which of the identified service-specific system information is needed. Alternatively, the UE may determine in the absence of any identification of available service-specific system information which system information is needed. The operation(s) at block 3310 may be performed using the SI acquisition module 720 described with reference to FIG. 9, 10, 15, or 25, the service-specific SI acquisition mode module 905 described with reference to FIG. 9 or 10, or the service-specific SI acquisition mode determination module 1010 described with reference to FIG. 10.

At block 3315, a UE may obtain system information for the identified one or more services in accordance with the first indication. The system information may be obtained by either listening to a broadcast or by requesting service-specific system information. The operation(s) at block 3315 may be performed using the SI acquisition module 720 described with reference to FIG. 9, 10, 15, or 25, or the UE service-specific SI request module 910 and the SI receipt module 745 described with reference to FIG. 9 or 10.

In some embodiments of the method 3300, obtaining system information may include sending a request for system information for the one or more services, and receiving the system information for the one or more services in response to the request. In other embodiments, obtaining system information may include sending a separate request for system information for each of the one or more services, each request being for system information of a difference service, and receiving, individually, system information for the one or more services in response to each of the requests.

In some embodiments, receiving the first signal may include receiving a second indication that system information for the one or more services is to be broadcast at one or more predetermined times and on one or more predetermined channels. Receiving the first signal may also include receiving a second indication that system information for the one or more services is available.

Thus, the method 3300 may provide for wireless communication. It should be noted that the method 3300 is just one implementation and that the operations of the method 3300 may be rearranged or otherwise modified such that other implementations are possible.

Figure 34:
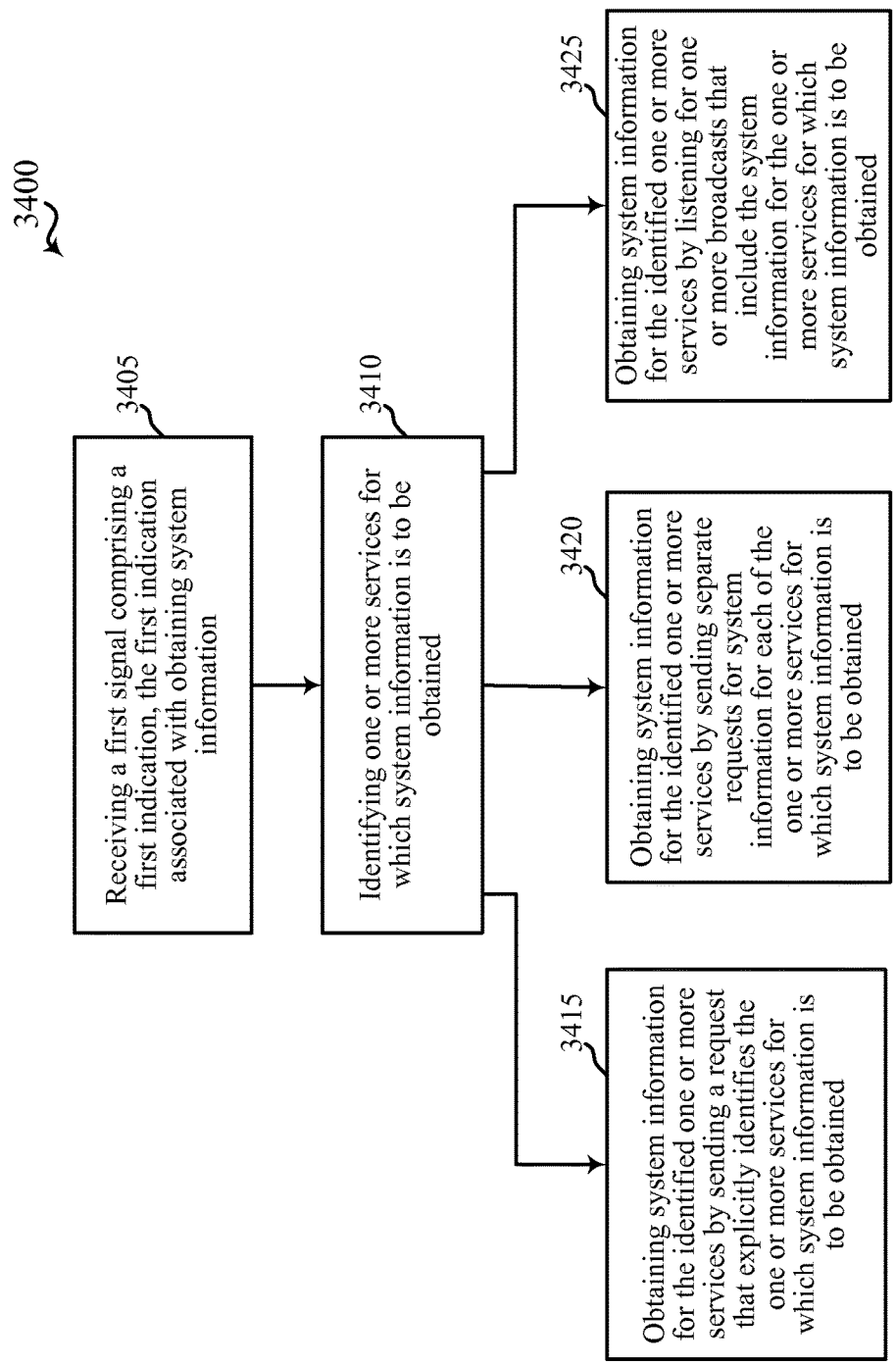
FIG. 34 is a flow chart illustrating an example of a method for wireless communication at a UE, in accordance with various aspects of the present disclosure.

FIG. 34 is a flow chart illustrating an example of a method 3400 for wireless communication at a UE, in accordance with various aspects of the present disclosure. For clarity, the method 3400 is described below with reference to aspects of one or more of the UEs 115 described with reference to FIGS. 1-15 and 25. In some examples a UE may execute one or more sets of codes to control the functional elements of the UE to perform the functions described below. In some examples, the method 3400 may be performed by a UE receiving system information in a unicast, narrow-beam, broadcast, or broad-beam manner.

At block 3405, a UE may receive a first signal comprising a first indication, the first indication associated with obtaining system information. The first indication may indicate that system information is to be obtained via request or via broadcast, for example. The operation(s) at block 3405 may be performed using the SI acquisition module 720 described with reference to FIG. 9, 10, 15, or 25, the service-specific SI acquisition mode module 905 described with reference to FIG. 9 or 10, or the sync signal receipt module 1005 described with reference to FIG. 10.

At block 3410, a UE may identify one or more services for which system information is to be obtained. The service-specific system information that is available may be identified in the first signal. Nevertheless, the UE may determine which of the identified service-specific system information is needed. Alternatively, the UE may determine in the absence of any identification of available service-specific system information which system information is needed. The operation(s) at block 3410 may be performed using the SI acquisition module 720 described with reference to FIG. 9, 10, 15, or 25, the service-specific SI acquisition mode module 905 described with reference to FIG. 9 or 10, or the service-specific SI acquisition mode determination module 1010 described with reference to FIG. 10.

Any one of blocks 3415, 3420, or 3425 may follow after block 3410, depending on the first indication included in the first signal. At block 3415, a UE may obtain system information for the identified one or more services by sending a request that explicitly identifies the one or more services for which system information is to be obtained. The operation(s) at block 3415 may be performed using the SI acquisition module 720 described with reference to FIG. 9, 10, 15, or 25, or the UE service-specific SI request module 910 and the SI receipt module 745 described with reference to FIG. 9 or 10.

At block 3420, a UE may obtain system information for the identified one or more services by sending separate requests for system information for each of the one or more services for which system information is to be obtained. The operation(s) at block 3420 may be performed using the SI acquisition module 720 described with reference to FIG. 9, 10, 15, or 25, or the UE service-specific SI request module 910 and the SI receipt module 745 described with reference to FIG. 9 or 10.

At block 3425, a UE may obtain system information for the identified one or more services by listening for one or more broadcasts that include the system information for the one or more services for which system information is to be obtained. The operation(s) at block 3425 may be performed using the SI acquisition module 720 described with reference to FIG. 9, 10, 15, or 25, or the SI receipt module 745 described with reference to FIG. 9 or 10.

Thus, the method 3400 may provide for wireless communication. It should be noted that the method 3400 is just one implementation and that the operations of the method 3400 may be rearranged or otherwise modified such that other implementations are possible.

Figure 35:
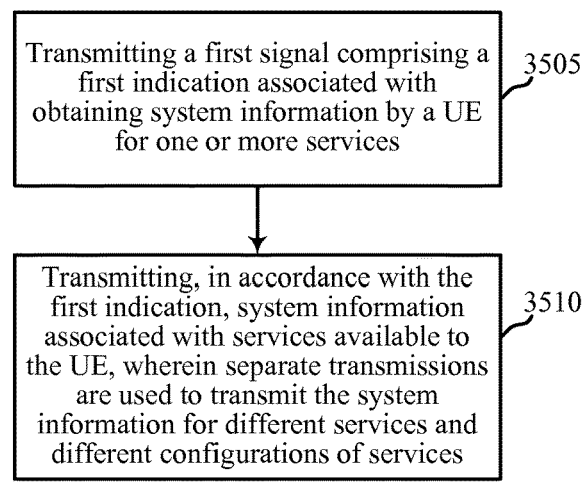
FIG. 35 is a flow chart illustrating an example of a method for wireless communication at a base station, in accordance with various aspects of the present disclosure.

FIG. 35 is a flow chart illustrating an example of a method 3500 for wireless communication at a base station, in accordance with various aspects of the present disclosure. For clarity, the method 3500 is described below with reference to aspects of one or more of the base stations 105 described with reference to FIGS. 1-6 and 16-25. In some examples a base station may execute one or more sets of codes to control the functional elements of the base station to perform the functions described below. In some examples, the method 3500 may be performed by a base station during an initial access procedure of a UE.

At block 3505, a base station may transmit a first signal comprising a first indication associated with obtaining system information by a UE for one or more services. The first signal may, in some examples, be a service-specific periodic sync signal, and may indicate to a UE that service-specific SI is to be acquired through a fixed periodic broadcast or broad-beam transmission or by request. The operations at block 3505 may be performed using the SI transmission module 1620 described with reference to FIG. 18, 19, 24A, 24B, or 25, or the service-specific SI transmission mode module 1805 described with reference to FIG. 18 or 19.

At block 3510, a base station may transmit, in accordance with the first indication, system information associated with services available to the UE, wherein separate transmission are used to transmit the system information for different services and different configurations of services. These service-specific SI transmissions may be either periodically broadcast or may be transmitted in response to the receipt of a request from a UE. The operations at block 3510 may be performed using the SI transmission module 1620 described with reference to FIG. 18, 19, 24A, 24B, or 25, or the base station service-specific SI request module 1810 and SI transmit module 1645 described with reference to FIG. 18 or 19.

In some embodiments, the base station may further receive a request for system information for one or more services in accordance with the first indication, and may then transmit system information for the one or more services in response to the request. In other embodiments, the base station may receive multiple requests for system information for one or more services in accordance with the first indication, each request being from the UE and being for system information of a different service, and then may transmit system information for the one or more services in response to the request. Service-specific system information may be transmitted as either a joint transmission or separately.

In some embodiments, the base station may include, in the first signal, a second indication that system information for one or more services is to be broadcast at one or more predetermined times and on one or more predetermined channels. Additionally, the base station may include, in the first signal, a second indication that system information for one or more services is available to be requested.

Thus, the method 3500 may provide for wireless communication, and in particular, for service-specific SI transmission. It should be noted that the method 3500 is just one implementation and that the operations of the method 3500 may be rearranged or otherwise modified such that other implementations are possible.

Figure 36:
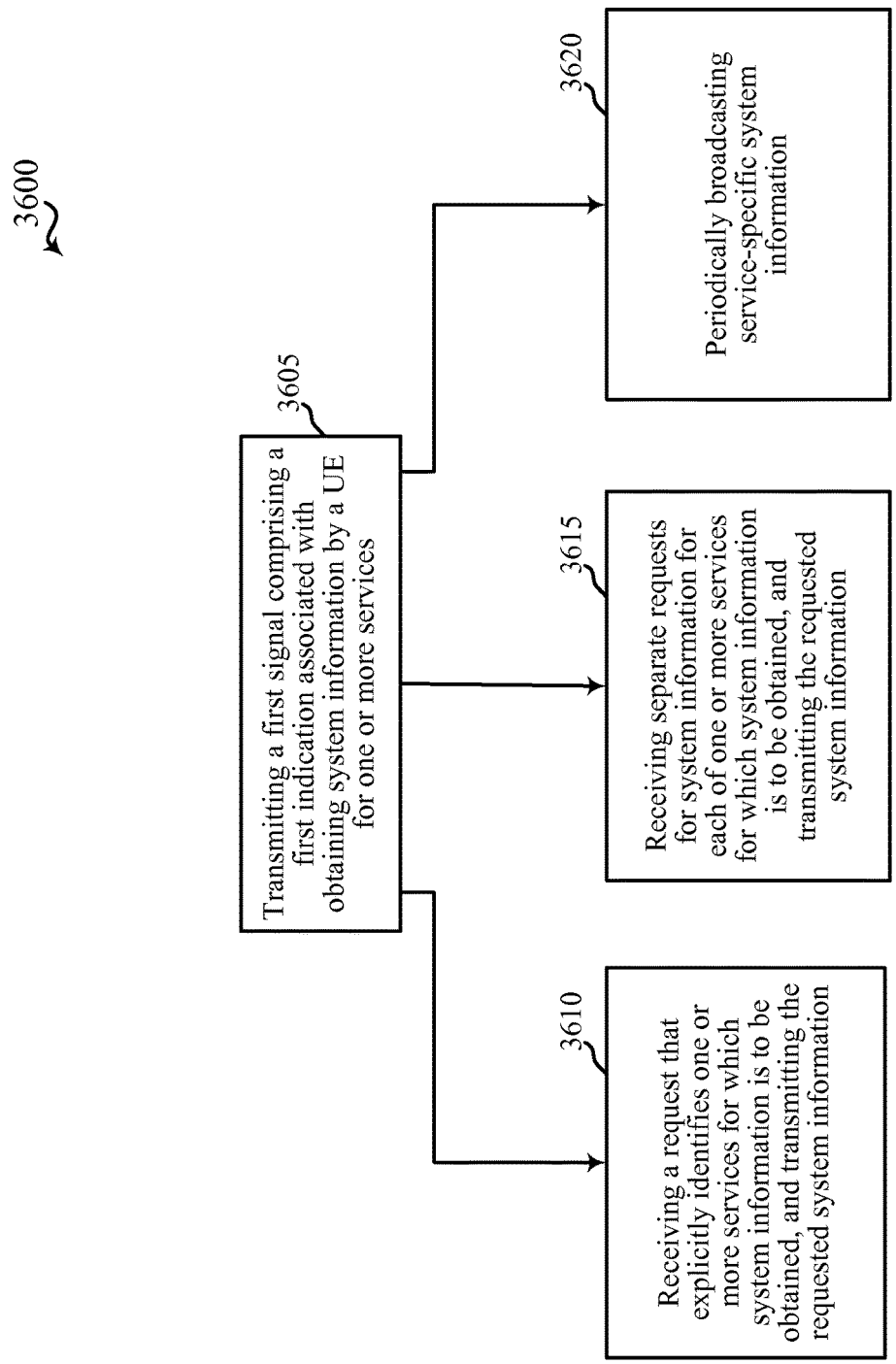
FIG. 36 is a flow chart illustrating an example of a method for wireless communication at a base station, in accordance with various aspects of the present disclosure.

FIG. 36 is a flow chart illustrating an example of a method 3600 for wireless communication at a base station, in accordance with various aspects of the present disclosure. For clarity, the method 3600 is described below with reference to aspects of one or more of the base stations 105 described with reference to FIGS. 1-6 and 16-25. In some examples a base station may execute one or more sets of codes to control the functional elements of the base station to perform the functions described below. In some examples, the method 3600 may be performed by a base station during an initial access procedure of a UE.

At block 3605, a base station may transmit a first signal comprising a first indication associated with obtaining system information by a UE for one or more services. The first signal may, in some examples, be a service-specific periodic sync signal, and may indicate to a UE that service-specific SI is to be acquired through a fixed periodic broadcast or broad-beam transmission or by request. The operations at block 3605 may be performed using the SI transmission module 1620 described with reference to FIG. 18, 19, 24A, 24B, or 25, or the service-specific SI transmission mode module 1805 described with reference to FIG. 18 or 19.

Any one of blocks 3610, 3615, or 3620 may follow after block 3605, depending on the first indication included in the first signal. At block 3610, a base station may receive a request that explicitly identifies one or more services for which system information is to be obtained. The base station may then transmit the requested system information. The operations at block 3610 may be performed using the SI transmission module 1620 described with reference to FIG. 18, 19, 24A, 24B, or 25, or the base station service-specific SI request module 1810 and SI transmit module 1645 described with reference to FIG. 18 or 19.

At block 3615, a base station may receive separate requests for system information for each of one or more services for which system information is to be obtained. The base station may then transmit the requested system information. The operations at block 3615 may be performed using the SI transmission module 1620 described with reference to FIG. 18, 19, 24A, 24B, or 25, or the base station service-specific SI request module 1810 and SI transmit module 1645 described with reference to FIG. 18 or 19.

At block 3620, a base station may periodically broadcast service-specific system information. The periodic broadcast may be in accordance with information included in the first signal. The operations at block 3620 may be performed using the SI transmission module 1620 described with reference to FIG. 18, 19, 24A, 24B, or 25, or the SI transmit module 1645 described with reference to FIG. 18 or 19.

Thus, the method 3600 may provide for wireless communication, and in particular, for service-specific SI transmission. It should be noted that the method 3600 is just one implementation and that the operations of the method 3600 may be rearranged or otherwise modified such that other implementations are possible.

Figure 37:
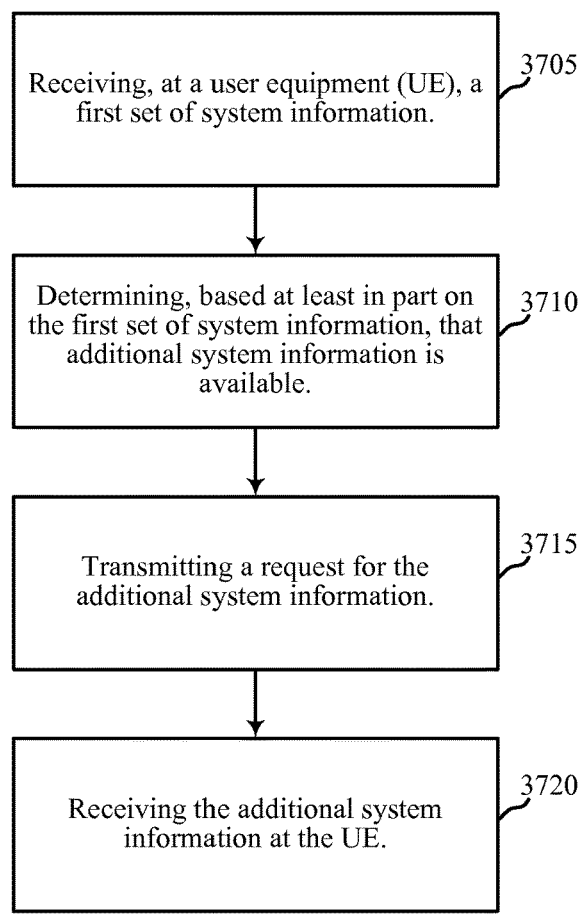
FIG. 37 is a flow chart illustrating an example of a method for wireless communication at a UE, in accordance with various aspects of the present disclosure.

FIG. 37 is a flow chart illustrating an example of a method 3700 for wireless communication at a UE, in accordance with various aspects of the present disclosure. For clarity, the method 3700 is described below with reference to aspects of one or more of the UEs 115 described with reference to FIGS. 1-15 and 25. In some examples a UE may execute one or more sets of codes to control the functional elements of the UE to perform the functions described below. In some examples, the method 3700 may be performed by a UE receiving system information in a unicast, narrow-beam, broadcast, or broad-beam manner.

At block 3705, a UE may receive a first set of system information (e.g., master system information, such as master system information included in an MSIB). The operation(s) at block 3705 may be performed using the SI acquisition module 720 described with reference to FIG. 11, 12, 15, or 25, or the master SI acquisition module 1105 described with reference to FIG. 11 or 12.

At block 3710, the UE may determine, based at least in part on the first set of system information, that additional system information (e.g., non-master system information, such as information included in an OSIB) is available. The operation(s) at block 3710 may be performed using the SI acquisition module 720 described with reference to FIG. 11, 12, 15, or 25, or the SI processing module 1110 described with reference to FIG. 11 or 12.

At block 3715, the UE may transmit a request (e.g., an OSIB transmission request) for the additional system information. In some examples, the UE may transmit a plurality of requests for the additional system information. In some examples, a single OSIB transmission request may indicate one or a plurality of elements of additional system information that the UE would like to receive (e.g., a binary value in the OSIB transmission request may be set to TRUE for each element of additional system information that the UE would like to receive). In other examples, the UE may request some types of additional system information in different OSIB transmission requests, a plurality of OSIB transmission requests may be transmitted. The operation(s) at block 3715 may be performed using the SI acquisition module 720 described with reference to FIG. 11, 12, 15, or 25, or the UE SI request module 1115 described with reference to FIG. 11 or 12.

At block 3720, the UE may receive the additional system information. The operation(s) at block 3720 may be performed using the SI acquisition module 720 described with reference to FIG. 11, 12, 15, or 25, or the other SI acquisition module 1120 described with reference to FIG. 11 or 12.

In some embodiments of the method 3700, receiving the first set of system information may include receiving an indication of one or more sets of additional system information that are available. In some embodiments of the method 3700, transmitting the request for the additional system information may include identifying, in the request for the additional system information, one or more sets of additional system information. In some embodiments, the one or more sets of additional system information identified in the request for the additional system information may include one or more sets of additional system information indicated in the first set of system information.

In some embodiments of the method 3700, receiving the additional system information, at block 3720, may include at least one of: receiving system information indicating which RATs are available in a region and how the UE is to select an available RAT; receiving system information indicating which services are available in a region and how the UE is to obtain an available service; receiving system information relating to an MBMS or a PWS service; receiving system information relating to location, positioning, or navigation services; or receiving system information based at least in part on a determined location of the UE.

In some embodiments of the method 3700, transmitting the request for the additional system information may include including one or more capabilities of the UE in the request. In these embodiments, receiving the additional system information may include receiving system information based at least in part on the one or more capabilities of the UE included in the request.

In some embodiments of the method 3700, transmitting the request for the additional system information may include including a location of the UE in the request. In these embodiments, receiving the additional system information may include receiving system information based at least in part on the location of the UE included in the request.

In some embodiments of the method 3700, transmitting the request for the additional system information may include including an identification of the UE in the request. In these embodiments, receiving the additional system information may include receiving the additional system information based at least in part on the identification of the UE included in the request.

Thus, the method 3700 may provide for wireless communication. It should be noted that the method 3700 is just one implementation and that the operations of the method 3700 may be rearranged or otherwise modified such that other implementations are possible.

Figure 38:
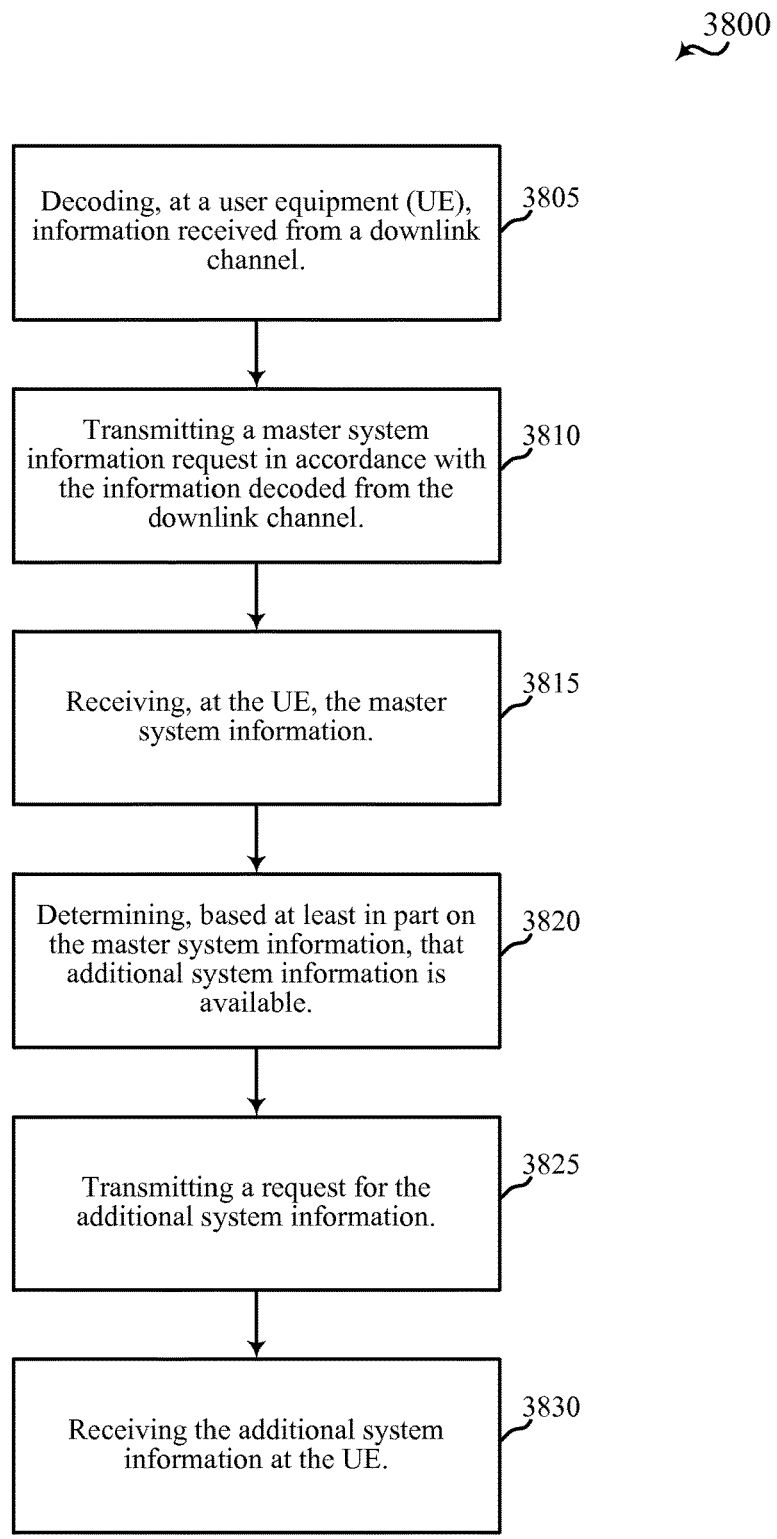
FIG. 38 is a flow chart illustrating an example of a method for wireless communication at a UE, in accordance with various aspects of the present disclosure.

FIG. 38 is a flow chart illustrating an example of a method 3800 for wireless communication at a UE, in accordance with various aspects of the present disclosure. For clarity, the method 3800 is described below with reference to aspects of one or more of the UEs 115 described with reference to FIGS. 1-15 and 25. In some examples a UE may execute one or more sets of codes to control the functional elements of the UE to perform the functions described below. In some examples, the method 3800 may be performed by a UE receiving system information in a unicast, narrow-beam, broadcast, or broad-beam manner.

At block 3805, a UE may decode information received from a downlink channel. The decoded information may indicate that master system information (e.g., an MSIB) is received in response to a master system information request (e.g., an MSIB transmission request). In some examples, the downlink channel may include a synchronization signal. The decoded information may include information decoded from the synchronization signal. The operation(s) at block 3805 may be performed using the SI acquisition module 720 described with reference to FIG. 11, 12, 15, or 25, or the sync signal processing module 1205 described with reference to FIG. 12.

At block 3810, the UE may transmit a master system information request in accordance with the information decoded from the downlink channel. The operation(s) at block 3810 may be performed using the SI acquisition module 720 described with reference to FIG. 11, 12, 15, or 25, or the UE SI request module 1115 described with reference to FIG. 11 or 12.

At block 3815, the UE may receive the master system information. The master system information may include system information that allows the UE to perform an initial access of a network using one or more of an identification of the network, an identification of a base station in the network, cell selection configuration and access restrictions, or a network access configuration. The operation(s) at block 3815 may be performed using the SI acquisition module 720 described with reference to FIG. 11, 12, 15, or 25, or the master SI acquisition module 1105 described with reference to FIG. 11 or 12.

At block 3820, the UE may determine, based at least in part on the master system information, that additional system information is available. The operation(s) at block 3820 may be performed using the SI acquisition module 720 described with reference to FIG. 11, 12, 15, or 25, or the SI processing module 1110 described with reference to FIG. 11 or 12.

At block 3825, the UE may transmit a request (e.g., an OSIB transmission request) for the additional system information. In some examples, the UE may transmit a plurality of requests for the additional system information. In some examples, a single OSIB transmission request may indicate one or a plurality of elements of additional system information that the UE would like to receive (e.g., a binary value in the OSIB transmission request may be set to TRUE for each element of additional system information that the UE would like to receive). In other examples, the UE may request some types of additional system information in different OSIB transmission requests, a plurality of OSIB transmission requests may be transmitted. The operation(s) at block 3825 may be performed using the SI acquisition module 720 described with reference to FIG. 11, 12, 15, or 25, or the UE SI request module 1115 described with reference to FIG. 11 or 12.

At block 3830, the UE may receive the additional system information. The operation(s) at block 3830 may be performed using the SI acquisition module 720 described with reference to FIG. 11, 12, 15, or 25, or the other SI acquisition module 1120 described with reference to FIG. 11 or 12.

In some embodiments of the method 3800, receiving the master system information may include receiving an indication of one or more sets of additional system information that are available. In some embodiments of the method 3800, transmitting the request for the additional system information may include identifying, in the request for the additional system information, one or more sets of additional system information. In some embodiments, the one or more sets of additional system information identified in the request for the additional system information may include one or more sets of additional system information indicated in the master system information.

Thus, the method 3800 may provide for wireless communication. It should be noted that the method 3800 is just one implementation and that the operations of the method 3800 may be rearranged or otherwise modified such that other implementations are possible.

Figure 39:
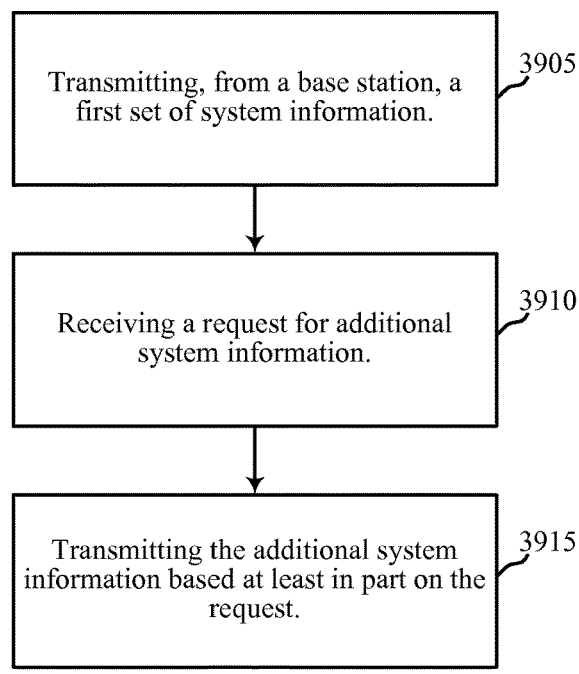
FIG. 39 is a flow chart illustrating an example of a method for wireless communication at a base station, in accordance with various aspects of the present disclosure.

FIG. 39 is a flow chart illustrating an example of a method 3900 for wireless communication at a base station, in accordance with various aspects of the present disclosure. For clarity, the method 3900 is described below with reference to aspects of one or more of the base stations 105 described with reference to FIGS. 1-6 and 16-25. In some examples a base station may execute one or more sets of codes to control the functional elements of the base station to perform the functions described below. In some examples, the method 3900 may be performed by a base station transmitting system information in a unicast, narrow-beam, broadcast, or broad-beam manner.

At block 3905, a base station may transmit a first set of system information (e.g., master system information, such as master system information included in an MSIB). The operation(s) at block 3905 may be performed using the SI transmission module 1620 described with reference to FIG. 20, 21, 24A, 24B, or 25, or the master SI transmission management module 2005 described with reference to FIG. 20 or 21.

At block 3910, the base station may receive a request for additional system information (e.g., non-master system information, such as information included in an OSIB). The operation(s) at block 3910 may be performed using the SI transmission module 1620 described with reference to FIG. 20, 21, 24A, 24B, or 25, or the SI request processing module 2010 described with reference to FIG. 20 or 21.

At block 3915, the base station may transmit the additional system information based at least in part on the request. The operation(s) at block 3915 may be performed using the SI transmission module 1620 described with reference to FIG. 20, 21, 24A, 24B, or 25, or the other SI transmission management module 2015 described with reference to FIG. 20 or 21.

In some embodiments of the method 3900, transmitting the first set of system information may include transmitting an indication of one or more sets of additional system information that are available. In some embodiments of the method 3900, receiving the request for the additional system information may include receiving multiple requests for additional system information corresponding to multiple sets of additional system information to be transmitted. For example, the method 3900 may include receiving a single OSIB transmission request indicating one or a plurality of elements of additional system information that a UE would like to receive (e.g., a binary value in the OSIB transmission request may be set to TRUE for each element of additional system information that the UE would like to receive). In other examples, the method 3900 may include receiving requests for some types of additional system information in different OSIB transmission requests.

In some embodiments of the method 3900, transmitting the additional system information, at block 3915, may include at least one of: transmitting system information indicating which RATs are available in a region and how a UE is to select an available RAT; transmitting system information indicating which services are available in a region and how a UE is to obtain an available service; transmitting system information relating to an MBMS or a PWS service; transmitting system information relating to location, positioning, or navigation services; or transmitting system information based at least in part on a determined location of a UE.

In some embodiments of the method 3900, receiving the request for the additional system information may include receiving, in the request, one or more capabilities of a UE transmitting the request. In these embodiments, transmitting the additional system information may include transmitting system information based at least in part on the one or more capabilities of the UE included in the request.

In some embodiments of the method 3900, receiving the request for the additional system information may include receiving, in the request, a location of a UE transmitting the request. In these embodiments, the method 3900 may include identifying the additional system information to transmit based at least in part on the location of the UE included in the request. Alternatively, the method 3900 may include determining a location of a UE transmitting the request, and identifying the additional system information to transmit based at least in part on the location of the UE.

In some embodiments of the method 3900, receiving the request for the additional system information may include receiving, in the request, an identification of a UE transmitting the request. In these embodiments, the method 3900 may include identifying the additional system information to transmit based at least in part on the identification of the UE included in the request. In some cases, the additional system information may be identified by accessing a database that includes the identification of the UE transmitting the request and one or more capabilities of the UE.

Thus, the method 3900 may provide for wireless communication. It should be noted that the method 3900 is just one implementation and that the operations of the method 3900 may be rearranged or otherwise modified such that other implementations are possible.

Figure 40:
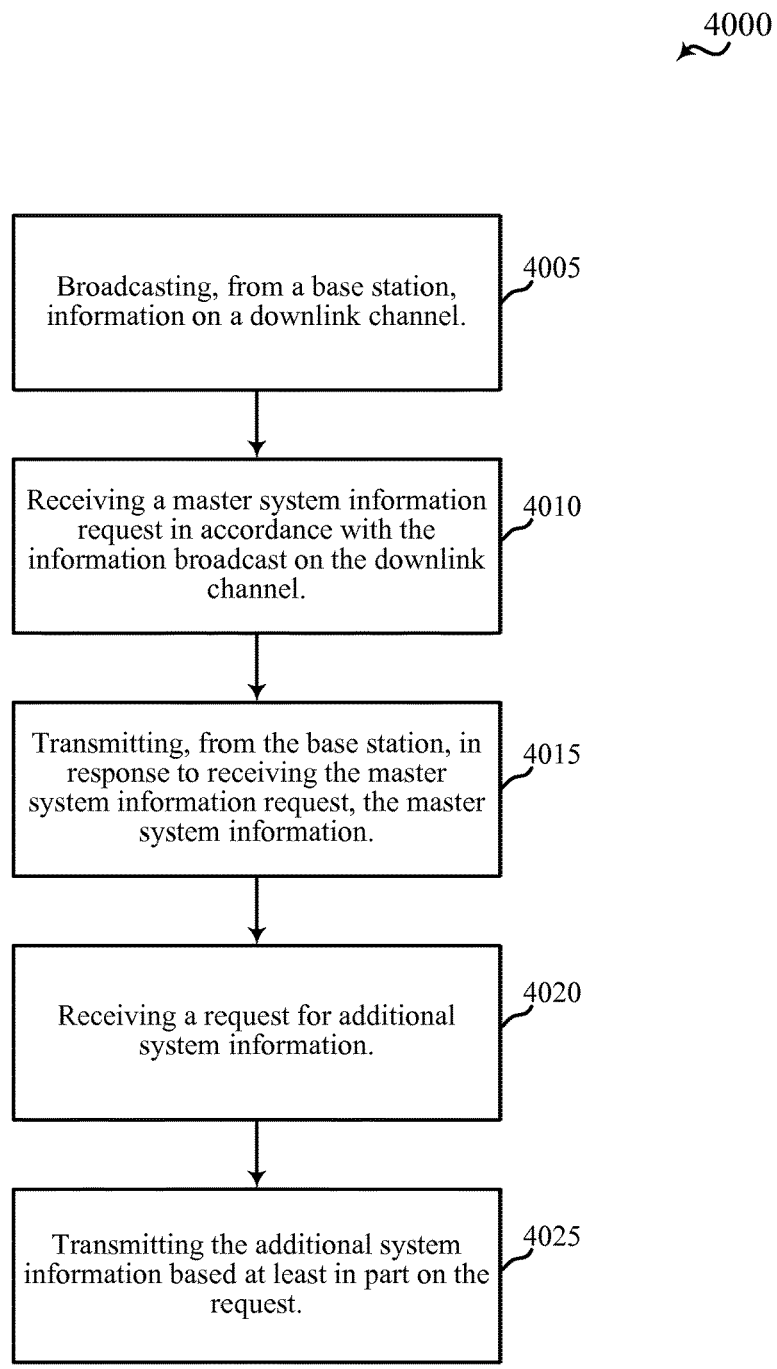
FIG. 40 is a flow chart illustrating an example of a method for wireless communication at a base station, in accordance with various aspects of the present disclosure.

FIG. 40 is a flow chart illustrating an example of a method 4000 for wireless communication at a base station, in accordance with various aspects of the present disclosure. For clarity, the method 4000 is described below with reference to aspects of one or more of the base stations 105 described with reference to FIGS. 1-6 and 16-25. In some examples a base station may execute one or more sets of codes to control the functional elements of the base station to perform the functions described below. In some examples, the method 4000 may be performed by a base station transmitting system information in a unicast, narrow-beam, broadcast, or broad-beam manner.

At block 4005, the base station may broadcast information on a downlink channel. The information may indicate that master system information (e.g., an MSIB) is transmitted in response to a master system information request (e.g., an MSIB transmission request) received from a UE. In some examples, the downlink channel may include a synchronization signal. The information may be included in (or associated with) the synchronization signal. The operation(s) at block 4005 may be performed using the SI transmission module 1620 described with reference to FIG. 20, 21, 24A, 24B, or 25, or the sync signal transmission management module 2105 described with reference to FIG. 21.

At block 4010, the base station may receive a master system information request (e.g., in accordance with the information broadcast on the downlink channel). In some cases, receiving the master system information request may include receiving, in the request, an identification of one or more capabilities of a UE transmitting the request. The operation(s) at block 4010 may be performed using the SI transmission module 1620 described with reference to FIG. 20, 21, 24A, 24B, or 25, or the SI request processing module 2010 described with reference to FIG. 20 or 21.

At block 4015, the base station may transmit, in response to receiving the master system information request, the master system information. In some cases, the master system information may include system information that allows a UE to perform an initial access of a network using one or more of an identification of the network, an identification of the base station, cell selection configuration and access restrictions, or a network access configuration. The operation(s) at block 4015 may be performed using the SI transmission module 1620 described with reference to FIG. 20, 21, 24A, 24B, or 25, or the master SI transmission management module 2005 described with reference to FIG. 20 or 21.

At block 4020, the base station may receive a request for additional system information. The operation(s) at block 4020 may be performed using the SI transmission module 1620 described with reference to FIG. 20, 21, 24A, 24B, or 25, or the SI request processing module 2010 described with reference to FIG. 20 or 21.

At block 4025, the base station may transmit the additional system information based at least in part on the request for the additional system information. In some cases, the additional system information may be identified based at least in part on one or more capabilities of the UE identified in the master system information request. The additional system information may also be identified based at least in part on information received in the request for additional system information, or in other ways (e.g., as described with reference to FIG. 38). The operation(s) at block 4025 may be performed using the SI transmission module 1620 described with reference to FIG. 20, 21, 24A, 24B, or 25, or the other SI transmission management module 2015 described with reference to FIG. 20 or 21.

In some embodiments of the method 4000, transmitting the master system information may include transmitting an indication of one or more sets of additional system information that are available. In some embodiments of the method 4000, receiving the request for the additional system information may include receiving multiple requests for additional system information corresponding to multiple sets of additional system information to be transmitted. For example, the method 4000 may include receiving a single OSIB transmission request indicating one or a plurality of elements of additional system information that a UE would like to receive (e.g., a binary value in the OSIB transmission request may be set to TRUE for each element of additional system information that the UE would like to receive). In other examples, the method 4000 may include receiving requests for some types of additional system information in different OSIB transmission requests.

Thus, the method 4000 may provide for wireless communication. It should be noted that the method 4000 is just one implementation and that the operations of the method 4000 may be rearranged or otherwise modified such that other implementations are possible.

Figure 41:
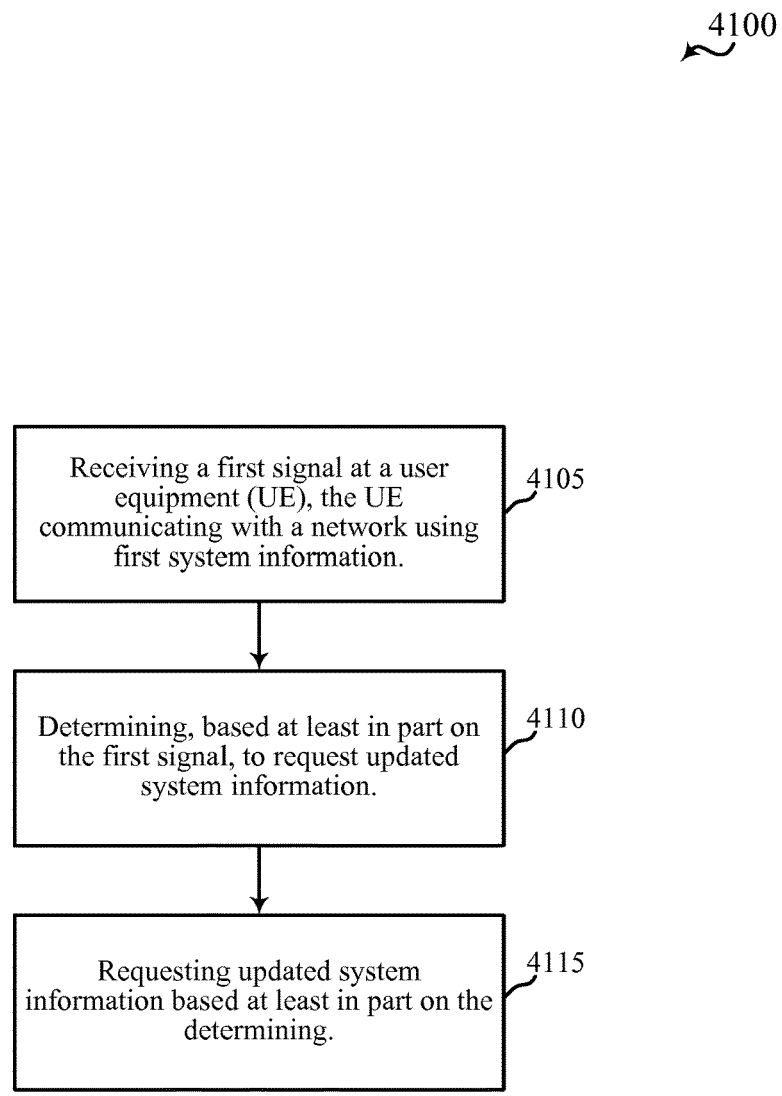
FIG. 41 is a flow chart illustrating an example of a method for wireless communication at a UE, in accordance with various aspects of the present disclosure.

FIG. 41 is a flow chart illustrating an example of a method 4100 for wireless communication at a UE, in accordance with various aspects of the present disclosure. For clarity, the method 4100 is described below with reference to aspects of one or more of the UEs 115 described with reference to FIGS. 1-15 and 25. In some examples a UE may execute one or more sets of codes to control the functional elements of the UE to perform the functions described below.

At block 4105, a UE may receive a first signal (e.g., a sync signal, a paging message, or another type of transmission (e.g., an MSIB)). At the time of receiving the first signal, the UE may communicate with a network using first system information. The operation(s) at block 4105 may be performed using the SI acquisition module 720 described with reference to FIG. 13, 14, 15, or 25, or the signal processing module 1305 described with reference to FIG. 13 or 14.

At block 4110, the UE may determine, based at least in part on the first signal, to request updated system information. The operation(s) at block 4110 may be performed using the SI acquisition module 720 described with reference to FIG. 13, 14, 15, or 25, or the signal processing module 1305 described with reference to FIG. 13 or 14.

At block 4115, the UE may request updated system information based at least in part on the determining. The operation(s) at block 4115 may be performed using the SI acquisition module 720 described with reference to FIG. 13, 14, 15, or 25, or the UE SI request module 1310 described with reference to FIG. 13 or 14.

In some embodiments of the method 4100, receiving the first signal may include receiving an indication that at least a portion of the first system information has changed. In some examples, the indication may include a modification flag. The modification flag may indicate, by a counter value or Boolean variable (e.g., a binary value), that a corresponding portion of system information has changed. In some examples, the indication may include one or more value tags, as described in more detail with reference to FIG. 6 or 43.

In some embodiments of the method 4100, determining to request updated system information, at block 4110, may include at least one of: identifying that the UE has moved into a zone using second system information that is different from the first system information; identifying that the network has changed at least a portion of the first system information; or identifying that the UE has moved more than a predetermined distance from a location where the UE obtained the first system information a previous time (e.g., from the location where the UE obtained the first system information last time).

In some embodiments of the method 4100, receiving the first signal, at block 4105, may include receiving a zone identifier (e.g., an area code, a BSIC, or another cell identifier). In some cases, the zone identifier may be received as part of a synchronization signal. In these embodiments, the method 4100 may include using the zone identifier to identify that the UE has moved from a first zone to a second zone.

In some embodiments of the method 4100, determining to request updated system information, at block 4110, may include identifying a distance between a current location of the UE and a location where the UE obtained the first system information a previous time (e.g., the last time), and determining that the identified distance exceeds a predetermined threshold. In some cases, the predetermined threshold may be received from the network. In some cases, a location signal identifying a location of the UE may also be received. The location signal may be received, for example, as part of receiving the first signal. The location signal may also be received in other ways, such as via a GNSS (e.g., GPS, Galileo, GLONASS or BeiDou).

Thus, the method 4100 may provide for wireless communication. It should be noted that the method 4100 is just one implementation and that the operations of the method 4100 may be rearranged or otherwise modified such that other implementations are possible.

Figure 42:
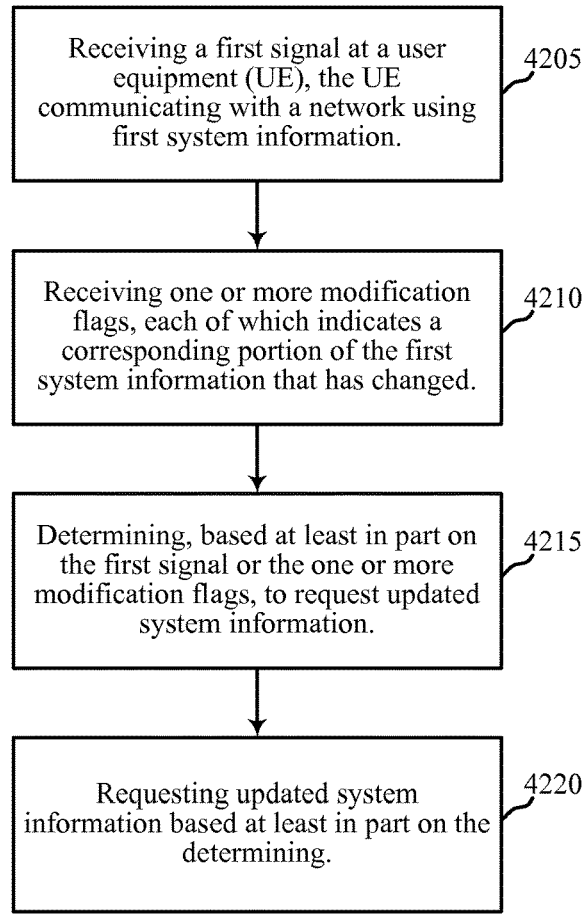
FIG. 42 is a flow chart illustrating an example of a method for wireless communication at a UE, in accordance with various aspects of the present disclosure.

FIG. 42 is a flow chart illustrating an example of a method 4200 for wireless communication at a UE, in accordance with various aspects of the present disclosure. For clarity, the method 4200 is described below with reference to aspects of one or more of the UEs 115 described with reference to FIGS. 1-15 and 25. In some examples a UE may execute one or more sets of codes to control the functional elements of the UE to perform the functions described below.

At block 4205, a UE may receive a first signal (e.g., a sync signal, a paging message, or another type of transmission (e.g., an MSIB)). At the time of receiving the first signal, the UE may communicate with a network using first system information. The first signal may include an indication that at least a portion of the first system information has changed. The operation(s) at block 4205 may be performed using the SI acquisition module 720 described with reference to FIG. 13, 14, 15, or 25, or the signal processing module 1305 described with reference to FIG. 13 or 14.

At block 4210, the UE may receive one or more modification flags, each of which indicates, by a counter value or Boolean variable (e.g., a binary value), that a corresponding portion of the first system information has changed. In some examples, the corresponding portion of the first system information may include a portion of master system information, such as an MSIB or element of an MSIB, In other examples, the corresponding portion of the first system information may include additional non-master system information, such as an OSIB or element of an OSIB. The master system information may include one or more of an identification of the network, an identification of a base station in the network, cell selection configuration and access restrictions, or network access configuration information. The master system information may also or alternatively include, for example, one or more other elements of the master system information described with reference to FIG. 3A. The additional non-master system information may include one or more elements of the other system information described with reference to FIG. 4 or 6. In some embodiments, the modification flag received at block 4210 may be received with (or as part of) the first signal received at block 4205. The operation(s) at block 4210 may be performed using the SI acquisition module 720 described with reference to FIG. 13, 14, 15, or 25, the signal processing module 1305 described with reference to FIG. 13 or 14, or the modification flag or value tag processing module 1405 described with reference to FIG. 14.

At block 4215, the UE may determine, based at least in part on the first signal or a modification flag (e.g., when a modification flag is set to TRUE), to request updated system information. The operation(s) at block 4215 may be performed using the SI acquisition module 720 described with reference to FIG. 13, 14, 15, or 25, the signal processing module 1305 described with reference to FIG. 13 or 14, or the modification flag or value tag processing module 1405 described with reference to FIG. 14.

At block 4220, the UE may request updated system information (e.g., an updated MSIB or OSIB) based at least in part on the determining. The operation(s) at block 4220 may be performed using the SI acquisition module 720 described with reference to FIG. 13, 14, 15, or 25, or the UE SI request module 1310 described with reference to FIG. 13 or 14.

Thus, the method 4200 may provide for wireless communication. It should be noted that the method 4200 is just one implementation and that the operations of the method 4200 may be rearranged or otherwise modified such that other implementations are possible.

Figure 43:
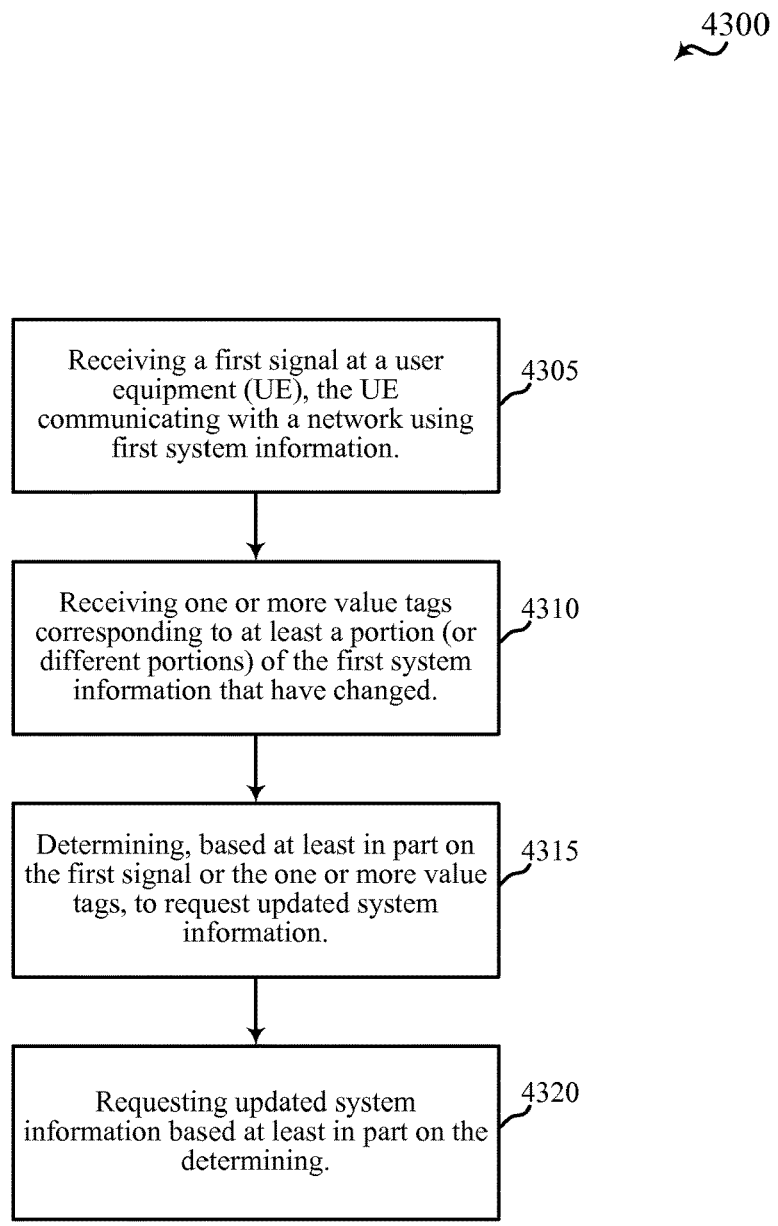
FIG. 43 is a flow chart illustrating an example of a method for wireless communication at a base station, in accordance with various aspects of the present disclosure.

FIG. 43 is a flow chart illustrating an example of a method 4300 for wireless communication at a UE, in accordance with various aspects of the present disclosure. For clarity, the method 4300 is described below with reference to aspects of one or more of the UEs 115 described with reference to FIGS. 1-15 and 25. In some examples a UE may execute one or more sets of codes to control the functional elements of the UE to perform the functions described below.

At block 4305, a UE may receive a first signal (e.g., a sync signal, a paging message, or another type of transmission (e.g., an MSIB)). At the time of receiving the first signal, the UE may communicate with a network using first system information. The first signal may include an indication that at least a portion of the first system information has changed. The operation(s) at block 4305 may be performed using the SI acquisition module 720 described with reference to FIG. 13, 14, 15, or 25, or the signal processing module 1305 described with reference to FIG. 13 or 14.

At block 4310, the UE may receive one or more value tags corresponding to at least a portion (or different portions) of the first system information that have changed. In some examples, the one or more value tags may correspond to one or more portions of master system information, one or more portions of additional non-master system information, or a combination thereof. The master system information may include one or more of an identification of the network, an identification of a base station in the network, cell selection configuration and access restrictions, or network access configuration information. The master system information may also or alternatively include, for example, one or more other elements of the master system information described with reference to FIG. 3A. The additional non-master system information may include one or more elements of the other system information described with reference to FIG. 4 or 6. In some embodiments, one or more value tags received at block 4310 may be received with (or as part of) the first signal received at block 4305. The operation(s) at block 4310 may be performed using the SI acquisition module 720 described with reference to FIG. 13, 14, 15, or 25, the signal processing module 1305 described with reference to FIG. 13 or 14, or the modification flag or value tag processing module 1405 described with reference to FIG. 14.

At block 4315, the UE may determine, based at least in part on the first signal or the one or more value tags, to request updated system information. In some cases, determining to request updated system information may include comparing a received value tag (e.g., a received value tag associated with an element of non-master system information included in an OSIB) with a previously received value tag (e.g., a previously received value tag for the element of non-master system information), and determining to request the updated system information based at least in part on the comparison (e.g., determining to request the updated system information when the value tags do not match). When a received value tag corresponds to an element of system information that the UE is not monitoring, the UE may not compare the value tag to a previously received value tag, or may not request the element of system information. The operation(s) at block 4315 may be performed using the SI acquisition module 720 described with reference to FIG. 13, 14, 15, or 25, the signal processing module 1305 described with reference to FIG. 13 or 14, or the modification flag or value tag processing module 1405 described with reference to FIG. 14.

At block 4320, the UE may request updated system information (e.g., a particular OSIB or element of an OSIB) based at least in part on the determining. The operation(s) at block 4320 may be performed using the SI acquisition module 720 described with reference to FIG. 13, 14, 15, or 25, or the UE SI request module 1310 described with reference to FIG. 13 or 14.

Thus, the method 4300 may provide for wireless communication. It should be noted that the method 4300 is just one implementation and that the operations of the method 4300 may be rearranged or otherwise modified such that other implementations are possible.

Figure 44:
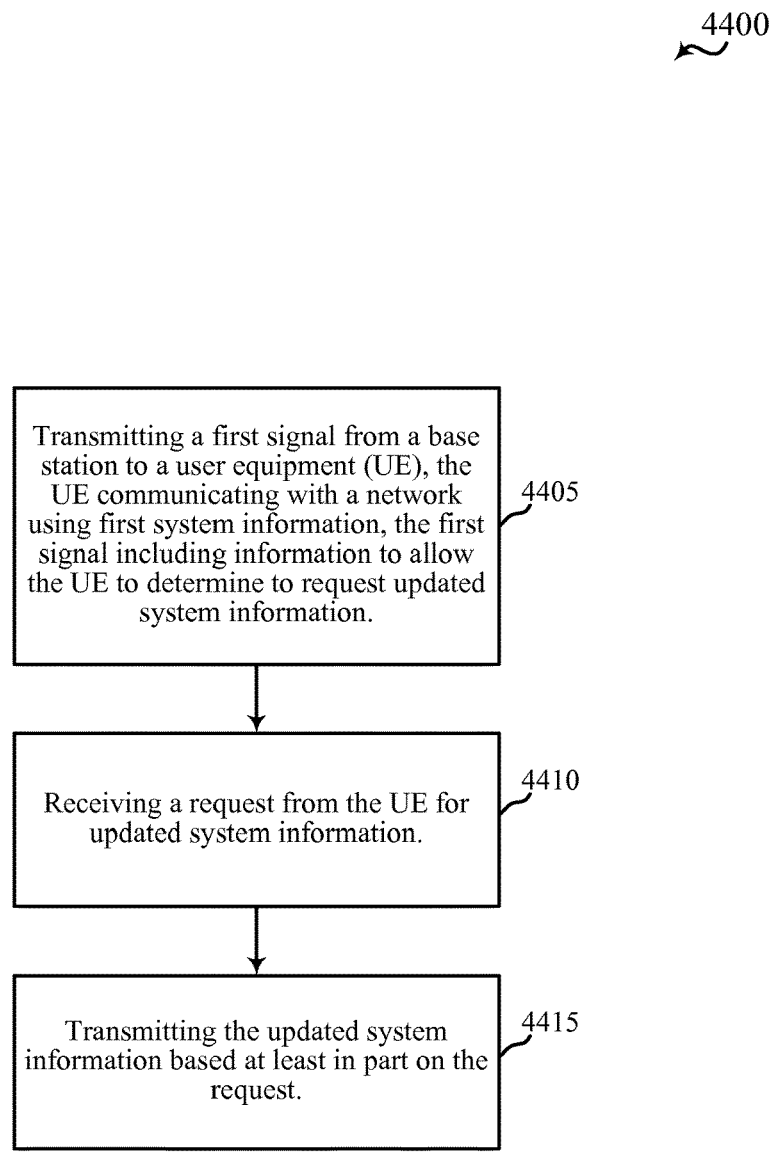
FIG. 44 is a flow chart illustrating an example of a method for wireless communication at a base station, in accordance with various aspects of the present disclosure.

FIG. 44 is a flow chart illustrating an example of a method 4400 for wireless communication at a base station, in accordance with various aspects of the present disclosure. For clarity, the method 4400 is described below with reference to aspects of one or more of the base stations 105 described with reference to FIG. 1, 2, 4, 6, 16, 17, 20, 21, 22, 23, 24A, 24B, or 25. In some examples a base station may execute one or more sets of codes to control the functional elements of the base station to perform the functions described below.

At block 4405, the method 4400 may include transmitting a first signal (e.g., a sync signal, a paging message, or another type of transmission (e.g., an MSIB)) from a base station to a UE. At the time of transmission of the first signal, the UE may communicate with a network using first system information. The first signal may include information to allow the UE to determine to request updated system information. The operation(s) at block 4405 may be performed using the SI transmission module 1620 described with reference to FIG. 22, 23, 24A, 24B, or 25, or the SI transmission management module 2205 described with reference to FIG. 22 or 23.

At block 4410, the method 4400 may include receiving a request from the UE for updated system information. The operation(s) at block 4410 may be performed using the SI transmission module 1620 described with reference to FIG. 22, 23, 24A, 24B, or 25, or the SI request processing module 2210 described with reference to FIG. 22 or 23.

At block 4415, the method 4400 may include transmitting the updated system information based at least in part on the request. The operation(s) at block 4415 may be performed using the SI transmission module 1620 described with reference to FIG. 22, 23, 24A, 24B, or 25, or the SI transmission management module 2205 described with reference to FIG. 22 or 23.

In some embodiments of the method 4400, transmitting the first signal may include transmitting an indication that at least a portion of the first system information has changed. In some examples, the indication may include a modification flag. The modification flag may indicate, by a counter value or Boolean variable (e.g., a binary value), that a corresponding portion of system information has changed. In some examples, the indication may include one or more value tags, as described in more detail with reference to FIG. 46.

In some embodiments of the method 4400, transmitting the first signal, at block 4305, may include transmitting a zone identifier (e.g., an area code, a BSIC, or another cell identifier). In some cases, the zone identifier may be transmitted as part of a synchronization signal.

Thus, the method 4400 may provide for wireless communication. It should be noted that the method 4400 is just one implementation and that the operations of the method 4400 may be rearranged or otherwise modified such that other implementations are possible.

Figure 45:
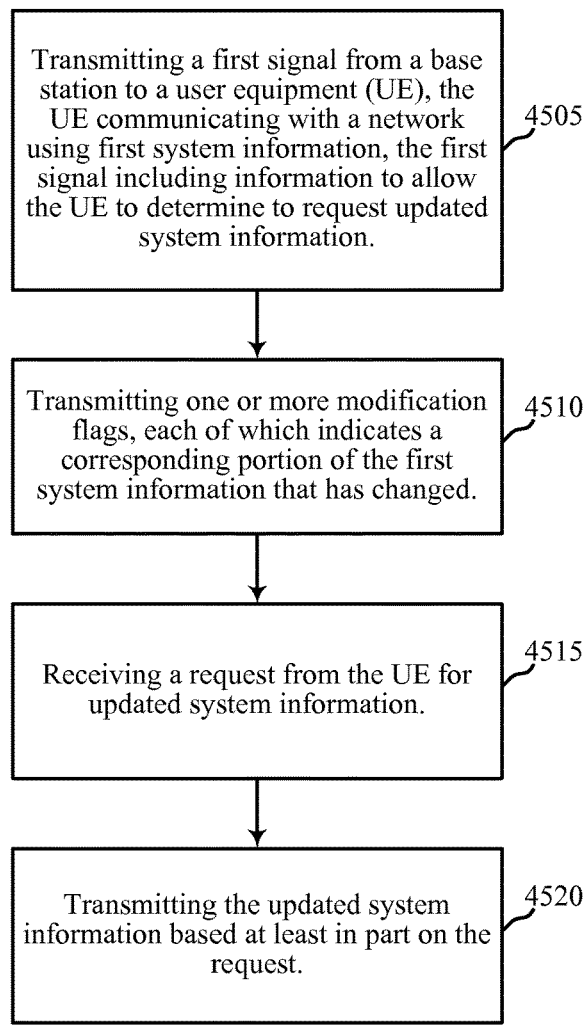
FIG. 45 is a flow chart illustrating an example of a method for wireless communication at a base station, in accordance with various aspects of the present disclosure.

FIG. 45 is a flow chart illustrating an example of a method 4500 for wireless communication at a base station, in accordance with various aspects of the present disclosure. For clarity, the method 4500 is described below with reference to aspects of one or more of the base stations 105 described with reference to FIGS. 1, 2, 4, 6, 16, 17, 20, 21, 22, 23, 24A. 24B, or 25. In some examples a base station may execute one or more sets of codes to control the functional elements of the base station to perform the functions described below.

At block 4505, the method 4500 may include transmitting a first signal (e.g., a sync signal, a paging message, or another type of transmission (e.g., an MSIB)) from a base station to a UE. At the time of transmission of the first signal, the UE may communicate with a network using first system information. The first signal may include information to allow the UE to determine to request updated system information. The first signal may also include an indication that at least a portion of the first system information has changed. The operation(s) at block 4505 may be performed using the SI transmission module 1620 described with reference to FIG. 22, 23, 24A, 24B, or 25, or the SI transmission management module 2205 described with reference to FIG. 22 or 23.

At block 4510, the method 4500 may include transmitting one or more modification flags, each of which indicates, by a counter value or Boolean variable (e.g., a binary value), that a corresponding portion of the first system information has changed. In some examples, the corresponding portion of the first system information may include a portion of master system information, such as an MSIB or element of an MSIB, In other examples, the corresponding portion of the first system information may include additional non-master system information, such as an OSIB or element of an OSIB. The master system information may include one or more of an identification of the network, an identification of a base station in the network, cell selection configuration and access restrictions, or network access configuration information. The master system information may also or alternatively include, for example, one or more other elements of the master system information described with reference to FIG. 3A. The additional non-master system information may include one or more elements of the other system information described with reference to FIG. 4 or 6. In some embodiments, the modification flag transmitted at block 4510 may be transmitted with (or as a part of) the first signal transmitted at block 4505. The operation(s) at block 4510 may be performed using the SI transmission module 1620 described with reference to FIG. 22, 23, 24A. 24B, or 25, the SI transmission management module 2205 described with reference to FIG. 22 or 23, or the modification flag or value tag transmission management module 2305 described with reference to FIG. 23.

At block 4515, the method 4500 may include receiving a request from the UE for updated system information (e.g., an updated MSIB or OSIB). The operation(s) at block 4515 may be performed using the SI transmission module 1620 described with reference to FIG. 22, 23, 24A, 24B, or 25, or the SI request processing module 2210 described with reference to FIG. 22 or 23.

At block 4520, the method 4500 may include transmitting the updated system information based at least in part on the request. The operation(s) at block 4520 may be performed using the SI transmission module 1620 described with reference to FIG. 22, 23, 24A. 24B, or 25, or the SI transmission management module 2205 described with reference to FIG. 22 or 23.

Thus, the method 4500 may provide for wireless communication. It should be noted that the method 4500 is just one implementation and that the operations of the method 4500 may be rearranged or otherwise modified such that other implementations are possible.

Figure 46:
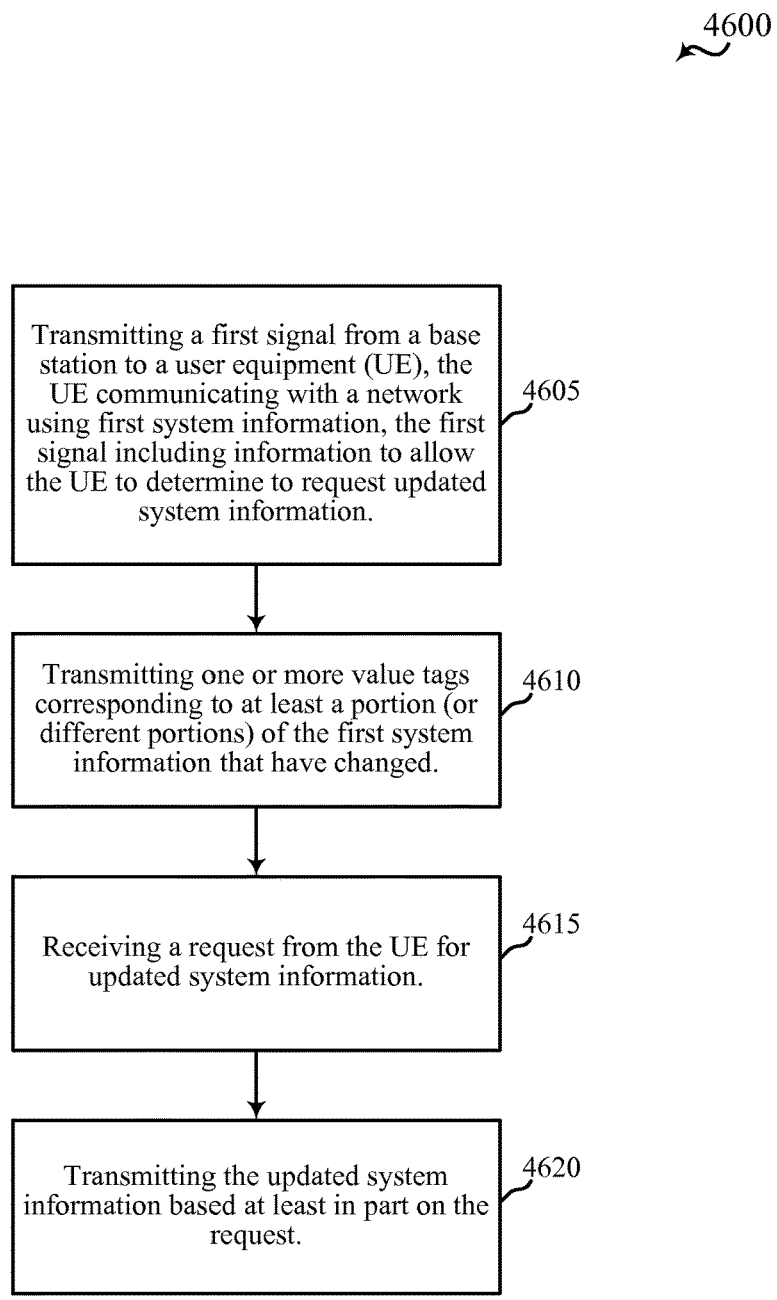
FIG. 46 is a flow chart illustrating an example of a method for wireless communication at a base station, in accordance with various aspects of the present disclosure.

FIG. 46 is a flow chart illustrating an example of a method 4600 for wireless communication at a base station, in accordance with various aspects of the present disclosure. For clarity, the method 4600 is described below with reference to aspects of one or more of the base stations 105 described with reference to FIG. 1, 2, 4, 6, 16, 17, 20, 21, 22, 23, 24A, 24B, or 25. In some examples a base station may execute one or more sets of codes to control the functional elements of the base station to perform the functions described below.

At block 4605, the method 4600 may include transmitting a first signal (e.g., a sync signal, a paging message, or another type of transmission (e.g., an MSIB)) from a base station to a UE. At the time of transmission of the first signal, the UE may communicate with a network using first system information. The first signal may include information to allow the UE to determine to request updated system information. The first signal may also include an indication that at least a portion of the first system information has changed. The operation(s) at block 4605 may be performed using the SI transmission module 1620 described with reference to FIG. 22, 23, 24A, 24B, or 25, or the SI transmission management module 2205 described with reference to FIG. 22 or 23.

At block 4610, the method 4600 may include transmitting one or more value tags corresponding to at least a portion (or different portions) of the first system information that has/have changed. In some examples, the one or more value tags may correspond to one or more portions of master system information, one or more portions of additional non-master system information, or a combination thereof. The master system information may include one or more of an identification of the network, an identification of a base station in the network, cell selection configuration and access restrictions, or network access configuration information. The master system information may also or alternatively include, for example, one or more other elements of the master system information described with reference to FIG. 3A. The additional non-master system information may include one or more elements of the other system information described with reference to FIG. 4 or 6. In some embodiments, one or more value tags transmitted at block 4610 may be transmitted with (or as a part of) the first signal transmitted at block 4605. The operation(s) at block 4610 may be performed using the SI transmission module 1620 described with reference to FIG. 22, 23, 24A, 24B, or 25, the SI transmission management module 2205 described with reference to FIG. 22 or 23, or the modification flag or value tag transmission management module 2305 described with reference to FIG. 23.

At block 4615, the method 4600 may include receiving a request from the UE for updated system information (e.g., a particular OSIB or element of an OSIB). The operation(s) at block 4615 may be performed using the SI transmission module 1620 described with reference to FIG. 22, 23, 24A, 24B, or 25, or the SI request processing module 2210 described with reference to FIG. 22 or 23.

At block 4620, the method 4600 may include transmitting the updated system information based at least in part on the request. The operation(s) at block 4620 may be performed using the SI transmission module 1620 described with reference to FIG. 22, 23, 24A, 24B, or 25, or the SI transmission management module 2205 described with reference to FIG. 22 or 23.

Thus, the method 4600 may provide for wireless communication. It should be noted that the method 4600 is just one implementation and that the operations of the method 4600 may be rearranged or otherwise modified such that other implementations are possible.

The detailed description set forth above in connection with the appended drawings describes examples and does not represent the only examples that may be implemented or that are within the scope of the claims. The terms "example" and "exemplary," when used in this description, mean "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and apparatuses are shown in block diagram form in order to avoid obscuring the concepts of the described examples.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a digital signal processor (DSP), an ASIC, an FPGA, an SoC, or another programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, multiple microprocessors, one or more microprocessors in conjunction with a DSP core, or any other such configuration.

The functions described herein may be implemented in hardware, software executed by a processor, firmware, or any combination thereof. If implemented in software executed by a processor, the functions may be stored on or transmitted over as one or more instructions or code on a non-transitory computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations.

Also, as used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C).

Computer-readable media includes both computer storage media and communication media including any medium that facilitates transfer of a computer program from one place to another. A storage medium may be any available medium that can be accessed by a general purpose or special purpose computer. By way of example, and not limitation, computer-readable media can comprise RAM, ROM, electrically erasable programmable ROM (EEPROM), compact disk ROM (CD-ROM) or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The previous description of the disclosure is provided to enable a person skilled in the art to make or use the disclosure. Various modifications to the disclosure will be readily apparent to those skilled in the art, and the common principles defined herein may be applied to other variations without departing from the scope of the disclosure. Throughout this disclosure the term "example" or "exemplary" indicates an example or instance and does not imply or require any preference for the noted example. Thus, the disclosure is not to be limited to the examples and designs described herein but is to be accorded the widest scope consistent with the principles and novel features disclosed herein.

What is claimed is:

1. A method for wireless communication at a user equipment (UE), comprising:
   receiving, at the UE, a first signal, the first signal comprising a system information block including a first indication of whether system information is to be requested by the UE and a second indication of at least one of a channel, a frequency, or timing information for sending, by the UE, a request for the system information;
   identifying one or more functions for which system information is to be obtained;
   sending, by the UE, the request for system information in accordance with the first indication;
   receiving, at the UE, the system information in accordance with the first indication and the request, wherein the received system information includes system information for the identified one or more functions; and
   establishing a connection between the UE and a base station in accordance with the received system information.

2. The method of claim 1, wherein receiving the system information comprises:
   receiving the system information via a second signal in accordance with the first indication, the second signal being transmitted via a broadcast or broad-beam operation.

3. The method of claim 1, wherein receiving the first signal comprises:
   receiving information indicating a predetermined channel on which system information is to be transmitted via a second broadcast signal via a broadcast or broad-beam operation.

4. The method of claim 1, wherein receiving the first signal comprises:
   receiving the first signal as part of a broad-beam operation in a massive multiple-input/multiple-output (MIMO) network.

5. The method of claim 4, wherein receiving the system information comprises:
   receiving the system information as part of a broad-beam or narrow-beam operation.

6. The method of claim 1, wherein receiving the first signal comprises:
   receiving the first signal as part of a broadcast operation in a non-massive multiple-input/multiple-output (MIMO) network.

7. The method of claim 6, wherein receiving the system information comprises:
   receiving the system information as part of a broadcast or unicast operation.

8. The method of claim 1, wherein receiving the system information comprises:
   sending a request for the system information for the one or more functions; and
   receiving the system information for the one or more functions in response to the request.

9. The method of claim 1, wherein receiving the system information comprises:
   sending a separate request for system information for each of the one or more functions, each request being for system information of a different function; and
   receiving, individually, system information for the one or more functions in response to each request.

10. The method of claim 1, wherein receiving the first signal further comprises:
    receiving a third indication that system information for the one or more functions is to be broadcast at one or more predetermined times and on one or more predetermined channels.

11. The method of claim 1, wherein receiving the first signal further comprises:
    receiving a third indication that system information for the one or more functions is available.

12. The method of claim 11, wherein receiving the system information comprises:
    sending one or more requests for the system information for the one or more functions in accordance with the first indication and the third indication; and
    receiving the system information for the one or more functions the one or more requests.

13. The method of claim 11, wherein receiving the first signal comprises:
    receiving information identifying a target device where one or more requests for system information for the one or more functions are to be sent.

14. The method of claim 11, wherein receiving the first signal comprises:

receiving information identifying one or more time periods corresponding to when one or more requests for system information for the one or more functions are to be sent, wherein each time period corresponds to a separate function of the one or more services.

15. The method of claim 11, wherein receiving the system information comprises:
receiving the system information for the one or more functions via one or more second signals, the one or more second signals being transmitted via a broadcast or broad-beam operation.

16. The method of claim 1, wherein receiving the system information comprises:
receiving the system information for the one or more functions, wherein the system information includes information identifying the one or more functions for which the system information is valid.

17. The method of claim 1, wherein receiving the system information comprises:
receiving the system information for one of the one or more functions;
determining whether additional system information for the one of the one or more functions is needed; and
requesting additional system information for the one of the one or more functions based at least in part on the determining.

18. The method of claim 1, wherein the one or more functions include one or more of an energy efficient function, a high reliability function, a low latency function, a broadcast function, or a small data function.

19. The method of claim 1, wherein receiving the system information comprises:
receiving the system information for the one or more functions, wherein the system information includes information identifying a validity time period; and
re-obtaining the system information for the one or more functions upon expiration of the validity time period.

20. The method of claim 19, wherein the validity time period is based on a power saving mode (PSM) time period or an amount of time to cycle through all value tags of the system information.

21. A method for wireless communication, comprising:
transmitting, from a base station, a first signal, the first signal comprising a system information block including a first indication of whether system information is to be requested by a user equipment (UE) and a second indication of at least one of a channel, a frequency, or timing information for sending, by the UE, a request for the system information;
receiving, at the base station, the request for the system information in accordance with the indication;
transmitting, from the base station, the system information in accordance with the first indication and the request, wherein the system information associated with functions available to the UE, wherein separate transmissions are used to transmit the system information for different functions and different configurations of functions; and
establishing a connection between the base station and the UE in accordance with the system information.

22. The method of claim 21, wherein transmitting the system information comprises:
transmitting the system information via a second signal in accordance with the indication, the second signal being transmitted via a broadcast or broad-beam operation.

23. The method of claim 21, further comprising:
including, in the first signal, information indicating a predetermined channel on which the system information is to be transmitted via a broadcast or broad-beam operation.

24. The method of claim 21, wherein transmitting the system information comprises:
transmitting the system information in accordance with the indication and a transmission mode.

25. The method of claim 24, further comprising:
changing the transmission mode to be a broadcast or broad-beam mode targeting a cell edge and having fixed periodic scheduling.

26. The method of claim 24, further comprising:
changing the transmission mode to be a broadcast or broad-beam mode targeting a cell edge and having an on-demand periodic scheduling triggered by the request for the system information in accordance with the first indication.

27. The method of claim 24, further comprising:
changing the transmission mode to be a broadcast or broad-beam mode having an on-demand aperiodic scheduling triggered by the request for the system information in accordance with the first indication.

28. The method of claim 24, further comprising:
changing the transmission mode to be a unicast or narrow-beam mode having an on-demand aperiodic scheduling triggered the request for the system information in accordance with the first indication.

29. The method of claim 24, further comprising:
changing the transmission mode based on network load or congestion status.

30. The method of claim 21, further comprising:
using a broad-beam operation to transmit the first signal in a massive multiple-input/multiple-output (MIMO) network.

31. The method of claim 30, further comprising:
using a broad-beam or narrow-beam operation to transmit the system information, in accordance with the first indication and a transmission mode.

32. The method of claim 21, further comprising:
using a broadcast operation to transmit the first signal in a non-massive multiple-input/multiple-output (MIMO) network.

33. The method of claim 32, further comprising:
using a broadcast or unicast operation to transmit the system information, in accordance with the first indication and a transmission mode.

34. The method of claim 21, further comprising:
receiving a request for the system information for one or more function in accordance with the indication; and
transmitting the system information for the one or more functions in response to the request.

35. The method of claim 21, further comprising:
receiving multiple requests for the system information for one or more functions in accordance with the first indication, each request being from the UE and being for system information of a different function; and
transmitting the system information for the one or more functions in response to the request.

36. The method of claim 35, wherein transmitting the system information the request comprises:
transmitting the system information for each of the one or more functions in a joint transmission.

37. The method of claim 35, wherein transmitting the system information the request comprises:
transmitting the system information for each of the one or more functions in separate transmissions.

38. The method of claim 21, further comprising:
including, in the first signal, a third indication that the system information for one or more functions is to be broadcast at one or more predetermined times and on one or more predetermined channels.

39. The method of claim 21, further comprising:
including, in the first signal, a third indication that the system information for one or more functions is available to be requested.

40. The method of claim 39, further comprising:
receiving one or more requests for the system information for one or more functions in accordance with the first indication and the third indication.

41. The method of claim 39, further comprising:
including, with the first signal, information indicating where and when one or more requests for the system information for one or more functions are to be sent.

42. The method of claim 21, further comprising:
including, in the system information, information indicating one or more functions for which the system information is valid.

43. The method of claim 21, further comprising:
including, in the system information, information indicating a duration of time for which the system information is valid, wherein the system information for different functions and different configurations of functions includes different durations of time.

44. The method of claim 21 further comprising:
receiving one or more requests for system information for one or more functions in accordance with the first indication without having included in the first signal a third indication of which functions system information is available.

45. The method of claim 21, further comprising:
receiving one or more requests for the system information in accordance with the indication; and
identifying the system information to be sent pertaining to different functions based at least in part on transmission resources used by the one or more requests.

46. The method of claim 21, further comprising:
changing the first indication to indicate that system information is to be transmitted via either a broadcast or broad-beam operation or via a unicast or narrow-beam operation.

47. An apparatus for wireless communication, comprising:
means for receiving, at a UE, a first signal comprising a system information block, the first signal including a first indication of whether system information is to be requested by the UE and a second indication of at least one of a channel, a frequency, or timing information for sending, by the UE, a request for the system information;
means for identifying one or more functions for which system information is to be obtained;
means, by the UE, the request for the system information in accordance with the first indication;
means for receiving, at the UE, the system information in accordance with the first indication and the request, wherein the received system information includes system information for the identified one or more functions; and
means for establishing a connection between the UE and a base station in accordance with the received system information.

48. An apparatus for wireless communication, comprising:
a processor;
memory in electronic communication with the processor; and
instructions stored in the memory, the instructions being executable by the processor to:
receive, at a UE, a first signal comprising a system information block, the first signal including a first indication of whether system information is to be requested by the UE and a second indication of at least one of a channel, a frequency, or timing information for sending, by the UE, a request for the system information;
identify one or more functions for which system information is to be obtained;
send, from the UE, the request for the system information;
receive, at the UE, the system information in accordance with the first indication and the request, wherein the received system information includes system information for the identified one or more functions; and
establish a connection between the UE and a base station in accordance with the received system information.

49. An apparatus for wireless communication, comprising:
a processor;
memory in electronic communication with the processor; and
instructions stored in the memory, the instructions being executable by the processor to:
transmit, from a base station, a first signal comprising a system information block, the first signal including a first indication of whether system information is to be requested by a user equipment (UE) and a second indication of at least one of a channel, a frequency, or timing information for sending, by the UE, a request for the system information;
receive, at the base station, the request for the system information; and
transmit, from the base station, the system information in accordance with the first indication and the request, wherein the system information associated with functions available to the UE, wherein separate transmissions are used to transmit the system information for different functions and different configurations of functions; and
establish a connection between the base station and the UE in accordance with the system information.

50. A non-transitory computer-readable medium storing computer-executable code for wireless communication, the code executable by a processor to:
receive, at a user equipment (UE), a first signal comprising a system information block, the first signal including a first indication of whether system information is to be requested by the UE and a second indication of at least one of a channel, a frequency, or timing information for sending, by the UE, a request for the system information;
identify one or more functions for which system information is to be obtained;
send, from the UE, the request for the system information;
receive, at the UE, the system information in accordance with the first indication and the request, wherein the received system information includes system information for the identified one or more functions; and
establish a connection between the UE and a base station in accordance with the received system information.

51. A non-transitory computer-readable medium storing computer-executable code for wireless communication, the code executable by a processor to:
- transmit, from a base station, a first signal comprising a system information block, the first signal including a first indication of whether system information is to be requested by a user equipment (UE) and a second indication of at least one of a channel, a frequency, or timing information for sending, by the UE, a request for the system information;
- receive, at the base station, the request for the system information;
- transmit, from the base station, the system information in accordance with the first indication and the request, wherein the system information associated with functions available to the UE, wherein separate transmissions are used to transmit the system information for different functions and different configurations of functions; and
- establishing a connection between the base station and the UE in accordance with the system information.

52. An apparatus for wireless communication, comprising:
- means for transmitting a first signal, the first signal comprising a system information block and including a first indication of whether system information is to be requested by a user equipment (UE) and a second indication of at least one of a channel, a frequency, or timing information for sending, by the UE, a request for the system information;
- means for receiving, at the base station, the request from the UE for the system information;
- means for transmitting the system information in accordance with the first indication and the request, wherein the system information associated with functions available to the UE, wherein separate transmissions are used to transmit the system information for different functions and different configurations of functions; and
- means for establishing a connection between the base station and the UE in accordance with the received system information.

53. The apparatus of claim 52, wherein separate transmissions are used to transmit the system information for different services and different configurations of services.

* * * * *